US012095545B2

United States Patent
Edge

(10) Patent No.: US 12,095,545 B2
(45) Date of Patent: Sep. 17, 2024

(54) 5G BASE STATIONS SUPPORTING SATELLITE WIRELESS ACCESS BY USER EQUIPMENTS

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 17/476,298

(22) Filed: Sep. 15, 2021

(65) Prior Publication Data

US 2022/0094430 A1  Mar. 24, 2022

Related U.S. Application Data

(60) Provisional application No. 63/081,314, filed on Sep. 21, 2020, provisional application No. 63/080,350, filed on Sep. 18, 2020.

(51) Int. Cl.
*H04W 60/00* (2009.01)
*H04B 7/185* (2006.01)
(Continued)

(52) U.S. Cl.
CPC ........ *H04B 7/18547* (2013.01); *H04W 60/00* (2013.01); *H04W 64/006* (2013.01); *H04W 84/042* (2013.01)

(58) Field of Classification Search
CPC ..... H04W 64/00; H04W 8/26; H04W 84/042; H04W 84/005; H04W 84/06;
(Continued)

(56) References Cited

U.S. PATENT DOCUMENTS

2020/0213000 A1* 7/2020 Arur .................... H04B 7/1851
2021/0084608 A1* 3/2021 Cui ....................... H04W 24/10
(Continued)

FOREIGN PATENT DOCUMENTS

WO   WO-2020036848 A1   2/2020
WO   WO 2020142342      7/2020
(Continued)

OTHER PUBLICATIONS

International Search Report and Written Opinion PCT/US2021/050693—ISA/EPO—Jun. 9, 2022.
(Continued)

*Primary Examiner* — Khawar Iqbal
(74) *Attorney, Agent, or Firm* — Weaver Austin Villeneuve & Sampson LLP

(57) ABSTRACT

Satellite access to a public land mobile network (PLMN) with a Fifth Generation (5G) core network (5GCN) is supported by a serving satellite NodeB (gNB). The gNB determines or verifies a country in which a user equipment (UE) is located to ensure that the UE is located in the same country as the 5GCN. The gNB receives assistance data from a location server and receives UE measurements of DL signals from a plurality of satellites, e.g., GNSS satellites and/or communication satellites. The assistance data may be solicited or unsolicited by the gNB. The gNB uses the UE measurements and assistance data to determine a location and country of the UE. The gNB allows access by the UE to the 5GCN when the country matches a country of the 5GCN and may provide the 5GCN with an indication of whether the country of the UE was verified.

42 Claims, 13 Drawing Sheets

(51) Int. Cl.
*H04W 64/00* (2009.01)
*H04W 84/04* (2009.01)

(58) Field of Classification Search
CPC .............. H04W 36/0061; H04W 36/08; H04W 36/385; H04W 36/32; H04W 64/006; H04W 60/00; H04W 64/008; H04B 7/18547
See application file for complete search history.

(56) References Cited

U.S. PATENT DOCUMENTS

| | | | | |
|---|---|---|---|---|
| 2021/0105065 | A1* | 4/2021 | Ravishankar | H04W 68/005 |
| 2021/0105693 | A1* | 4/2021 | Tripathi | H04W 84/06 |
| 2021/0376915 | A1* | 12/2021 | Mahalingam | H04W 72/542 |
| 2021/0385675 | A1* | 12/2021 | Määttänen | H04B 7/1851 |
| 2021/0399797 | A1* | 12/2021 | Khan | H04W 36/22 |
| 2021/0410100 | A1* | 12/2021 | Balasubramanian | H04W 64/003 |
| 2022/0007267 | A1* | 1/2022 | Maattanen | H04W 8/26 |
| 2022/0086713 | A1* | 3/2022 | Määttänen | H04W 64/00 |
| 2022/0124581 | A1* | 4/2022 | Wang | H04W 36/00837 |
| 2022/0279437 | A1* | 9/2022 | Wigard | H04W 4/029 |
| 2022/0376779 | A1* | 11/2022 | Atungsiri | H04W 74/0833 |
| 2022/0399937 | A1* | 12/2022 | Atungsiri | H04B 7/18541 |
| 2023/0092925 | A1* | 3/2023 | Wang | H04B 7/18547 455/456.1 |
| 2023/0308168 | A1* | 9/2023 | Määttänen | H04B 7/18541 |

FOREIGN PATENT DOCUMENTS

| | | | |
|---|---|---|---|
| WO | WO-2022016551 A1 | 1/2022 | |
| WO | WO-2022027200 A1 * | 2/2022 | ............ H04W 36/00 |

OTHER PUBLICATIONS

Qualcomm Incorporated: "New KIs and Solutions for Support of Satellite Access in 5G in TR 23.737", SA WG2 Meeting #139e, S2-2004263, 3rd Generation Partnership Project, Mobile Competence Centre, 650, Route Des Lucioles, F-06921, Sophia-Antipolis Cedex, France, vol. SA WG2. No. e-Meeting, Jun. 1, 2020-Jun. 8, 2020, May 22, 2020, XP051890267, 10 Pages.

Partial International Search Report—PCT/US2021/050693—ISA/EPO—Mar. 2, 2022.

Qualcomm Incorporated, et al., "Satellite Cell Solution for Mobility and Regulatory Support for Satellite Access in 5G", 3GPP Draft, SA WG2 Meeting #136, S2-1912524, 3rd Generation Partnership Project (3GPP), Mobile Competence Centre, 650, Route Des Lucioles, F-06921, Sophia-Antipolis Cedex, France, vol. SA WG2. No. Reno. Nevada. USA, Nov. 18, 2019-Nov. 22, 2019, Nov. 22, 2019 (Nov. 22, 2019), XP051828441, pp. 1-13, Retrieved from the Internet: URL: https://ftp.3gpp.org/Meetings_3GPP_SYNC/SA2/Docs/S2-1912524.zip, S2-1912524-was-12043 was S2-1911058-TR 23.737-Virtual Cell solution v7.doc [retrieved on Nov. 22, 2019], figures 6.12.1-1, 6.12.1.1.-1, 6.12.1.1.-2, p. 1 p. 6, the whole document.

* cited by examiner

5G BASE STATIONS SUPPORTING SATELLITE WIRELESS ACCESS BY USER EQUIPMENTS

CLAIM OF PRIORITY UNDER 35 U.S.C. § 119

This application claims under 35 USC § 119 the benefit of and priority to U.S. Provisional Application No. 63/080,350, filed Sep. 18, 2020, and entitled "SYSTEMS AND METHODS FOR GLOBAL NAVIGATION SATELLITE SYSTEM (GNSS) LOCATION SERVER SUPPORT BY 5G BASE STATIONS," and to U.S. Provisional Application No. 63/081,314, filed Sep. 21, 2020, and entitled "SYSTEMS AND METHODS FOR GLOBAL NAVIGATION SATELLITE SYSTEM (GNSS) LOCATION SERVER SUPPORT BY 5G BASE STATIONS," both of which are assigned to the assignee hereof and are incorporated herein by reference in their entireties.

BACKGROUND

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Standardization is ongoing to combine satellite-based communication systems with terrestrial wireless communications systems, such as 5G New Radio (NR) networks. In such a system, a user equipment (UE) would access a satellite, also referred to as a space vehicle (SV), instead of a base station, which would connect to an earth station, also referred to as a ground station or non-terrestrial (NTN) gateway, which in turn would connect to a 5G network (e.g., directly or via a base station). A 5G network could treat the satellite system as another type of Radio Access Technology (RAT) distinct from, but also similar to, terrestrial 5G NR.

For 5G Satellite access, it may be important to verify the country in which a UE is located to ensure that the UE will access a 5G Core Network (5GCN) in the same country as the UE. Such verification can be needed to satisfy regulatory requirements, such as lawful interception (LI) where government agencies in a particular country may need to monitor communications for certain UEs within the country. For this, and other reasons, reliable and accurate location determination of a UE to enable same country 5GCN access may be desirable.

SUMMARY

Satellite access to a public land mobile network (PLMN) with a Fifth Generation (5G) core network (5GCN) is supported by a serving satellite NodeB (gNB). The gNB determines or verifies a country in which a user equipment (UE) is located to ensure that the UE is located in the same country as the 5GCN. The gNB receives assistance data from a location server and receives UE measurements of DL signals from a plurality of satellites, e.g., Global Navigation Satellite Systems (GNSS) satellites and/or communication satellites. The assistance data may be solicited or unsolicited by the gNB. The gNB uses the UE measurements and assistance data to determine a location and country of the UE. The gNB allows access by the UE to the 5GCN when the country matches a country of the 5GCN and may provide the 5GCN with an indication of whether the country of the UE was verified.

In one implementation, a method performed by a satellite NodeB (gNB) for supporting satellite wireless access by a user equipment (UE) to a serving public land mobile network (PLMN), includes receiving assistance data from a location server for determining a position of the UE; receiving measurements of downlink (DL) signals from the UE via a serving communications satellite, wherein the DL signals are received by the UE from a plurality of satellites; determining a location and a country for the UE based on the measurements of the DL signals received from the UE and the assistance data received from the location server; and performing a verification that the UE is in a country associated with the serving PLMN based on the country determined for the UE.

In one implementation, a satellite NodeB (gNB) configured for supporting satellite wireless access by a user equipment (UE) to a serving public land mobile network (PLMN) includes an external interface configured to communicate with network entities; at least one memory; at least one processor coupled to the external interface and the at least one memory, wherein the at least one processor is configured to: receive, via the external interface, assistance data from a location server for determining a position of the UE; receive, via the external interface, measurements of downlink (DL) signals from the UE via a serving communications satellite, wherein the DL signals are received by the UE from a plurality of satellites; determine a location and a country for the UE based on the measurements of the DL signals received from the UE and the assistance data received from the location server; and perform a verification that the UE is in a country associated with the serving PLMN based on the country determined for the UE.

In one implementation, a satellite NodeB (gNB) for supporting satellite wireless access by a user equipment (UE) to a serving public land mobile network (PLMN), includes means for receiving assistance data from a location server for determining a position of the UE; means for receiving measurements of downlink (DL) signals from the UE via a serving communications satellite, wherein the DL signals are received by the UE from a plurality of satellites; means for determining a location and a country for the UE based on the measurements of the DL signals received from the UE and the assistance data received from the location server; and means for performing a verification that the UE is in a country associated with the serving PLMN based on the country determined for the UE.

In one implementation, a non-transitory storage medium including program code stored thereon, the program code is operable to configure at least one processor in a satellite NodeB (gNB) for supporting satellite wireless access by a user equipment (UE) to a serving public land mobile network (PLMN), the program code comprising instructions to: receive assistance data from a location server for determining a position of the UE; receive measurements of downlink (DL) signals from the UE via a serving communications satellite, wherein the DL signals are received by the UE from a plurality of satellites; determine a location and a country for the UE based on the measurements of the DL signals received from the UE and the assistance data received from the location server; and perform a verification that the UE is in a country associated with the serving PLMN based on the country determined for the UE.

In one implementation, a method performed by a location server associated with a serving public land mobile network (PLMN) for supporting satellite wireless access by a user equipment (UE) to the serving PLMN, includes obtaining assistance data from a reference network; and sending the assistance data to a satellite NodeB (gNB) for determining a position of the UE, wherein the gNB determines a location and a country for the UE based on the assistance data and measurements of downlink (DL) signals received from the UE, wherein the DL signals are from a plurality of satellites, wherein the gNB performs a verification that the UE is in a country associated with the serving PLMN based on the country determined for the UE.

In one implementation, a location server associated with a serving public land mobile network (PLMN) configured for supporting satellite wireless access by a user equipment (UE) to the serving PLMN, includes an external interface configured to communicate with network entities; at least one memory; at least one processor coupled to the external interface and the at least one memory, wherein the at least one processor is configured to: obtain, via the external interface, assistance data from a reference network; and send, via the external interface, the assistance data to a satellite NodeB (gNB) for determining a position of the UE, wherein the gNB determines a location and a country for the UE based on the assistance data and measurements of downlink (DL) signals received from the UE, wherein the DL signals are from a plurality of satellites, wherein the gNB performs a verification that the UE is in a country associated with the serving PLMN based on the country determined for the UE.

In one implementation, a location server associated with a serving public land mobile network (PLMN) configured for supporting satellite wireless access by a user equipment (UE) to the serving PLMN, including means for obtaining assistance data from a reference network; and means for sending the assistance data to a satellite NodeB (gNB) for determining a position of the UE, wherein the gNB determines a location and a country for the UE based on the assistance data and measurements of downlink (DL) signals received from the UE, wherein the DL signals are from a plurality of satellites, wherein the gNB performs a verification that the UE is in a country associated with the serving PLMN based on the country determined for the UE.

In one implementation, a non-transitory storage medium including program code stored thereon, the program code is operable to configure at least one processor in a location server associated with a serving public land mobile network (PLMN) for supporting satellite wireless access by a user equipment (UE) to the serving PLMN, the program code comprising instructions to: obtain assistance data from a reference network; and send the assistance data to a satellite NodeB (gNB) for determining a position of the UE, wherein the gNB determines a location and a country for the UE based on the assistance data and measurements of downlink (DL) signals received from the UE, wherein the DL signals are from a plurality of satellites, wherein the gNB performs a verification that the UE is in a country associated with the serving PLMN based on the country determined for the UE.

In one implementation, a method performed by a user equipment (UE) for supporting satellite wireless access by the UE to a serving public land mobile network (PLMN), includes obtaining measurements of downlink (DL) signals received from a plurality of satellites; and sending the measurements of the DL signals to a satellite NodeB (gNB) via a serving communications satellite, wherein the measurements enable the gNB to determine a location and a country for the UE based on assistance data received by the gNB from a location server.

In one implementation, a user equipment (UE) configured for supporting satellite wireless access to a serving public land mobile network (PLMN) includes a wireless transceiver configured to wirelessly communicate with a communication satellite; at least one memory; at least one processor coupled to the wireless transceiver and the at least one memory, wherein the at least one processor is configured to: obtain measurements of downlink (DL) signals received from a plurality of satellites, via the wireless transceiver; and send, via the wireless transceiver, the measurements of the DL signals to a satellite NodeB (gNB) via a serving communications satellite, wherein the measurements enable the gNB to determine a location and a country for the UE based on assistance data received by the gNB from a location server.

In one implementation, a user equipment (UE) configured for supporting satellite wireless access by the UE to a serving public land mobile network (PLMN), includes means for obtaining measurements of downlink (DL) signals received from a plurality of satellites; and means for sending the measurements of the DL signals to a satellite NodeB (gNB) via a serving communications satellite, wherein the measurements enable the gNB to determine a location and a country for the UE based on assistance data received by the gNB from a location server.

In one implementation, a non-transitory storage medium including program code stored thereon, the program code is operable to configure at least one processor in a user equipment (UE) for supporting satellite wireless access to a serving public land mobile network (PLMN), the program code comprising instructions to: obtain measurements of downlink (DL) signals received from a plurality of satellites; and send the measurements of the DL signals to a satellite NodeB (gNB) via a serving communications satellite, wherein the measurements enable the gNB to determine a location and a country for the UE based on assistance data received by the gNB from a location server.

Figure 1:
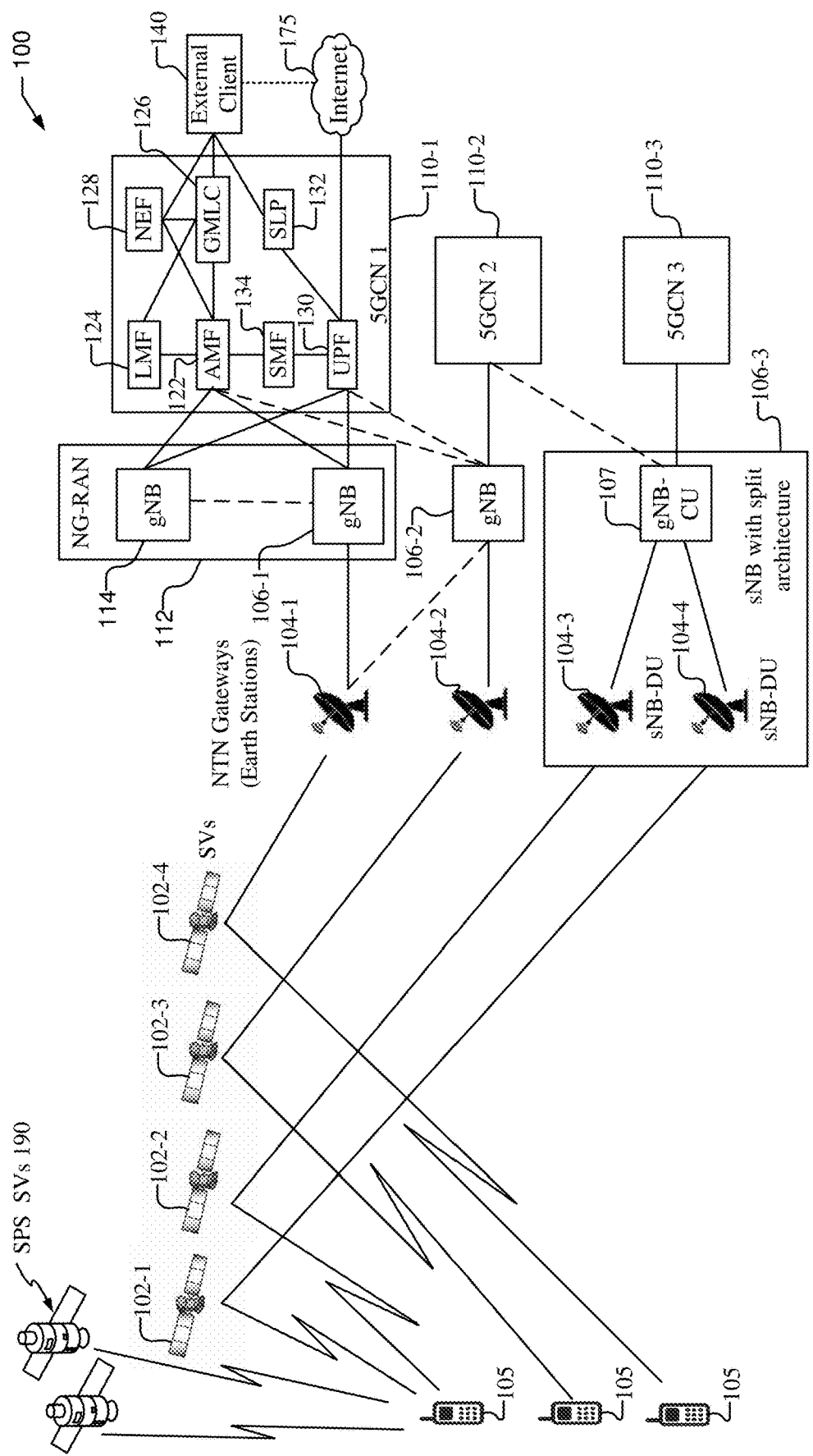
FIG. 1 shows a diagram of a communication system with a network architecture having transparent space vehicles (SVs) that is capable of supporting satellite access to a wireless network.

Like reference symbols in the various drawings indicate like elements, in accordance with certain example implementations. In addition, multiple instances of an element may be indicated by following a first number for the element with a letter or a hyphen and a second number. For example, multiple instances of an element 102 may be indicated as 102-1, 102-2, 102-3 etc. When referring to such an element using only the first number, any instance of the element is to be understood (e.g. element 102 in the previous example would refer to elements 102-1, 102-2, 102-3).

DETAILED DESCRIPTION

Satellites, also referred to as space vehicles (SVs) or communication satellites, may be used in communication systems, for example, using gateways and one or more satellites to relay communication signals between the gateways and one or more UEs. A UE, for example, may access a satellite (instead of a terrestrial base station) which may be connected to an earth station (ES), which is also referred to a ground station or Non-Terrestrial Network (NTN) Gateway. The earth station in turn would connect to an element in a 5G Network such as a modified base station (without a terrestrial antenna) or a network node in a 5G Core Network (5GCN). This element would in turn provide access to other elements in the 5G Network and ultimately to entities external to the 5G Network such as Internet web servers and other user devices.

A rationale for 5G (or other cellular network) satellite access for UEs may include ubiquitous outdoor coverage for both users and Mobile Network Operators (MNOs). For example, in many countries, including the United States, unavailable or poor cellular coverage is a common problem. Moreover, cellular access is not always possible even when there is normally good cellular coverage. For example, cellular access may be hampered due to congestion, physical obstacles, a local cellular outage caused by weather (e.g. a hurricane or tornado), or a local power outage. Satellite access to cellular networks could provide a new independent access potentially available everywhere outdoors. Current satellite capable phones for low Earth orbit (LEO) SVs may be of similar size to a cellular smartphone and, thus, mobile NR support with satellite capable phones need not produce a significant increase in the size of phones. Moreover, satellite capable smartphones may help drive handset sales, and may add revenue for carriers. Potential users, for example, may include anyone with limited or no cellular access, anyone wanting a backup to a lack of cellular access, and anyone involved in public safety or who otherwise needs (nearly) 100% reliable mobile communication. Additionally, some users may desire an improved or more reliable E911 service, e.g., for a medical emergency or vehicle trouble in remote areas.

The use of 5G satellite access may provide other benefits. For example, 5G satellite access may reduce Mobile Network Operator (MNO) infrastructure cost. For example, an MNO may use satellite access to reduce terrestrial base stations, such as NR NodeBs, also referred to as gNBs, and backhaul deployment in sparsely populated areas. Further, 5G satellite access may be used to overcome terrestrial Internet unavailability or blockage, e.g., in certain countries. Additionally, 5G satellite access may provide diversification to Space Vehicle Operators (SVOs). For example, 5G NR satellite access could provide another revenue stream to SVOs who would otherwise provide fixed Internet access.

In order to enable 5G satellite access by a UE to a public land mobile network (PLMN), it may be necessary (e.g. due to national regulatory requirements) to enable the PLMN to determine or verify a country in which the UE is located during 5G satellite access to ensure that the UE is located in the same country as the PLMN. It may then be desirable that the network, rather than the UE, perform this determination or verification, as the UE may not be trusted to perform a reliable determination. For example, a user who is subject to regulatory services, such as being a target of lawful interception (LI), might use 5G satellite access to gain access to a PLMN in another country where lawful interception is not in effect. Access to PLMNs in another country may be possible by a UE because a radio beam coverage of a low Earth orbit (LEO), medium Earth orbit (MEO) or geostationary (GEO) satellite may be up to or more than 1000 kms across and thereby provide access to more than one country. As a consequence, due to regulatory services, such as LI, as well as for emergency calls and wireless emergency alerting, it may be desirable or required that a UE always access a PLMN that is in the same country as the UE, with the network, rather than UE, verifying this condition. Additionally, due to signaling, overhead, latency and/or regulatory considerations, it may also be preferred that a Next Generation (NG) Radio Access Network (RAN) (NG-RAN), rather than a 5GCN, perform the location and country determination for the UE. For example, there may be problems in supporting location of a large number of UEs on a frequent basis by a 5GCN or NG-RAN. For example, in the case of 5GCN, latency (e.g. 15-30 seconds) may be a significant problem, along with an extra load placed on the 5GCN. In the case of the NG-RAN, on the other hand, there may be a problem with an inability of base stations as currently defined by the Third Generation Partnership Project (3GPP) to accurately and reliably locate a UE. Accordingly, efficient and reliable methods to support network, and particularly, NG-RAN, verification of UE country are desirable.

In one implementation, UE assisted location determination by the NG-RAN is employed. UEs that support 5G satellite access may support UE based location determination, which may enable UE verification of the UE location and country for scenarios where network verification is not needed. For scenarios where network verification is needed, a serving gNB for a UE can request a set of DL measurements obtained by the UE from a plurality of satellites, e.g., GNSS satellites and/or communication satellites. The serving gNB may then either compute the UE location itself or forward the measurements to a separate server for location computation.

To assist in the computation of the UE location by the serving gNB, the serving gNB may receive assistance data from a location server in the network. The location server, for example, may obtain the assistance data from a reference network, and may send the assistance data to the serving gNB, e.g., periodically, when updates are available, upon request, etc. The assistance data, for example, may be for satellites. The serving gNB may use the assistance data with the DL measurements obtained from the UE to determine the location and country of the UE, which may be used to verify that the UE is in a country associated with the serving PLMN.

FIG. 1 shows a diagram of a communication system 100 capable of supporting satellite access using 5G New Radio (NR) or some other wireless access type such as Code Division Multiple Access (CDMA), according to an embodiment. FIG. 1 illustrates a network architecture with transparent space vehicles (SVs). A transparent SV may implement frequency conversion and a radio frequency (RF) amplifier in both uplink (UL) and downlink (DL) directions and may correspond to an analog RF repeater. A transparent SV, for example, may receive uplink (UL) signals from all served UEs and may redirect the combined signals DL to an earth station without demodulating or decoding the signals. Similarly, a transparent SV may receive an UL signal from an earth station and may redirect the signal DL to served UEs without demodulating or decoding the signal. However, the SV may frequency convert received signals and may amplify and/or filter received signals before transmitting the signals.

The communication system 100 comprises a number of UEs 105, a number of SVs 102-1 to 102-4 (collectively referred to herein as SVs 102), a number of Non-Terrestrial Network (NTN) gateways 104-1 to 104-4 (collectively referred to herein as NTN gateways 104) (sometimes referred to herein simply as gateways 104, earth stations 104, or ground stations 104), a number of gNBs 106-1 to 106-3 capable of communication with UEs via SVs 102 and referred to herein as satellite NodeBs (collectively referred to herein as gNBs 106) and that are part of a Next Generation (NG) Radio Access Network (RAN) (NG-RAN) 112.

It is noted that the term "gNB" traditionally refers to an NR NodeB base station used for terrestrial access with a New Radio (NR) radio interface. The same term (gNB) may also be used to refer to a base station supporting satellite access with an NR radio interface. The two variants of gNB (satellite and terrestrial) may support many of the same functions, protocols and interfaces, but are also distinct in other ways. To distinguish gNBs supporting terrestrial access from gNBs supporting satellite access, different labels are used herein. A gNB could also support both terrestrial and satellite NR access, though, for simplification, this is not further discussed here.

The communication system 100 is illustrated as further including components of a number of Fifth Generation (5G) networks including 5G Core Networks (5GCNs) 110-1 to 110-3 (collectively referred to herein as 5GCNs 110). The 5GCNs 110 may be public land mobile networks (PLMN) that may be located in the same or in different countries.

FIG. 1 illustrates various components within 5GCN1 110-1 that may operate with the NG-RAN 112. It should be understood that 5GCN2 110-2 and 5GCN3 110-3 may include identical, similar or different components and associated NG-RANs, which are not illustrated in FIG. 1 in order to avoid unnecessary obfuscation. A 5G network may also be referred to as a New Radio (NR) network; NG-RAN 112 may be referred to as a 5G RAN or as an NR RAN; and 5GCN 110 may be referred to as an NG Core network (NGC). The communication system 100 may further utilize information from space vehicles (SVs) 190 for Satellite Positioning System (SPS) including Global Navigation Satellite Systems (GNSS) like Global Positioning System (GPS), GLObal NAvigation Satellite System (GLONASS), Galileo or Beidou or some other local or regional SPS, such as Indian Regional Navigation Satellite System (IRNSS), European Geostationary Navigation Overlay Service (EGNOS), or Wide Area Augmentation System (WAAS), all of which are sometimes referred to herein as GNSS. It is noted that SVs 190 act as navigation SVs and are separate and distinct from SVs 102, which act as communication SVs. However, it is not precluded that some of SVs 190 may also act as some of SVs 102 and/or that some of SVs 102 may also act as some of SVs 190. In some implementations, for example, the SVs 102 may be used for both communication and positioning. Additional components of the communication system 100 are described below. The communication system 100 may include additional or alternative components.

Permitted connections in the communication system 100 having the network architecture with transparent SVs illustrated in FIG. 1, allow a gNB 106 to access multiple Earth stations 104 and/or multiple SVs 102. A gNB 106, e.g., illustrated by gNB 106-2, may also be shared by multiple PLMNs (5GCNs 110), which may all be in the same country or possibly in different countries, and an earth station 104, e.g., illustrated by earth station 104-1, may be shared by more than one gNB 106.

It should be noted that FIG. 1 provides only a generalized illustration of various components, any or all of which may be utilized as appropriate, and each of which may be duplicated or omitted, as necessary. Specifically, although only three UEs 105 are illustrated, it will be understood that many UEs (e.g., hundreds, thousands, millions, etc.) may utilize the communication system 100. Similarly, the communication system 100 may include a larger (or smaller) number of SVs 190, SVs 102, earth stations 104, gNBs 106, NG-RAN 112, gNBs 114, 5GCNs 110, external clients 140, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, 4G Long Term Evolution (LTE), etc.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 112 and 5GCN 140), etc. The UE 105 may also support wireless communication using a Wireless Local Area Network (WLAN) which may connect to other networks (e.g. the Internet) using a Digital Subscriber Line (DSL) or packet cable for example. The UE 105 further supports wireless communications using space vehicles, such as SVs 102. The use of one or more of these RATs may allow the UE 105 to communicate with an external client 140 (via elements of 5GCN 110 not shown in FIG. 1, or possibly via a Gateway Mobile Location Center (GMLC) 126).

The UE 105 may include a single entity or may include multiple entities such as in a personal area network where a user may employ audio, video and/or data I/O devices and/or body sensors and a separate wireline or wireless modem.

The UE 105 may support position determination, e.g., using signals and information from space vehicles 190 in an SPS, such as GPS, GLONASS, Galileo or Beidou or some other local or regional SPS such as IRNSS, EGNOS or WAAS, all of which may be generally referred to herein as GNSS. Position measurements using SPS are based on measurements of propagation delay times of SPS signals broadcast from a number of orbiting SVs 190 to an SPS receiver in the UE 105. Once the SPS receiver has measured the signal propagation delays for each satellite, the range to each satellite can be determined and precise navigation information including 3-dimensional position, velocity and time of day of the SPS receiver can then be determined using the measured ranges and the known locations of the SVs 190. Positioning methods which may be supported using SVs 190 may include Assisted GNSS (A-GNSS), Real Time Kinematic (RTK), Precise Point Positioning (PPP) and Differential GNSS (DGNSS). Information and signals from SVs 102 may also be used to support positioning. The UE 105 may further support positioning using terrestrial positioning methods, such as Downlink (DL) Time Difference of Arrival (DL-TDOA), Enhanced Cell ID (ECID), Round Trip signal propagation Time (RTT), multi-cell RTT, angle of arrival (AOA), angle of departure (AOD), time of arrival (TOA), receive-time transmission-time difference (Rx-Tx) and/or other positioning methods. It is noted that the terms "position method" and "positioning method" can be synonymous and can be used interchangeably.

An estimate of a location of the UE 105 may be referred to as a geodetic location, location, location estimate, location fix, fix, position, position estimate or position fix, and may be geodetic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

The UEs 105 are configured to communicate with 5GCNs 110 via the SVs 102, earth stations 104, and gNBs 106. As illustrated by NG-RAN 112, the NG-RANs associated with the 5GCNs 110 may include one or more gNBs 106. The NG-RAN 112 may further include a number of terrestrial gNBs, as exemplified by gNB 114, that are not capable of communication with UEs via SVs 102. Pairs of terrestrial and/or satellite base stations, e.g., gNB 114 and gNB 106-1 in NG-RAN 112, may be connected to one another using terrestrial links—e.g. directly or indirectly via other gNBs 114 or gNBs 106 and communicate using an Xn interface. Access to the 5G network is provided to UEs 105 via wireless communication between each UE 105 and a serving gNB 106, via an SV 102 and an earth station 104. The gNBs 106 may provide wireless communications access to the 5GCN 110 on behalf of each UE 105 using 5G NR. 5G NR radio access may also be referred to as NR radio access or as 5G radio access and may be as defined by the Third Generation Partnership Project (3GPP).

Base stations (BSs) in the NG-RAN 112 shown in FIG. 1 may also or instead include a next generation evolved Node B, also referred to as an ng-eNB (not shown in FIG. 1). An ng-eNB may be connected to one or more gNBs 106 and/or gNBs 114 in NG-RAN 112—e.g. directly or indirectly via other gNBs 106, gNBs 114 and/or other ng-eNBs. An ng-eNB may provide LTE wireless access and/or evolved LTE (eLTE) wireless access to a UE 105.

A satellite NodeB (gNB 106) may be referred to by other names or terms such as an sNB or a "satellite node" or "satellite access node." The gNBs 106 are not the same as a terrestrial gNB 114, but may be based on a terrestrial gNB 114 with additional capability. For example, a gNB 106 may terminate the radio interface and associated radio interface protocols to UEs 105 and may transmit DL signals to UEs 105 and receive UL signals from UEs 105 via SVs 102 and earth stations 104. A gNB 106 may also support signaling connections and voice and data bearers to UEs 105 and may support handover of UEs 105 between different radio cells for the same SV 102, between different SVs 102 and/or between different gNBs 106. In some systems, a gNB 106 may be referred to as a gNB or as an enhanced gNB. The gNBs 106 may be configured to manage moving radio beams (for LEO SVs) and associated mobility of UEs 105. The gNBs 106 may assist in the handover (or transfer) of SVs 102 between different Earth stations 104, different gNBs 106, and between different countries. The gNBs 106 may hide or obscure specific aspects of connected SVs 102 from the 5GCN 110, e.g. by interfacing to a 5GCN 110 in the same way or in a similar way to a gNB 114, and may avoid a 5GCN 110 from having to maintain configuration information for SVs 102 or perform mobility management related to SVs 102. The gNBs 106 may further assist in sharing of SVs 102 over multiple countries.

The gNBs 106 may communicate with one or more earth stations 104, e.g., as illustrated by gNB 106-2 communicating with earth stations 104-2 and 104-1. The gNBs 106 may be separate from earth stations 104, e.g., as illustrated by gNBs 106-1 and 106-2, and earth stations 104-1 and 104-2. The gNBs 106 may include or may be combined with one or more earth stations 104, e.g., using a split architecture. For example, gNB 106-3 is illustrated with a split architecture, with a gNB central unit (gNB-CU) 107 and the earth stations 104-3 and 104-4 acting as Distributed Units (DUs) (which may sometimes be referred to as gNB-DU 104-3 and gNB-DU 104-4). A gNB 106 may typically be fixed on the ground with transparent SV operation. In one implementation, one gNB 106 may be physically combined with, or physically connected to, one earth station 104 to reduce complexity and cost.

The earth stations 104 may be shared by more than one gNB 106 and may communicate with UE 105 via the SVs 102. An earth station 104 may be dedicated to just one SVO and to one associated constellation of SV 102 and hence may be owned and managed by the SVO. While earth stations 104 may be included within a gNB 106, e.g., as a gNB-DU within gNB 106-3, this may only occur when the same SVO or the same MNO owns both the gNB 106 and the included earth stations 104. Earth stations 104 may communicate with SVs 102 using control and user plane protocols that may be proprietary to an SVO. The control and user plane protocols between earth stations 104 and SVs 102 may: (i) establish and release Earth Station 104 to SV 102 communication links, including authentication and ciphering; (ii) update SV software and firmware; (iii) perform SV Operations and Maintenance (O&M); (iv) control radio beams (e.g., direction, power, on/off status) and mapping between radio beams and earth station uplink (UL) and downlink (DL) payload; and (v) assist with handoff of an SV 102 or radio cell to another Earth station 104.

As noted, while FIG. 1 depicts nodes configured to communicate according to 5G NR protocols for an NG-RAN 112, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 105, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 112 and the EPC corresponds to 5GCN 110 in FIG. 1. An eNB in the E-UTRAN may then support LTE satellite access by a UE 105 via SVs 102 by connecting to an earth station 104 and to entities in the EPC such as a Mobility Management Entity (MME) and a Serving Gateway (SGW) plus Packet Data network Gateway (PDG). Similarly, an ng-eNB in the NG-RAN 112 may support LTE satellite access by a UE 105 via SVs 102 by connecting to an earth station 104 and to entities in a 5GCN 110 such as an AMF 122 and UPF 130. The methods and techniques described herein for support of RAN location in a gNB 106 may be applicable to such other networks, e.g. to support RAN location by an eNB in an E-UTRAN or by an ng-eNB in NG-RAN 112.

The gNBs 106 and gNBs 114 may communicate with an Access and Mobility Management Function (AMF) 122 in a 5GCN 110, which, for positioning functionality, may communicate with a Location Management Function (LMF) 124. For example, the gNBs 106 may provide an N2 interface to the AMF 122. An N2 interface between a gNB 106 and a 5GCN 110 may be the same as, or similar to, an N2 interface supported between a gNB 114 and a 5GCN 110 for terrestrial NR access by a UE 105 and may use the Next Generation Application Protocol (NGAP) defined in 3GPP Technical Specification (TS) 38.413 between a gNB 106 and the AMF 122. The AMF 122 may support mobility of the UE 105, including radio cell change and handover and may participate in supporting a signaling connection to the UE 105 and possibly data and voice bearers for the UE 105. The LMF 124 may support positioning of the UE 105 when UE accesses the NG-RAN 112 and may support position procedures/methods such as A-GNSS, DL-TDOA, RTK, PPP, DGNSS, ECID, AOA, AOD, multi-cell RTT and/or other positioning procedures including positioning procedures based on communication signals from one or more SVs 102. The LMF 124 may also process location services requests for the UE 105, e.g., received from the AMF 122 or from a Gateway Mobile Location Center (GMLC) 126. The LMF 124 may be connected to AMF 122 and/or to GMLC 126. In some embodiments, a node/system that implements the LMF 124 may additionally or alternatively implement other types of location-support modules, such as an Enhanced Serving Mobile Location Center (E-SMLC). It is noted that in some embodiments, at least part of the positioning functionality (including derivation of a location of UE 105) may be performed at the UE 105 (e.g., using signal measurements obtained by UE 105 for signals transmitted by SVs 102, SVs 190, gNBs 114 and assistance data provided to the UE 105, e.g. by LMF 124).

The GMLC 126 may support a location request for the UE 105 received from an external client 140 and may forward such a location request to the AMF 122 for forwarding by the AMF 122 to the LMF 124 or may forward the location request directly to the LMF 124. A location response from the LMF 124 (e.g. containing a location estimate for the UE 105) may be similarly returned to the GMLC 126 either directly or via the AMF 122, and the GMLC 126 may then return the location response (e.g., containing the location estimate) to the external client 140. The GMLC 126 is shown connected to both the AMF 122 and LMF 124 in FIG. 1 though only one of these connections may be supported by 5GCN 110 in some implementations.

A Network Exposure Function (NEF) 128 may be included in 5GCN 110, e.g., connected to the GMLC 126 and the AMF 122. In some implementations, the NEF 128 may be connected to communicate directly with the external client 140. The NEF 128 may support secure exposure of capabilities and events concerning 5GCN 110 and UE 105 to an external client 140 and may enable secure provision of information from external client 140 to 5GCN 110.

A User Plane Function (UPF) 130 may support voice and data bearers for UE 105 and may enable UE 105 voice and data access to other networks such as the Internet 175. The UPF 130 may be connected to gNBs 106 and gNBs 114. UPF 130 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 130 may be connected to a Secure User Plane Location (SUPL) Location Platform (SLP) 132 to enable support of positioning of UE 105 using SUPL. SLP 132 may be further connected to or accessible from external client 140.

As illustrated, a Session Management Function (SMF) 134 connects to the AMF 122 and the UPF 130. The SMF 134 may have the capability to control both a local and a central UPF within a PDU session. SMF 134 may manage the establishment, modification and release of PDU sessions for UE 105, perform IP address allocation and management for UE 105, act as a Dynamic Host Configuration Protocol (DHCP) server for UE 105, and select and control a UPF 130 on behalf of UE 105.

The external client 140 may be connected to the core network 110 via the GMLC 126 and/or the SLP 132, and/or NEF 128. The external client 140 may optionally be connected to the core network 110 and/or to a location server, which may be, e.g., an SLP, that is external to 5GCN 110, via the Internet 175. The external client 140 may be connected to the UPF 130 directly (not shown in FIG. 1) or through the Internet 175. The external client 140 may be a server, a web server, or a user device, such as a personal computer, a UE, etc.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GCN 110 may be configured to control different air interfaces. For example, in some embodiments, 5GCN 110 may be connected to a WLAN, either directly or using a Non-3GPP InterWorking Function (N3IWF, not shown FIG. 1) in the 5GCN 110. For example, the WLAN may support IEEE 802.11 WiFi access for UE 105 and may comprise one or more WiFi APs. Here, the N3IWF may connect to the WLAN and to other elements in the 5GCN 110 such as AMF 122.

Support of transparent SVs 102 with the network architecture shown in FIG. 1 may impact the communication system as follows. The 5GCN 110 may treat a satellite RAT as a new type of terrestrial RAT with longer delay, reduced bandwidth and higher error rate. Consequently, while there may be some impact to Protocol Data Unit (PDU) session establishment and mobility management (MM) and connection management (CM) procedures, impacts to a 5GCN 110 may still be small. There may be no impact to the SVs 102. The SVs 102 may be shared with other services (e.g. satellite TV, fixed Internet access) with 5G NR mobile access for UEs added in a transparent manner. This may enable legacy SVs 102 to be used and may avoid the need to deploy a new type of SV 102. Further, the gNBs 106 may be fixed and may be configured to support one country or a few countries and one or more PLMNs in that country or in those countries. The gNBs 106 may need to assist assignment and transfer of SVs 102 and radio cells between gNBs 106 and earth stations 104 and support handover of UEs 105 between radio cells, SVs 102 and other gNBs 106. Thus, the gNB 106 may differ from a terrestrial gNB 114. Additionally, a coverage area of a gNB 106 may be much larger than the coverage area of a gNB 114.

Figure 2:
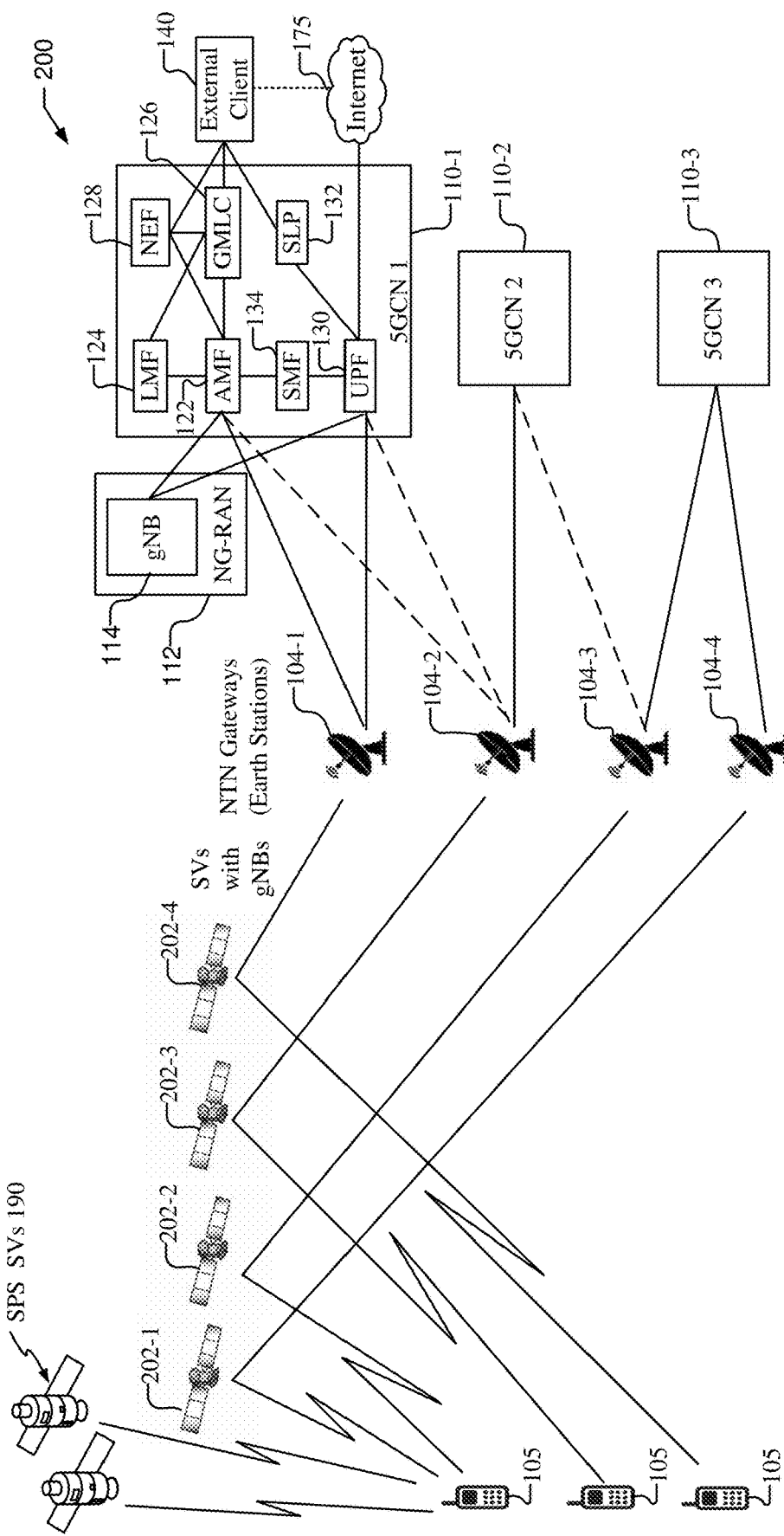
FIG. 2 shows a diagram of a communication system with a network architecture having regenerative SVs that is capable of supporting satellite access to a wireless network.

FIG. 2 shows a diagram of a communication system 200 capable of supporting satellite access using 5G New Radio (NR) or some other wireless access type such as Code Division Multiple Access (CDMA), according to an embodiment. The network architecture shown in FIG. 2 is similar to that shown in FIG. 1, like designated elements being similar or the same. FIG. 2, however, illustrates a network architecture with regenerative SVs 202-1, 202-2, 202-3, and 202-4 (collectively SVs 202), as opposed to transparent SVs 102 shown in FIG. 1. A regenerative SV 202, unlike a transparent SV 102, includes an on-board satellite NodeB, referred to as a gNB 202, which may include the functional capability of a gNB 106, and is sometimes referred to herein as an SV/gNB 202. The NG-RAN 112 is illustrated as including the SV/gNBs 202. Reference to a gNB 202 is used herein when referring to SV/gNB 202 functions related to communication with UEs 105 and 5GCNs 110, whereas reference to an SV 202 is used when referring to SV/gNB 202 functions related to communication with earth stations 104 and with UEs 105 at a physical radio frequency level. However, there may be no precise delimitation of an SV 202 versus a gNB 202.

An onboard gNB 202 may perform some or all of the same functions as a gNB 106 as described previously. For example, a gNB 202 may terminate the radio interface and associated radio interface protocols to UEs 105 and may transmit DL signals to UEs 105 and receive UL signals from UEs 105, which may include encoding and modulation of transmitted signals and demodulation and decoding of received signals. A gNB 202 may also support signaling connections and voice and data bearers to UEs 105 and may support handover of UEs 105 between different radio cells for the same gNB 202 and between different gNBs 202. The gNBs 202 may assist in the handover (or transfer) of SVs 202 between different Earth stations 104, different 5GCNs 110, and between different countries. The gNBs 202 may hide or obscure specific aspects of SVs 202 from the 5GCN 110, e.g. by interfacing to a 5GCN 110 in the same way or in a similar way to a gNB 114. The gNBs 202 may further assist in sharing of SVs 202 over multiple countries. The gNBs 202 may communicate with one or more earth stations 104 and with one or more 5GCNs 110 via the earth stations 104. In some implementations, gNBs 202 may communicate directly with other gNBs 202 using Inter-Satellite Links (ISLs) (not shown in FIG. 2), which may support an Xn interface between any pair of gNBs 202.

With LEO SVs, an SV/gNB 202 needs to manage moving radio cells with coverage in different countries at different times. Earth stations 104 may be connected directly to the 5GCN 110, as illustrated. For example, as illustrated, earth station 104-1 may be connected to AMF 122 and UPF 130 of 5GCN1 110-1, while earth station 104-2 may be similarly connected to 5GCN2 110-2, and earth stations 104-3 and 104-4 are connected to 5GCN3 110-3. The earth stations 104 may be shared by multiple 5GCNs 110, for example, if Earth stations 104 are limited. For example, in some implementations (illustrated with dotted lines), earth station 104-2 may be connected to both 5GCN1 110-1 and 5GCN2 110-2, and earth station 104-3 may be connected to both 5GCN2 110-2 and 5GCN3 110-3. The 5GCN 110 may need to be aware of SV 202 coverage areas in order to page UEs 105 and to manage handover. Thus, as can be seen, the network architecture with regenerative SVs may have more impact and complexity with respect to both gNBs 202 and 5GCNs 110 than the network architecture with transparent SVs 102 shown in FIG. 1.

Support of regenerative SVs 202 with the network architecture shown in FIG. 2 may impact the communication system 200 as follows. The 5GCN 110 may be impacted if fixed TAs and cells are not supported, since core components of mobility management and regulatory services, which are typically based on fixed cells and fixed TAs for terrestrial PLMNs, might have to be replaced by a new system (e.g. based on UE 105 location). If fixed TAs and fixed cells are supported, a 5GCN 110 (e.g. the AMF 122) may need to map any fixed TA to one or SVs 202 with current radio coverage of the TA when performing paging of a UE 105 that is located in this TA. This could require configuration in the 5GCN 110 of long term orbital data for SVs 202 (e.g. obtained from an SVO for SVs 202) and could add significant new impact to a 5GCN 110.

Legacy SVs could need a substantial software (SW) update to support gNB 202 functions, which may not be feasible. An SV 202 would also need to fully support all UEs 105 accessing the SV 202, which could be problematic with a legacy SV due to limited processing and storage capability. Hence, an SV 202 may need to comprise new hardware (HW) and SW rather than being based on a SW upgrade to an existing SV. A new SV/gNB 202 may need to support regulatory and other requirements for multiple countries. A GEO SV 202 coverage area would typically include several or many countries, whereas a LEO or MEO SV 202 would typically orbit over many countries. Support of fixed TAs and fixed cells may then require that an SV/gNB 202 be configured with fixed TAs and fixed cells for an entire worldwide coverage area. Alternatively, AMFs 122 (or LMFs 124) in individual 5GCNs 110 could support fixed TAs and fixed cells for the associated PLMN to reduce SV/gNB 202 complexity and at the expense of more 5GCN 110 complexity. Additionally, SV/gNB 202 to SV/gNB 202 ISLs would typically change dynamically as relative SV/gNB 202 positions change, making Xn related procedures more complex.

A regenerative SV, similar to SV 202 in FIG. 2, could also be supported using an onboard eNB or onboard ng-eNB, instead of an onboard gNB 106, to support LTE satellite access by a UE 105 to either an EPC (for an onboard eNB) or 5GCN 110 (for an onboard ng-eNB). The methods and techniques described herein for support of RAN location in a gNB 202 may then be applicable to LTE satellite access via the onboard eNB or ng-eNB.

Figure 3:
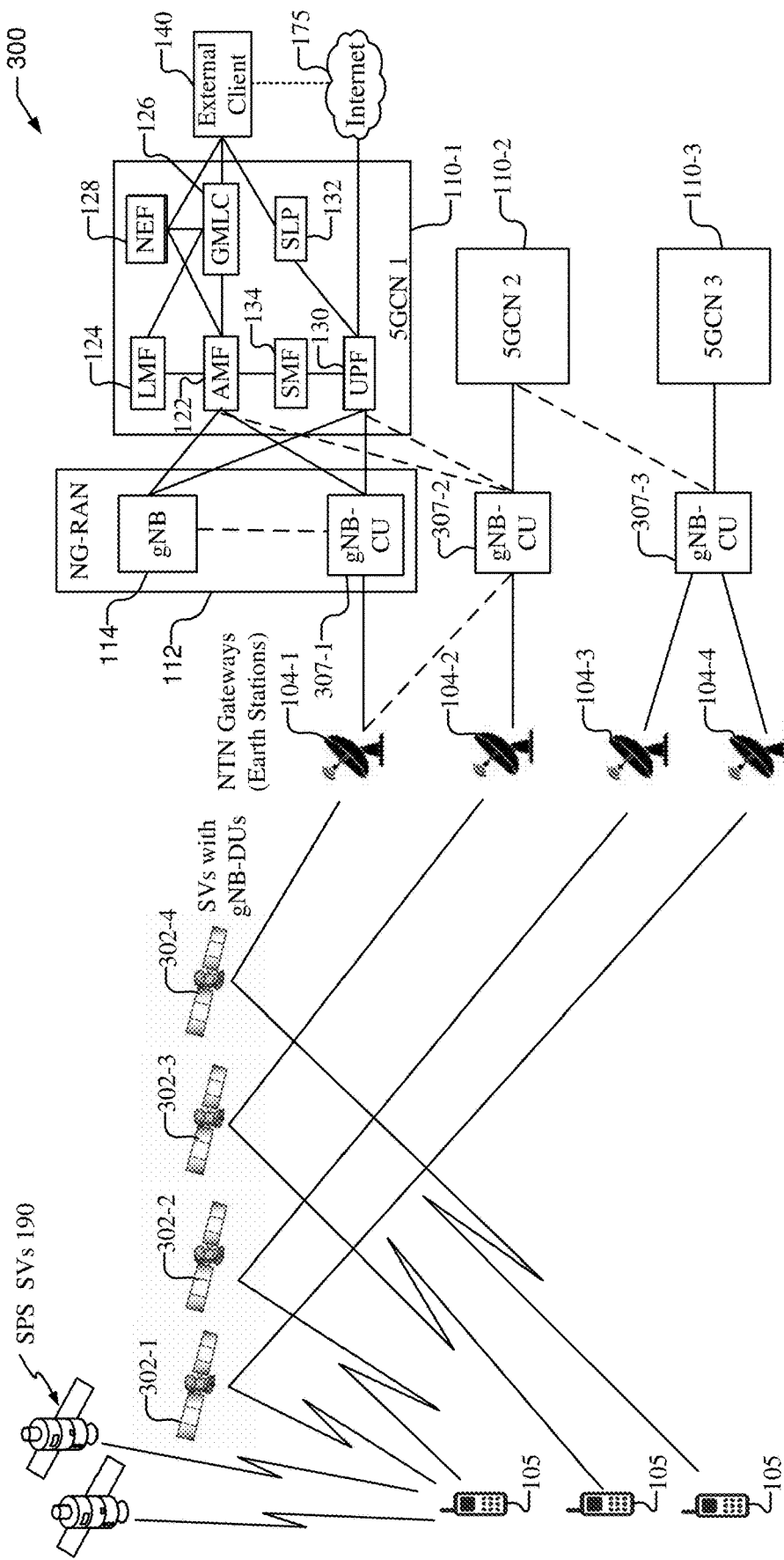
FIG. 3 shows a diagram of a communication system with a network architecture having regenerative SVs and a split satellite Node B (gNB) architecture that is capable of supporting satellite access to a wireless network.

FIG. 3 shows a diagram of a communication system 300 capable of supporting satellite access using 5G New Radio (NR) or some other wireless access type such as Code Division Multiple Access (CDMA), according to an embodiment. The network architecture shown in FIG. 3 is similar to that shown in FIGS. 1 and 2, like designated elements being similar or the same. FIG. 3, however, illustrates a network architecture with regenerative SVs 302-1, 302-2, 302-3, and 302-4 (collectively referred to as SVs 302), as opposed to transparent SVs 102 shown in FIG. 1, and with a split architecture for the satellite NodeBs. The satellite NodeBs, referred to as gNBs 307, include a central unit and may sometimes be referred as gNB-CU 307. A regenerative SV 302, unlike a transparent SV 102, includes an on-board gNB Distributed Unit (gNB-DU) 302, and is sometimes referred to herein as an SV/gNB-DU 302. Reference to a gNB-DU 302 is used herein when referring to SV/gNB 302 functions related to communication with UEs 105 and gNB-CUs 307, whereas reference to an SV 302 is used when referring to SV/gNB-DU 302 functions related to communication with earth stations 104 and with UEs 105 at a physical radio frequency level. However, there may be no precise delimitation of an SV 302 versus a gNB-DU 302.

Each gNB-DU 302 communicates with one ground based gNB-CU 307 via one or more earth stations 104. One gNB-CU 307 together with the one or more gNB-DUs 302 which are in communication with the gNB-CU 307 performs functions, and may use internal communication protocols, which are similar to or the same as a gNB 114 with a split architecture as described in 3GPP Technical Specification (TS) 38.401. Here a gNB-DU 302 corresponds to and performs functions similar to or the same as a gNB Distributed Unit (gNB-DU) defined in TS 38.401, while a gNB-CU 307 corresponds to and performs functions similar to or the same as a gNB Central Unit (gNB-CU) defined in TS 38.401. For example, a gNB-DU 302 and a gNB-CU 307 may communicate with one another using an F1 Application Protocol (F1AP) as defined in 3GPP TS 38.473 and together may perform some or all of the same functions as a gNB 106 or gNB 202 as described previously. To simplify references to different types of gNB is the description below, a gNB-DU 302 may sometimes be referred to a gNB 302 (without the "DU" label), and a gNB-CU 307 may sometimes be referred to a gNB 307 (without the "CU" label).

A gNB-DU 302 may terminate the radio interface and associated lower level radio interface protocols to UEs 105 and may transmit DL signals to UEs 105 and receive UL signals from UEs 105, which may include encoding and modulation of transmitted signals and demodulation and decoding of received signals. A gNB-DU 302 may support and terminate Radio Link Control (RLC), Medium Access Control (MAC) and Physical (PHY) protocol layers for the NR Radio Frequency (RF) interface to UEs 105, as defined in 3GPP TSs 38.201, 38.202, 38.211, 38.212, 38.213, 38.214, 38.215, 38.321 and 38.322. The operation of a gNB-DU 302 is partly controlled by the associated gNB-CU 307. One gNB-DU 307 may support one or more NR radio cells for UEs 105. A gNB-CU 307 may support and terminate a Radio Resource Control (RRC) protocol, Packet Data Convergence Protocol (PDCP) and Service Data Protocol (SDAP) for the NR RF interface to UEs 105, as defined in 3GPP TSs 38.331, 38.323, and 37.324, respectively. A gNB-CU 307 may also be split into separate control plane (gNB-CU-CP) and user plane (gNB-CU-UP) portions, where a gNB-CU-CP communicates with one or more AMFs 122 in one more 5GCNs 110 using the NGAP protocol and where a gNB-CU-UP communicates with one or more UPFs 130 in one or more 5GCNs 110 using a General Packet Radio System (GPRS) tunneling protocol (GTP) user plane protocol (GTP-U) as defined in 3GPP TS 29.281. A gNB-DU 302 and gNB-CU 307 may communicate over an F1 interface to (a) support control plane signaling for a UE 105 using Internet Protocol (IP), Stream Control Transmission Protocol (SCTP) and F1 Application Protocol (FLAP) protocols, and (b) to support user plane data transfer for a UE using IP, User Datagram Protocol (UDP), PDCP, SDAP, GTP-U and NR User Plane Protocol (NRUPP) protocols.

A gNB-CU 307 may communicate with one or more other gNB-CUs 307 and/or with one more other gNBs 114 using terrestrial links to support an Xn interface between any pair of gNB-CUs 302 and/or between any gNB-CU 307 and any gNB 114.

A gNB-DU 302 together with a gNB-CU 307 may: (i) support signaling connections and voice and data bearers to UEs 105; (ii) support handover of UEs 105 between different radio cells for the same gNB-DU 302 and between different gNB-DUs 302; and (iii) assist in the handover (or transfer) of SVs 302 between different Earth stations 104, different 5GCNs 110, and between different countries. A gNB-CU 307 may hide or obscure specific aspects of SVs 302 from a 5GCN 110, e.g. by interfacing to a 5GCN 110 in the same way or in a similar way to a gNB 114. The gNB-CUs 307 may further assist in sharing of SVs 302 over multiple countries.

In communication system 300, the gNB-DUs 302 that communicate with and are accessible from any gNB-CU 307 will change over time with LEO SVs 302. With the split gNB architecture, a 5GCN 110 may connect to fixed gNB-CUs 307 which do not change over time and which may reduce difficulty with paging of a UE 105. For example, a 5GCN 110 may not need to know which SV/gNB-DUs 302 are needed for paging a UE 105. The network architecture with regenerative SVs 302 with a split gNB architecture may thereby reduce 5GCN 119 impact at the expense of additional impact to a gNB-CU 307.

Support of regenerative SVs 302 with a split gNB architecture as shown in FIG. 3 may impact the communication system 300 as follows. The impact to 5GCN 110 may be limited as for transparent SVs 102 discussed above. For example, the 5GCN 110 may treat a satellite RAT in communication system 300 as a new type of terrestrial RAT with longer delay, reduced bandwidth and higher error rate. The impact on SV/gNB-DUs 302 may be less than the impact on SV/gNBs 202 (with non-split architecture), as discussed above in reference to FIG. 2. The SV/gNB-DU 302 may need to manage changing association with different (fixed) gNB-CUs 307. Further, an SV/gNB-DU 302 may need to manage radio beams and radio cells. The gNB-CU 307 impacts may be similar to gNB 106 impacts for a network architecture with transparent SVs 102, as discussed above, except for impacts to support a changing set of gNB-DUs 302.

There are several SVOs currently operating and several additional SVOs that are preparing to begin operations that may be capable of supporting satellite access using 5G NR or some other wireless access type such as CDMA. Various SVOs may employ different numbers of LEO SVs and Earth gateways and may use different technologies. For example, currently operating SVOs include SVOs using transparent ("bent pipe") LEO SVs with CDMA, and regenerative LEO SVs capable of ISL. New SVOs have been recently announced with plans for large constellations of LEO SVs to support fixed Internet access. These various SVOs are widely known to the industry.

While supporting satellite access to a wireless network, an SV 102/202/302 may transmit radio beams (also referred to just as "beams") over multiple countries. For example, a beam transmitted by an SV 102/202/302 may overlap two or more countries. Sharing a beam over two or more countries, however, may raise complication. For example, if a beam is shared by two or more countries, earth stations 104 and gNBs 106/202/302/307 in one country may need to support UE 105 access from other countries. Sharing a beam over multiple countries may raise security issues for privacy if both data and voice. Further, sharing an SV beam over multiple countries may raise regulatory conflicts. For example, regulatory services including WEA, LI, and EM calls in a first country could need support from gNBs 106/202/307 and earth stations 104 in a second country that shares the same SV beam.

One solution to complications raised by beam sharing amongst multiple countries is to permit UEs 105 in different countries to access the same radio beam or radio cell but to restrict which PLMNs (e.g. 5GCNs 110) a UE 105 is allowed to access. For example, a UE 105 may only be permitted to access a 5GCN 110 when the UE is located in the same country as the 5GCN 110. Enforcing such a restriction may require an ability to locate the UE 105 by a gNB 106, gNB 202 or gNB-CU 307, determine a country for the UE 105 and then verify whether the country determined for the UE 105 is the same as a country of a 5GCN 110 for a serving PLMN or prospective serving PLMN for the UE 105.

Figure 4:
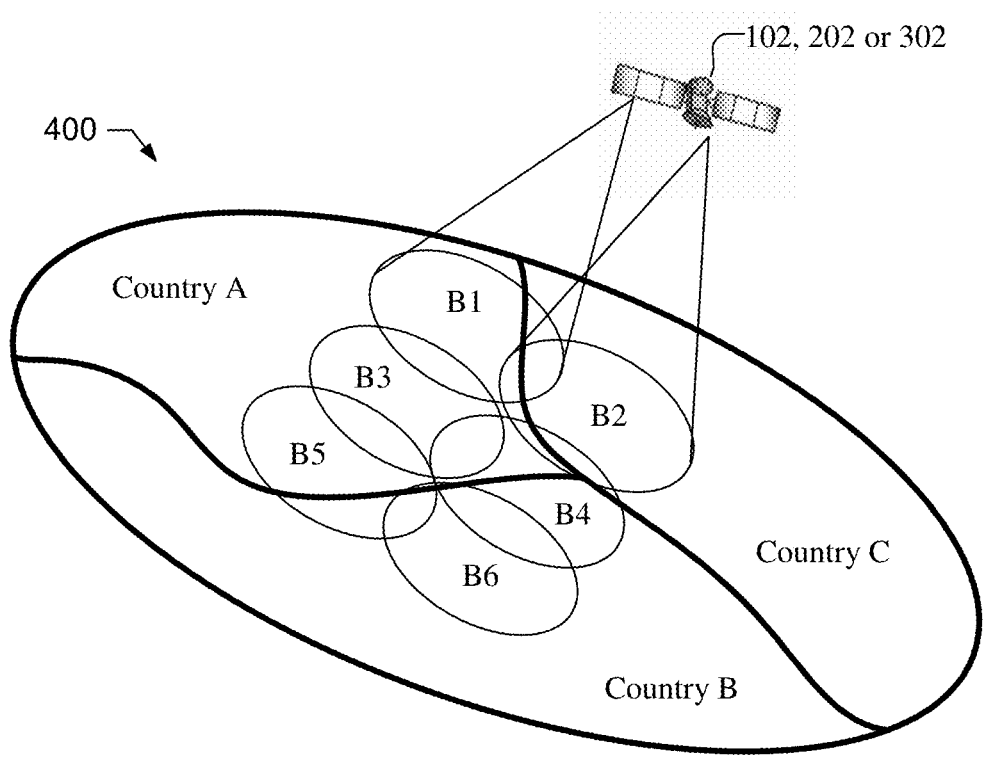
FIG. 4 illustrates an SV generating multiple beams over an area that includes multiple countries.

FIG. 4, by way of example, illustrates an SV 102, 202, 302 generating multiple beams identified as beams B1, B2, B3, B4, B5, and B6 over an area 400 that includes portions of multiple countries, e.g., country A, country B, and country C. With the assignment of each beam to just one country, beams B1, B3, B5 are assigned to country A, beams B4 and B6 are assigned to country B, and beam B2 is assigned to country C.

In one implementation, an individual beam may be assigned to a single country by controlling or steering the beam. While a Non-Geostationary Earth Orbiting (NGEO) SV has a moving coverage area, a relative beam direction may be moved via a controllable antenna array to stay, or mostly stay, within one country, which is sometimes referred to as a "steerable beam". For example, beam coverage may move slowly within one country and then hop to a new country, e.g., after an SV 102, 202, 302 has transferred to a new earth station 104 or new gNB 106 or 307.

In another implementation, a radio cell and radio beam may be allowed to support access by different UEs 105 in two or more countries at the same time. For example, beam B1 may support access from UEs 105 in countries A and C, and beams B4 and B5 may support access from UEs 105 in countries A and B. In such cases, it may be important for the support of regulatory services if a gNB 106/202/307 and/or an AMF 122 can determine the country in which a UE 105 is located.

Figure 5:
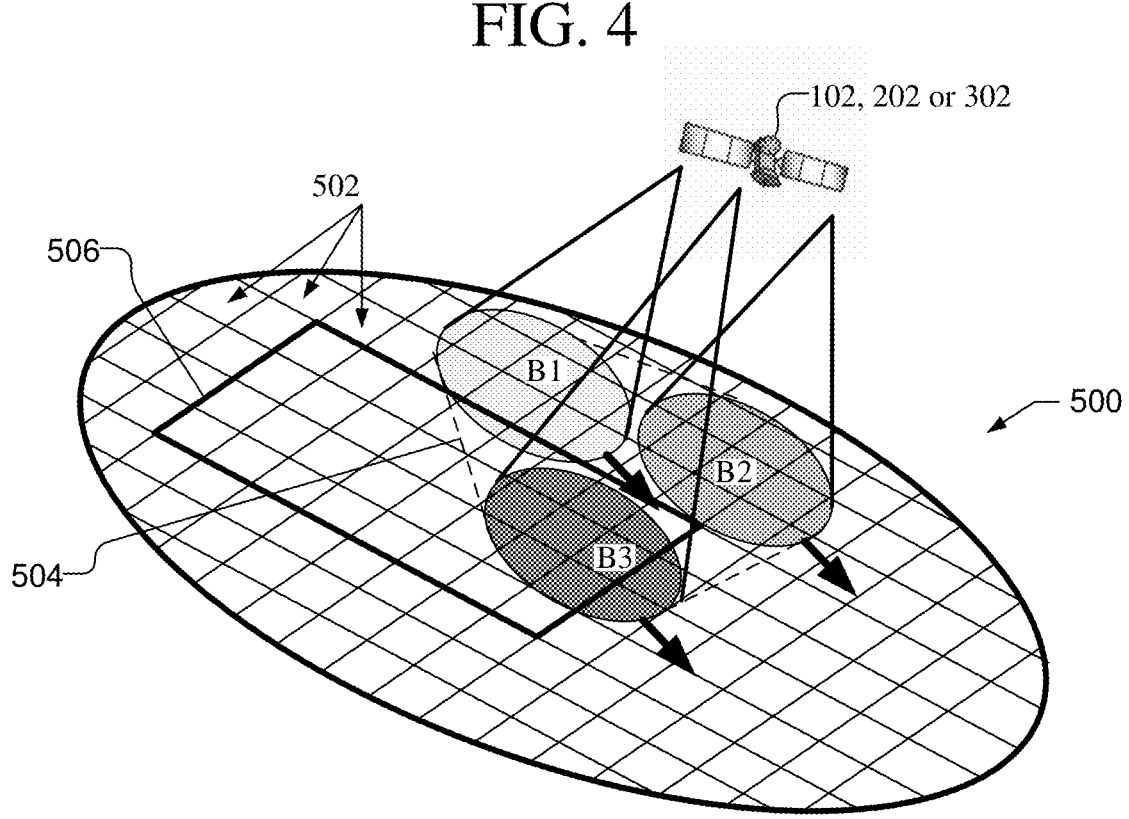
FIG. 5 illustrates radio cells produced by an SV over an area that includes a number of fixed cells.

FIG. 5 illustrates radio cells produced by an SV 102, 202, 302 over an area 500 that includes a number of Earth fixed cells 502. A radio cell may comprise a single beam or multiple beams, e.g., all beams in a radio cell may use the same frequency or a radio cell may comprise one beam for each frequency in a set of different frequencies. For example, beams B1, B2 and B3 may support three separate radio cells (one beam per radio cell) or may collectively support a single radio cell (e.g., radio cell 504 shown with dotted lines). Preferably, a radio cell covers a contiguous area.

Radio beams and radio cells produced by an SV 102, 202, 302 may not align with cells used by terrestrial wireless networks, e.g., 5GCN 110 terrestrial cells or LTE terrestrial cells. For example, in an urban area, a radio beam or radio cell produced by an SV 102, 202, 302 may overlap with many 5GCN fixed terrestrial cells. When supporting satellite access to a wireless network, radio beams and radio cells produced by an SV 102, 202, 302 may be hidden from a 5GCN 110.

As illustrated in FIG. 5, an area 500 may include a number of Earth fixed cells 502, as well as fixed tracking areas (TAs) such as TA 506. Fixed cells are not "real cells," e.g., as used for terrestrial NR and LTE access, and may be referred to as "virtual cells" or "geographic cells." A fixed cell, such as fixed cells 502, has a fixed geographic coverage area, which may be defined by a PLMN operator. For example, the coverage area of a fixed cell or a fixed TA may comprise the interior of a circle, ellipse or a polygon. The coverage area is fixed relative to the surface of the Earth and does not change with time, unlike the coverage area of a radio cell which typically changes with time for a LEO or MEO SV. A fixed cell 502 may be treated by a 5GCN 110 the same as a real cell that supports terrestrial NR access. Groups of fixed cells 502 may define a fixed TA 506, which may be treated by a 5GCN the same as TAs that are defined for terrestrial NR access. Fixed cells and fixed TAs used for 5G satellite wireless access may be used by a 5GCN 110 to support mobility management and regulatory services for UEs 105 with minimal new impact.

With regenerative SVs 202 with a non-split architecture as in communication system 200, each radio cell may remain with the same SV 202 and may have a moving coverage area supporting different 5GCNs 110 at different times.

With transparent SVs 102 and regenerative SVs 302 for a split architecture as in communication system 300, each radio cell may be assigned to and controlled by one gNB 106 or 307 on behalf of one or more PLMNs in one country. For a GEO SV 102/302, the assignment to a gNB 106/307 may be permanent or temporary. For example, the assignment may change on a daily basis to allow for peak traffic occurrence at different times in different parts of the SV 102/302 radio footprint and/or may change over a longer period to accommodate changing regional traffic demands. For a non-geostationary (NGEO) SV 102/302, the assignment might last for a short time, e.g., only 5-15 minutes. A non-permanent radio cell may then be transferred to a new gNB 106/307 as necessary (e.g. when access to the NGEO SV 102/302 is transferred to the new gNB 106/307). Each gNB 106/307, for example, may have a fixed geographic coverage area, e.g., comprising a plurality of fixed cells 502 and fixed TAs. A radio cell for a first NGEO SV 102/302 may be transferred from a first gNB 106/307 to a second gNB 106/307 when (or after) moving into the fixed coverage area of the second gNB 106/307. Prior to this transfer, UEs 105 accessing the radio cell in a connected state may be moved to a new radio cell for the first gNB 106/307 or could be handed off to the second gNB 106/307 as part of transferring the radio cell. An SV 102/302 may be accessed from only one gNB 106/307 or from multiple gNBs 106/307, possibly in different countries. In one implementation, an SV 102/302 may be assigned to multiple gNBs 106/307 by partitioning radio cells produced by the SV 102/302 among the different gNBs 106/307. Radio cells may then be transferred to new gNBs 106/307 (and to new countries) as the SV 102/302 moves or as traffic demands change. Such an implementation would be a form of a soft handoff in which SV 102/302 transfer from one gNB 106/307 to another gNB 106/307 occurs in increments of radio cells and not all at once.

Figure 6:
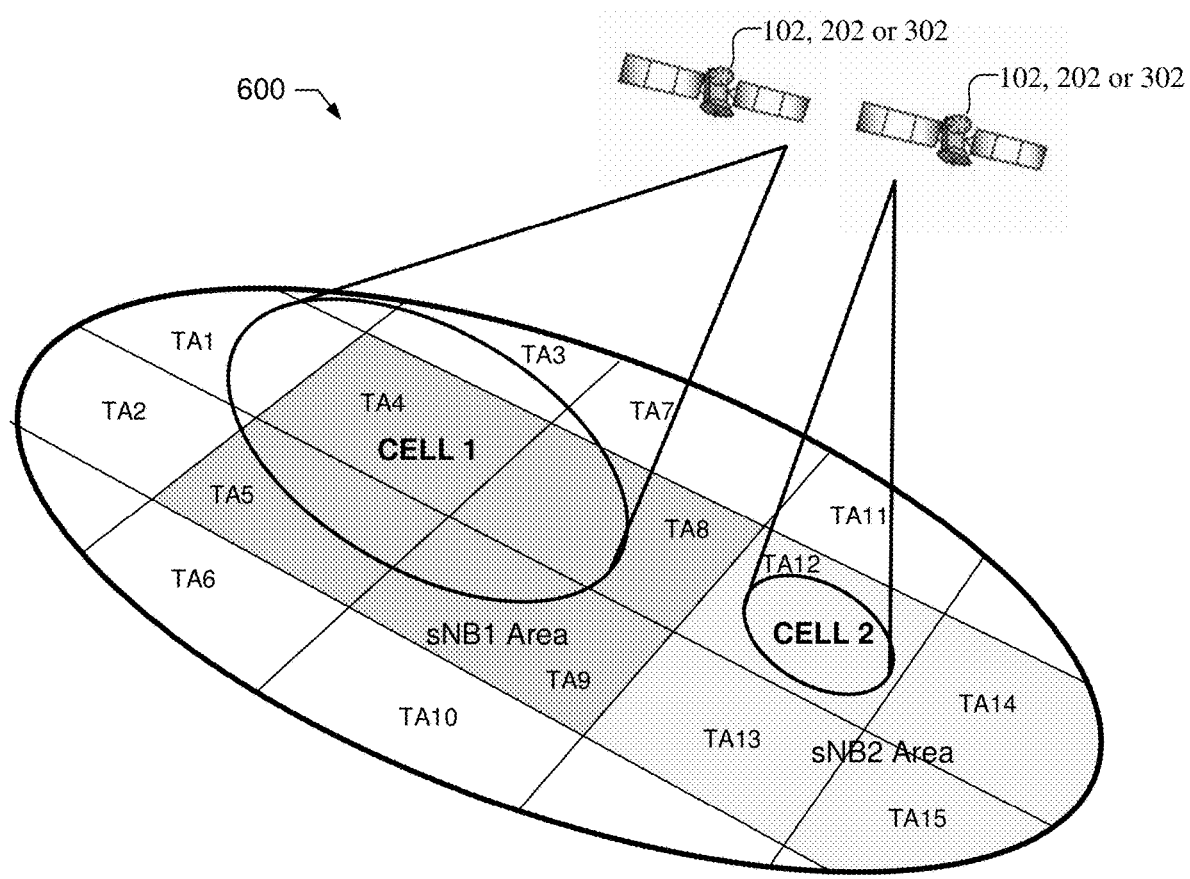
FIG. 6 illustrates an assignment of radio cells produced by an SV to fixed tracking areas (TAs).

FIG. 6 shows an example of assignment of radio cells, e.g., cell 1 and cell 2, produced by one or more SVs 102, 202, 302 over an area 600. As illustrated, the area 600 includes a number of fixed TAs, e.g., TA1-TA15, wherein TA4, TA5, TA8, and TA9 are assigned to a gNB1 (which may be a gNB 106, gNB 202 or a gNB 307), and TA12, TA13, TA14, and TA15 are assigned to a gNB2 (which may be another gNB 106, 202 or 307). In one implementation, a radio cell may be considered to support a fixed TA if the radio cell is wholly within the TA (e.g., Cell 2 within TA 12); if the TA is wholly within the radio cell (e.g., TA4 within Cell 1); or if the overlap of the area of a radio cell and a TA exceeds a predetermined threshold fraction of the total area of the radio cell or the total area of the TA (e.g., cell 1 overlap with TA1, TA3, TA5, TA8 or TA9). An SV 102, 202, 302 may broadcast, e.g., in a System Information Block type 1 (SIB1) or SIB type 2 (SIB2), the identities (IDs) of supported PLMNs (e.g., where a PLMN ID comprises a Mobile Country Code (MCC) and Mobile Network Code (MNC)) and, for each supported PLMN, the IDs of supported TAs (e.g. where the ID of TA comprises a Tracking Area Code (TAC)). For an NGEO SV, the supported PLMNs and TAs may change as radio cell coverage areas change. A gNB 106/202/307 may determine PLMN and TA support (and thus the PLMN IDs and TACs which are broadcast in a SIB for each radio cell) from known ephemeris data for each SV 102/202/302 and a known directionality and angular range for component radio beams for each radio cell (e.g. Cell 1 and Cell 2). A gNB 106/202/307 may then update SIB broadcasting.

Thus, as illustrated in FIG. 6, an SV 102/202/302 may broadcast for cell 1 a SIB that includes TACs for TA4 and possibly TA1, TA3, TA5, TA8 and/or TA9. Similarly, the SV 102/202/302 or another SV 102/202/302 may broadcast for Cell 2 a SIB that includes a TAC for TA12 only. The Cell 1 may be assigned to gNB1 (which has coverage of TA4, TA5, TA8, and TA9) and Cell 2 may be assigned to gNB2 (which has coverage of TA12, TA13, TA14, and TA15). Cell 1 and Cell 2 may be transferred from gNB1 to gNB2 or from gNB2 to gNB1 if the cell coverage area moves from one gNB area to another.

The coverage area for a fixed TA may be defined in a manner that is simple, precise, flexible and requires minimal signaling for conveyance to a UE 105 or gNB 106/202/307, or an entity in a 5GCN 110. A fixed TA area may be small enough to allow efficient paging by comprising an area supported by just a few radio cells (e.g. less than 10) and may also be large enough to avoid excessive UE registration (e.g. may extend at least 100 kilometers in any direction). The shape of a fixed TA area may be arbitrary, e.g., the shape may be defined by a PLMN operator, or may have one or more restrictions. For example, one restriction for the shape of the fixed TA area may be that a fixed TA along the border of a country precisely aligns with the border to avoid serving UEs 105 in another country. Additionally, a fixed TA may be restricted to align with an area of interest, e.g., a PSAP serving area, the area of a large campus, etc. Additionally, a fixed TA may be restricted so that parts of the fixed TA align with a physical obstacle, such as the bank of a river or lake.

The coverage area for fixed cells may likewise be defined in a manner that is simple, precise, flexible and requires minimal signaling for conveyance to a UE 105 or gNB 106/202/307. A fixed cell coverage area may allow for simple and precise association with a fixed TA, e.g., one fixed cell may belong unambiguously to one TA.

Fixed cells may be used by a wireless core network, such as a 5GCN 110, for support of regulatory services such as emergency (EM) call routing based on a current fixed serving cell for a UE 105, use of a fixed cell to approximate a UE 105 location, use of a fixed cell association to direct a Wireless Emergency Alerting (WEA) alert over a small defined area to a recipient UE 105, or use of a fixed cell as an approximate location or a trigger event for Lawful Interception (LI) for a UE 105. Such usage of fixed cells implies that fixed cells should be capable of being defined with a size and shape similar to that of cells that are defined and used for terrestrial wireless access, including allowing for very small (e.g., pico) cells and large (e.g., rural) cells.

FIGS. 4-6 illustrate how a radio cell may have a coverage area which spans two or more countries. In such cases, a gNB 106, gNB 202 or gNB-CU 307 which controls such as radio cell may provide UE 105 access to a PLMN or PLMNs (e.g. with 5GCNs 110) in just one country or to PLMNs (e.g. with 5GCNs 110) in two or more countries. For either scenario, a particularly critical problem can be enabling a PLMN to determine or verify the country in which a UE 105 is located during 5G satellite access to ensure that the UE 105 is located in the same country as the PLMN that the UE 105 is accessing. For example, in consideration of regulatory services, such as lawful interception (LI), as well as considerations for emergency situations, e.g., emergency calls and wireless emergency alerting, a UE 105 may be required to always access a PLMN (e.g. a gNB 106, gNB 202, gNB-CU 307 and/or a 5GCN 110) in the same country as the UE 105. It may not be appropriate to permit a UE 105 to determine or verify the country in which the UE 105 is located, as a user may manipulate this information in the UE 105 to avoid regulatory services, such as LI, and non-malicious errors may impede emergency services. Accordingly, it is desirable for the network (e.g. a gNB 106, gNB 202, gNB-CU 307 and/or a 5GCN 110), rather than the UE 105, to determine or verify the country in which the UE 105 is located. Moreover, due to signaling and processing overhead, it may also be preferred that an NG-RAN (e.g. a gNB 106, gNB 202 or gNB-CU 307) perform the location and country determination/verification rather than a 5GCN 110.

In one implementation, UE assisted location determination may be performed by the NG-RAN 112, e.g., by a gNB 106, 202 or 307, to determine the location and country of the UE 105 and to verify that the UE 105 is in a country associated with a serving or prospective serving PLMN. UEs that support 5G satellite access may support UE based location (e.g. using GNSS), which may be used for UE verification of the UE location and country for scenarios where network verification is not needed. For scenarios where network verification is necessary, such as for regulatory services, the serving gNB 106, 202 or 307 for a UE 105 may request a set of measurements from DL signals obtained by the UE from a plurality of satellites. The measurements of DL signals, for example, may be from GNSS satellites 190 and/or communication satellites 102, 202 or 302. In some implementations, the serving gNB 106, 202 or 307 may indicate the type of DL signals to be measured and, for example, may indicate allowed GNSS or other SV constellations to be used. The measurements of the DL signals from the plurality of satellites may be sent by the UE 105 to the serving gNB 106, 202, 307, which may either compute the location itself or forward the measurements to a separate server (e.g. a server connected to or reachable from the gNB 106, 202, 307) for location computation.

The gNB or location server may need assistance data, such as satellite ephemeris data, to determine the location of the UE 105 based on the measurements of the DL signals. The assistance data can be obtained from a reference network. However, it may not be practical to connect every gNB to a reference network to receive assistance data.

Accordingly, in one implementation, a gNB 106, 202 or 307 may obtain the assistance data from a location server, e.g., LMF 124 in a 5GCN 110, e.g., via NR Positioning Protocol A (NRPPa) messaging, where NRPPa may be as defined in 3GPP TS 38.455. The location server may provide the assistance data, using NRPPa, when requested by the gNB 106/202/307 or unsolicited. For example, the gNB 106/202/307 may request assistance data from the location server when needed. In another example, the location server may send the assistance data to the gNB 106/202/307 periodically or based on updates to the assistance data received from the reference network. The assistance data may be the same type as provided to a UE 105, e.g., for GNSS, communication satellite or terrestrial positioning measurements. For example, for GNSS ephemeris assistance data, a lifetime may be approximately 6 hours. The content and coding for the assistance data may be based on a Long Term Evolution (LTE) Positioning Protocol (LPP) as defined in 3GPP TS 37.355, which may reduce the impact on the location server (and possibly the gNB 106/202/307). In some implementations, content and coding for the assistance data may be based on a positioning System Information Block (posSIB) used to broadcast assistance data for GNSS SVs 190 and/or communication SVs 102/202/302 to UEs 105 (e.g. according to 3GPP TS 38.331), which may be sent to the gNB 106, 202, 307 (e.g. by LMF 124) to be broadcast to UEs 105 without reading or change by the gNB 106/202/307. In some implementations, the gNB 106, 202, 307 may then also keep a copy of the GNSS and/or communication SV assistance data in the posSIB as assistance data to be used by the gNB 106/202/307 for positioning of UEs 105 by the gNB 106/202/307.

The assistance data, for example, may be for a plurality of satellites that transmit DL signals that are measured by the UE 105. For example, the plurality of satellites may include one or more GNSS satellites 190 and/or one or more communication satellites 102, 202, 302, e.g., including the communication satellite serving the UE 105. The assistance data, for example, may include ephemeris data, timing information, acquisition assistance data, almanac data, ionosphere corrections, troposphere corrections, real time integrity, differential corrections, or a combination thereof.

The gNB 106, 202, 307 may determine the location and country of the UE 105 using the measurements of the DL signals received from the UE 105 and the assistance data in response to one of: (i) a request to establish an RRC Connection received from a UE 105; (ii) a request from a UE 105 to connect to a 5GCN 110 and transmit an initial Non-Access Stratum (NAS) message to the 5GCN 110; (iii) a request received from a UE 105 for initial PLMN connection; or (iv) an ongoing RRC Connection to the UE 105. The UE 105, for example, may include the measurements in a Radio Resource Control (RRC) Setup Complete message (e.g. as part of establishing an RRC Connection) or in an RRC Measurement Report message (e.g. after the UE 105 has established an RRC Connection). For inclusion in an RRC Setup Complete message, the UE 105 may cipher the measurements, e.g., using a public ciphering key (also referred to as a just a public key) received from the gNB 106/202/307 for security of the measurements (e.g. where the gNB 106/202/307 has a corresponding private ciphering key, also referred to as just a private key, that can be used by the gNB 106/202/307 to decipher the measurements). In some implementations, the UE 105 may already be registered with the PLMN, and the determination of the location and country of the UE 105 may be performed by the gNB 106/202/307 to determine if the UE 105 may continue with access to the PLMN.

The gNB 106/202/307 may determine the location of the UE 105 using the measurements of the DL signals received from the UE 105 and the assistance data, e.g., in a standard UE assisted positioning process. For example, the gNB 106/202/307 may employ A-GNSS where the measurements of DL signals are GNSS measurements. The UE 105 and gNB 106, 202, 307 may additionally or alternatively employ other position methods, such as using DL measurements of RSRP, RSRQ, Rx-Tx, AOA, RSTD, or DAOA of signals received from SVs 102, 202, 302 or from other sources and measured by the UE 105 to determine a location of the UE 105, e.g., using ECID, DL-TDOA, multi-cell RTT or AOD. In this case, the gNB 106, 202, 307 may receive assistance data to support these other position methods (e.g. from LMF 124). The country in which the UE 105 is located may then be determined based on the determined location of the UE 105, which may then be used for verification that the UE 105 is located in a country associated with the serving PLMN. If the UE 105 is in the country associated with the serving PLMN, the gNB 106/202/307 may provide an indication of verification to one or more entities in the core network, e.g., when forwarding a NAS request, or may simply allow the UE 105 to continue access to the serving PLMN if the UE 105 is already registered with or already accessing the serving PLMN. If the UE 105 is not located in the country associated with the serving PLMN, the gNB 106/202/307 may reject the NAS request, or if the UE 105 is already registered with or already accessing the serving PLMN, may send a message to the core network associated with the serving PLMN indicating that the UE 105 is not in the country associated with the serving PLMN, enabling the serving PLMN to deregister the UE 105.

Figure 7:
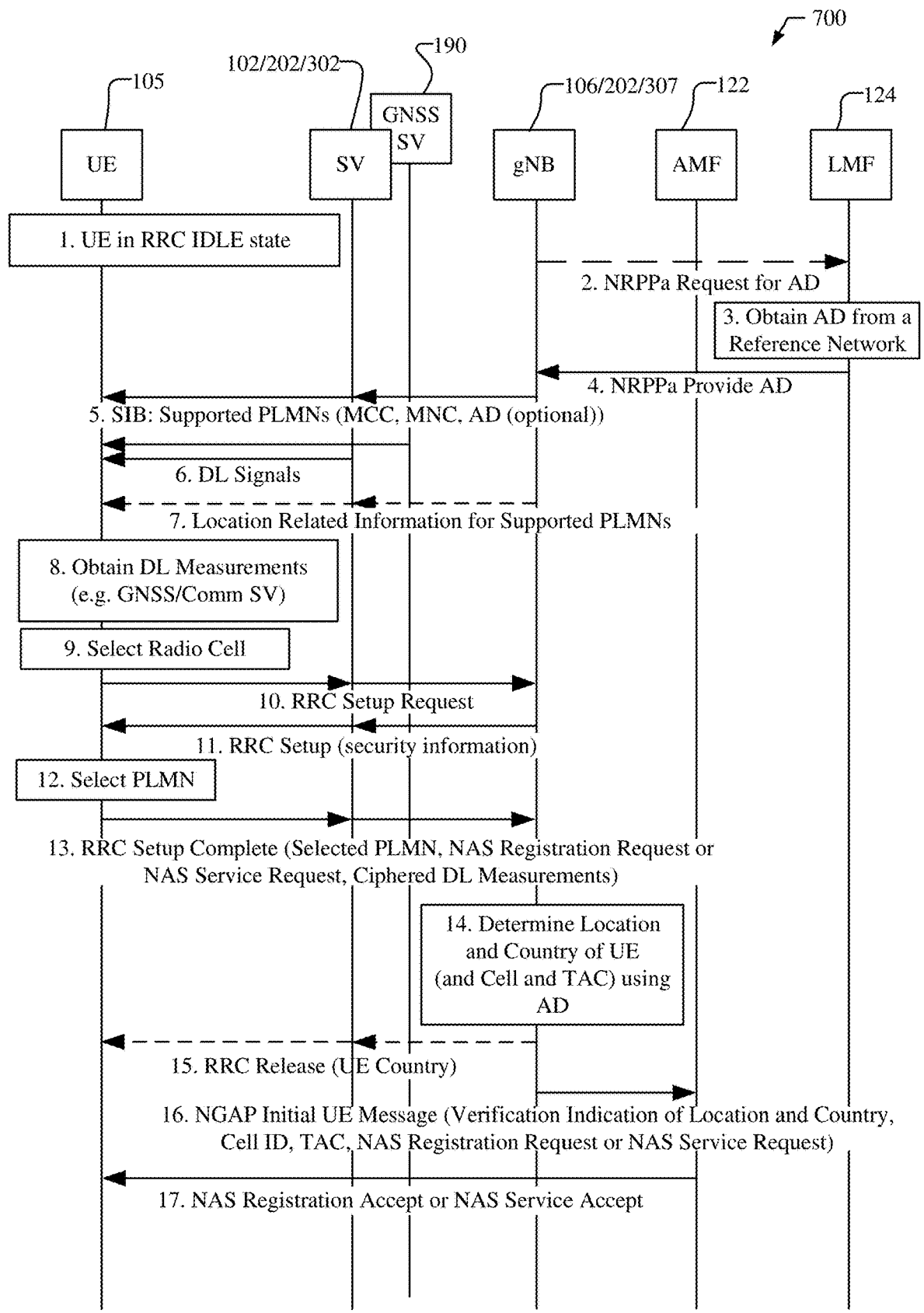
FIG. 7 shows a signaling flow that illustrates various messages sent between components of a communication system to determine whether a UE is located in a country associated with a public land mobile network (PLMN).

FIG. 7 shows a signaling flow 700 that illustrates various messages sent between components of a communication system in a procedure for access to a PLMN (e.g. a 5GCN 110) by a UE 105 in which a gNB (e.g. gNB 106, 202 or 307) determines or verifies that the UE 105 is in a country associated with the PLMN using assistance data received from a location server. FIG. 7 illustrates a plurality of positioning techniques that may be used to determine or verify the country in which the UE 105 is located. It should be understood that any one positioning technique or any combination of positioning techniques, may be used to determine or verify the country in which the UE 105 is located by the gNB. The communication network may be part of communication system 100, 200 or 300 for FIG. 1, 2 or 3, respectively, and is illustrated as including a UE 105, an SV 102/202/302, a gNB 106/202/307, an AMF 122, and an LMF 124. It should be understood that the gNB 106/202/307 or an element of the gNB 106/202/307 may be included within the SV 102/202/302. For example, with an SV 202, a gNB 202 would be completely included within the SV 202 as described for FIG. 2. Alternatively, with an SV 302, a gNB 307 (also referred to as a gNB-CU) would be terrestrial and physically separate from the SV 302, but the SV 302 would include a gNB-DU 302 as described for FIG. 3. Further, it should be understood that the signaling flow 700 for access to the PLMN by the UE 105 may include additional or fewer messages or stages.

At stage 1 in FIG. 7, the UE 105 is in an RRC IDLE state and in a 5G Mobility Management (5GMM) REGISTERED or DEREGISTERED state depending on whether the UE 105 has or has not, respectively, already registered with the PLMN.

At stage 2, the gNB 106/202/307 may optionally send a request to the LMF 124 for assistance data. The request may be sent using an NR Positioning Protocol A (NRPPa) message (e.g. as defined in 3GPP TS 38.455). The content and coding for the assistance data being requested may be based on an LPP message (e.g. as defined in 3GPP TS 37.355). For example, the NRPPa message may include an embedded LPP Request Assistance Data message. The request may be sent by the gNB 106/202/307, e.g., when previous received assistance data is out of date and requires updating, or may be sent by the gNB 106/202/307, e.g., in response to an RRC Setup Request or RRC Setup Complete message received from the UE 105 or any other UE 105, e.g., as illustrated at stage 10 and stage 13. Thus, stages 2, 3, and 4 may occur at other times in the signaling flow, such as after stage 10. The request sent at stage 2 may indicate the types of assistance data being requested by gNB 106/202/307.

At stage 3, the LMF 124 may obtain assistance data from a reference network, e.g. assistance data for GNSS. The LMF 124, for example, may solicit the assistance data or may receive the assistance data unsolicited from the reference network, e.g., periodically or as an update to previously received assistance data.

At stage 4, the LMF 124 sends the assistance data obtained at stage 3 and/or other assistance data to the gNB 106/202/307. The assistance data sent at stage 4 may correspond to a type of types of assistance data requested at stage 2. For example, the assistance data may be sent in an NRPPa message. The content and coding for the assistance data may be based on an LPP message (e.g. as defined in 3GPP TS 37.355) or a posSIB (e.g. as defined in 3GPP TS 38.331 and 3GPP TS 37.355). For example, the NRPPa message may include an embedded LPP Provide Assistance Data message or may be or may contain an NRPPa Assistance Information Control message. The assistance data may be sent at stage 4 in response to the request sent at stage 2 or may be sent unsolicited by LMF 124. For example, the assistance data may be sent by the LMF 124 periodically or, e.g., in response to the LMF 124 receiving an update of the assistance data from the reference network at stage 3. The assistance data, for example, may be for a plurality of satellites, e.g., including at least one GNSS satellite 190 and/or including at least one communication satellite 102/202/302, which may be a serving communication satellite for the UE 105. When the assistance data is for a plurality of satellites, the assistance data may include at least one of ephemeris data, timing information, acquisition assistance data, almanac data, ionosphere corrections, troposphere corrections, real time integrity, differential corrections, or a combination thereof. The assistance data may also include identities or types of DL signals received by a UE 105, as described later for stage 6, and information on frequency, timing, coding and/or Doppler shift for these signals.

At stage 5, the gNB 106/202/307 broadcasts (via the SV 102/202/302) indications of supported PLMNs (e.g. a mobile country code (MCC) and mobile network code (MNC) combination for each PLMN) in each radio cell. The UE 105 may detect radio cells from one or more radio beams transmitted by one or more SVs, including the SV 102/202/302. The gNB 106/202/307 may control SV 102/202/302 to broadcast system information blocks (SIBs) in one or more radio cells of the gNB 106/202/307. The SIBs may indicate one or more PLMNs (referred to as supported PLMNs) supported by the gNB 106/202/307 in each radio cell for the gNB 106/202/307. The PLMNs may each be identified in a SIB by an MCC-MNC, where the MCC indicates a country for each identified PLMN (i.e. a country to which each identified PLMN belongs). The gNB 106/202/307 may optionally include assistance data (e.g. included in posSIBs), such as some or all of the assistance data received by the gNB 106/202/307 at stage 4. The SIBs may include security information described below for stage 11 such as public key(s) and an indication of ciphering algorithm(s).

At stage 6, the UE 105 receives DL signals (e.g. DL positioning reference signals (PRSs) from communications SVs 102/202/302 and/or DL navigation signals from a GNSS SV 190) from a plurality of satellites, which may include one or more of the communication SVs 102/202/302 and/or one or more GNSS SVs 190.

At stage 7, which is optional, the UE 105 may receive location related information for the supported PLMNs broadcast (e.g. in one or more SIBs or posSIBs) in the one or more radio cells from the gNB 106/202/307 via the SV 102/202/302. For example, the location related information for the supported PLMNs may comprise geographic definitions for fixed cells of each supported PLMN, geographic definitions for fixed tracking areas of each supported PLMN, geographic definitions of a country or an international border of a country associated with each supported PLMN, or some combination of these.

At stage 8, the UE 105 obtains DL measurements from the DL signals received from the plurality of satellites at stage 6. The DL measurements, for example, may be GNSS pseudorange or code phase measurements from one or more GNSS SVs 190 and/or measurements of characteristics of the DL signals from one or more communication SVs 102/202/302, such as a Reference Signal Received Power (RSRP), Reference Signal Received Quality (RSRQ), Rx-Tx, and/or Angle of Arrival (AOA). The UE 105 may further measure a Differential AOA (DAOA) and/or Reference Signal Time Difference (RSTD) for DL signals received from one or more pairs of SVs 102/202/302. The UE may use assistance data received at stage 5 to help obtain the measurements of the DL signals. For example, the assistance data may indicate characteristics of the DL signals such as identities or types of the DL signals, frequency, timing, coding and/or Doppler shift that may enable UE 105 to acquire and measure the DL signals with greater reliability, greater accuracy and/or with shorter delay.

At stage 9, UE 105 selects a radio cell. In one implementation, if the UE 105 is in a 5GMM DEREGISTERED state at stage 1, the UE 105 may first select a PLMN (referred to as a selected PLMN), where the selected PLMN is a preferred PLMN in the supported PLMNs indicated at stage 5 in the one or more radio cells of the gNB 106/202/307. The UE 105 may then select the radio cell at stage 9 based on the radio cell indicating support for the preferred PLMN. If the UE 105 is in a 5GMM REGISTERED state at stage 1, the UE 105 may select a suitable cell at stage 9 which indicates support at stage 5 for the PLMN with which UE 105 is already registered.

At stage 10, UE 105 may send an RRC Setup Request message to the gNB 106/202/307 that supports the selected radio cell via the SV 102/202/302 using the selected radio cell (e.g. after having performed a random access procedure (not shown in FIG. 7) to obtain initial access to the selected radio cell from the gNB 106/202/307).

At stage 11, the gNB 106/202/307 may return an RRC Setup message to the UE 105. The gNB 106/202/307 may include security information in the RRC Setup message (e.g. if not provided at stage 5) that includes a public ciphering key and an indication of a ciphering algorithm.

At stage 12, the UE 105 may select a supported PLMN (referred to below as the selected PLMN) if not previously known at stage 1 (from a PLMN with which the UE is already registered) or selected at stage 9. The selected PLMN may be one of the supported PLMNs indicated at stage 5 for the radio cell selected at stage 9. The selected PLMN (as known at stage 1 or selected at stage 9 or stage 12) is also referred to as a serving PLMN below since the selected PLMN acts as a serving PLMN for UE 105 either at stage 1 or following stage 17.

At stage 13, UE 105 sends an RRC Setup Complete message to the gNB 106/202/307 and includes an indication (e.g. MCC and MNC) of the selected PLMN and either a Non-Access Stratum (NAS) Registration Request message if the UE 105 is not yet registered in the selected PLMN or needs to re-register in the selected PLMN or a NAS Service Request message if the UE 105 was already registered with the selected PLMN at stage 1. The UE 105 also includes the DL location measurements obtained at stage 8. The DL location measurements may be included in a confidential (or concealed) form by ciphering the location measurements using the public ciphering key and ciphering algorithm indicated at stage 5 or 11. The DL location measurements may be included within an LPP message (e.g. an LPP Provide Location Information message) or within one or more parameters defined for an LPP message (e.g. an LPP Provide Location Information message) which are included as a parameter or parameters within the RRC Setup Complete message sent at stage 13. Inclusion of the DL location measurements within an LPP message or within parameter(s) of an LPP message may reduce implementation impacts to UE 105 (e.g. if UE 105 already supports LPP for location procedures involving LMF 124) and may also reduce standards impacts to define the content of the RRC Setup Complete message. The DL location measurements may instead be included in another RRC message—e.g. in the RRC Setup Request message sent at stage 10 or in an RRC message sent before or after the RRC Setup Complete at stage 13.

The determination and encoding of the confidential location measurements may reuse some of the functionality used to support a Subscription Concealed Identifier (SUCI) as described in 3GPP Technical Specification (TS) 23.003.

At stage 14, the gNB 106/202/307, or an embedded or attached location server such as a Location Management Component (LMC), may determine a location and country for UE 105 using the DL measurements received at stage 13 and the assistance data received at stage 4. The gNB 106/202/307 (or LMC), for example, may decipher the DL measurements sent at stage 13 (if these were ciphered a stage 13) based on the ciphering key and the ciphering algorithm indicated at stage 5 or stage 11. For example, the gNB 106/202/307 (or LMC) may use a private ciphering key that corresponds to a public ciphering key sent at stage 5 or stage 11, to decipher the ciphered DL measurements based on a public key-private key ciphering algorithm (e.g. the RCA algorithm) indicated at stage 5 or stage 11.

The gNB 106/202/307 may use the DL measurements that the UE 105 sent at stage 13, which may include GNSS measurements and/or the characteristics of the received DL signals, e.g., RSRP, RSRQ, Rx-Tx, AOA, RSTD, or DAOA, measured by the UE 105 at stage 8 and the assistance data received at stage 4, to determine the location of the UE 105, e.g., using Assisted GNSS (A-GNSS), ECID, RTT, Downlink Time Difference of Arrival (DL-TDOA), AOA, Differential AOA or other positioning techniques. A country in which the UE 105 is located may then be determined based on the determined location of the UE 105. The gNB 106/202/307 (or LMC) may determine the location and country of the UE 105 using other techniques. In some implementations, measured characteristics of the serving radio cell, e.g. RSRP, RSRQ, Rx-Tx, AOA or some combination thereof, measured by the UE 105 at stage 8, may be used to refine the location of the UE 105. In some implementations, measurements of UL signals sent by UE 105 obtained by SV 102/202/302 or by gNB 106/202/307 may be used to verify or refine the location of the UE 105 by gNB 106/202/307. In some implementations, the gNB 106/202/307 may use a known coverage area for the radio cell, or a known coverage area for a radio beam of the radio cell, selected by UE 105 at stage 9 to help verify the location of the UE 105. In some implementations, the location determination and location mapping to a country may be performed by a Location Management Component (LMC) which may be part of, attached to, or reachable from gNB 106/202/307. The gNB 106/202/307 may map the location to a country and verify the country is supported by the gNB 106/202/307 and that the country matches the country of the selected PLMN indicated at stage 13. In some implementations, the gNB 106/202/307 may further determine a fixed serving cell and/or a fixed serving Tracking Area (TA) for UE 105, e.g., by mapping a UE 105 location to a Cell ID and/or TA Code (TAC), for the selected PLMN indicated at stage 12.

At stage 15, if the UE country determined at step 14 is not supported by the gNB 106/202/307 or does not match the country for the selected PLMN, the gNB 106/202/307 may return an RRC Release message to UE 105. The RRC Release message may indicate the country (e.g. using an MCC) that the UE 105 is located in as determined at stage 14. If an RRC Release message is received, the UE 105 may restart the procedure at stage 9 using the provided country. The UE 105 may also locally deregister from the selected PLMN if the UE 105 started out in 5GMM REGISTERED state at stage 1.

At stage 16, if the UE 105 is in the correct country or may be in the correct country, the gNB 106/202/307 sends a Next Generation Application Protocol (NGAP) message (e.g. an NGAP Initial UE message) to an entity in the selected PLMN, e.g., AMF 122. In some implementations, the message may include an indication that the gNB 106/202/307 has verified the UE 105 location and/or country. Alternatively, if gNB 106/202/307 was only able to verify that UE 105 may be in the correct country, the message may include an indication that the gNB 106/202/307 has not verified the UE 105 country. The NGAP message may further include an identification of the fixed serving cell and/or fixed serving TA if determined at stage 14 (e.g., the Cell ID and TAC). In some implementations, the AMF 122 or LMF 124 may perform the fixed cell and/or fixed TA (Cell ID and/or TAC) determination (and possibly location of the UE 105), in which case the NGAP message may include a UE location or UE location information instead of the Cell ID and TAC at stage 16. The NGAP initial UE message may further include the NAS Registration Request or the NAS Service Request received at stage 13. If the NGAP message indicates that the UE 105 country was verified by the gNB 106/202/307, the AMF 122 may accept the Registration Request or Service Request. If the NGAP message indicates that the UE 105 country was not verified by the gNB 106/202/307 or contains no indication of UE 105 country verification by the gNB 106/202/307, the AMF 122 may obtain the location of UE 105 (e.g. using LMF 124 and not shown in FIG. 7), map the location to a country and verify if the country corresponds to the country for the serving PLMN. If the country is verified, the AMF 122 may proceed to stage 17. Otherwise, the AMF 122 may send a NAS reject response to UE 105 and/or deregister the UE 105 (not shown in FIG. 7).

At stage 17, the AMF 122 returns a NAS Registration Accept or NAS Service Accept message (according to whether a NAS Registration Request or a NAS Service Request, respectively, was received at stage 16) to UE 105 via gNB 106/202/307. The NAS Registration Accept message, if sent to UE 105, may include the allowed TAs (TACs) and location information such as geographic definitions of the allowed TAs and constituent fixed cells for the allowed TAs. A Registration flag may also be included in the NAS Registration Accept message to indicate if the UE 105 is or is not required to perform a registration with the serving PLMN for a change of TA after detecting that the UE 105 is no longer in any of the allowed TAs.

Figure 8:
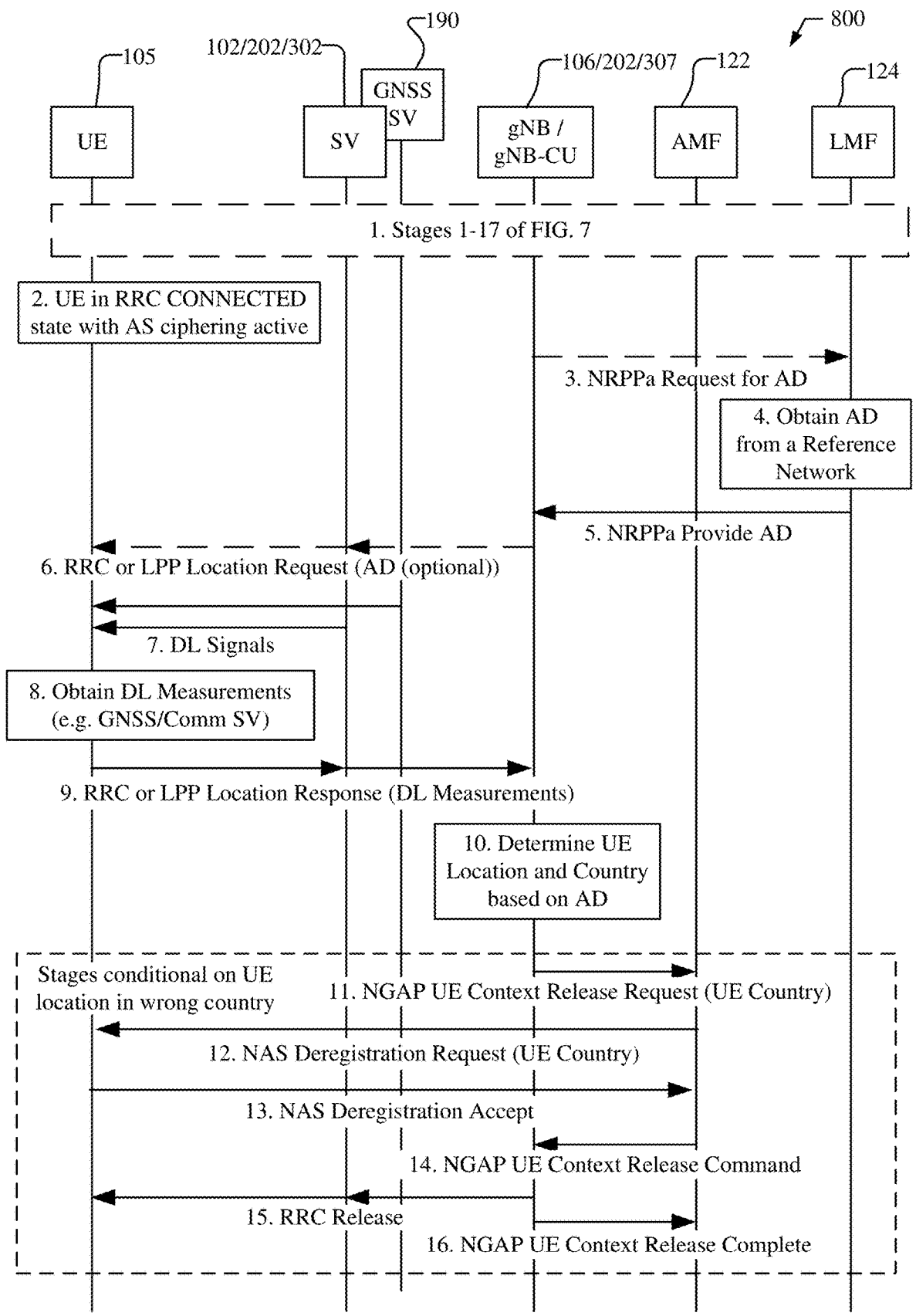
FIG. 8 shows a signaling flow that illustrates various messages sent between components of a communication system to determine whether a UE is located in a country associated with a public land mobile network (PLMN).

FIG. 8 shows a signaling flow 800 that illustrates various messages sent between components of a communication system in a procedure for continued PLMN access by a UE 105 in which a gNB (e.g. gNB 106, 202 or 307) determines or verifies that the UE 105 is in a country associated with the PLMN using assistance data received from a location server. The communication network may be part of communication system 100, 200 or 300 for FIG. 1, 2 or 3, respectively, and is illustrated as including a UE 105, an SV 102/202/302 being accessed by the UE 105, a gNB 106/202/307 which may be a serving gNB for the UE 105, an AMF 122, and an LMF 124. It should be understood that the gNB 106/202/307 or an element of the gNB 106/202/307 may be included within the SV 102/202/302. For example, with an SV 202, a gNB 202 would be completely included within the SV 202 as described for FIG. 2. Alternatively, with an SV 302, a gNB 307 (also referred to as a gNB-CU) would be terrestrial and physically separate from the SV 302, but the SV 302 would include a gNB-DU 302 as described for FIG. 3. Further, it should be understood that the signaling flow 800 for continued PLMN access by the UE 105 may include additional or fewer messages or stages.

At stage 1 in FIG. 8, an initial registration of the UE 105 with the serving PLMN may be performed, for example, as illustrated at stages 1-17 of FIG. 7, where a NAS Registration Request is sent at stages 13 and 16 and a NAS Registration Accept is sent at stage 17. It should be understood that the initial registration with the serving PLMN is not limited to the implementations illustrated in FIG. 7 and that other processes of obtaining an initial registration with the serving PLMN may be performed.

At stage 2, the UE 105 is in a RRC connected state with the serving PLMN with Access Stratum (AS) ciphering between the UE 105 and gNB 102/202/307 active.

At stage 3, the gNB 106/202/307 may optionally send a request to the LMF 124 for assistance data. The request may be sent using an NR Positioning Protocol A (NRPPa) message. The request may be sent by the gNB 106/202/307, e.g., when previous received assistance data is out of date and requires updating, or may be sent periodically.

At stage 4, the LMF 124 may obtain assistance data (e.g. assistance data for GNSS) from a reference network. The LMF 124, for example, may solicit the assistance data or may receive the assistance data unsolicited from the reference network, e.g., periodically or as an update to previously received assistance data.

At stage 5, the LMF 124 sends the assistance data obtained at stage 4 and/or other assistance data to the gNB 106/202/307. For example, the assistance data may be sent in an NRPPa message. The content and coding for the assistance data may be based on an LPP message or a posSIB. The assistance data may be sent by the LMF 124 in response to the request sent in stage 2 or may be sent unsolicited. For example, the assistance data may be sent by the LMF 124 periodically or, e.g., in response to the LMF 124 receiving an update of the assistance data from the reference network. The assistance data, for example, may be for a plurality of satellites, e.g., including at least one GNSS satellite 190 and/or including at least one communication satellite 102/202/302, which may be a serving communication satellite for the UE 105. The assistance data for a plurality of satellites, for example, may include at least one of ephemeris data, timing information, acquisition assistance data, almanac data, ionosphere corrections, and troposphere corrections, real time integrity, differential corrections, or a combination thereof. The assistance data may also include identities or types of DL signals received by a UE 105, as described later for stage 7, and information on frequency, timing, coding and/or Doppler shift for these signals.

At stage 6, the gNB 106/202/307 may send an RRC location request message (e.g. an RRC Reconfiguration or RRC Resume message) or an LPP location request message (e.g. LPP Request Location Information message) to the UE 105. In some implementations, the RRC location request message may include the LPP location request message embedded within it. The gNB 106/202/307 may optionally include assistance data, such as some or all of the assistance data received by the gNB 106/202/307 at stage 5, in the RRC or LPP location request message.

At stage 7, the UE 105 receives DL signals (e.g. DL PRS signals from one or more communications SVs 102/202/302 and/or DL navigation signals from one or more GNSS SVs 190) from a plurality of satellites, which may include one or more of the communication SV 102/202/302 and/or a GNSS SV 190.

At stage 8, the UE 105 obtains DL measurements from the DL signals received from the plurality of satellites at stage 7. The DL measurements, for example, may be GNSS measurements from one or more GNSS SVs 190 and/or measurements of characteristics of the DL signals from the SV 102/202/302, such as RSRP, RSRQ, Rx-Tx, AOA. If the UE 105 receives DL signals from multiple SVs 102/202/302, the UE 105 may further measure a DAOA and/or RSTD for one or more pairs of SVs 102/202/302. The UE 105 may use assistance data received at stage 6 to help obtain the DL measurements.

At stage 9, the UE 105 sends an RRC or LPP location response message to the gNB 106/202/307 via the SV 102/202/302. For example, if an RRC location request message was received at stage 6, UE 105 may send an RRC location response message (e.g. an RRC Measurement Report message) at stage 9 which may include an embedded LPP message (e.g. an LPP Provide Location Information message). If an LPP location request message was received at stage 6, UE 105 may send an LPP location response message at stage 9 (e.g. an LPP Provide Location Information message). The location response message includes the DL measurements obtained at stage 8. The DL measurements may be ciphered based on the AS ciphering by UE 105.

At stage 10, the gNB 106/202/307, or an embedded or attached Location Management Component (LMC), determines the UE 105 location and country using the DL measurements received at stage 9 and the assistance data received at stage 5. The gNB 106/202/307 may use the DL measurements that the UE 105 sent at stage 9, which may include GNSS measurements and/or the characteristics of the received DL signals, e.g., RSRP, RSRQ, Rx-Tx, AOA, RSTD, or DAOA, measured by the UE 105 at stage 8, and the assistance data received at stage 5, to determine the location of the UE 105, e.g., using A-GNSS, ECID, RTT, DL-TDOA, AOA, or other positioning techniques. A country in which the UE 105 is located may then be determined based on the determined location of the UE 105. The gNB 106/202/307 (or LMC) may determine the location and country of the UE 105 using other techniques.

At stage 11, if the UE location is in the wrong country for the serving PLMN, the gNB 106/202/307 may send an NGAP UE Context Release Request message to the 5GCN, e.g., the AMF 122, indicating the UE country. The NGAP UE Context Release Request message may indicate the UE country (e.g. using an MCC).

At stage 12, the AMF 122 sends a NAS Deregistration Request message to the UE 105. The Deregistration Request message may indicate the UE country (e.g. using an MCC).

At stage 13, the UE 105 sends a NAS Deregistration Accept message to the AMF 122.

At stage 14, the AMF 122 sends an NGAP UE Context Release Command message to the gNB 106/202/307.

At stage 15, the gNB 106/202/307 sends an RRC Release message to the UE 105 via the SV 102/202/302. The UE may then attempt to access a PLMN in the country of the UE (e.g. as indicated at stage 12)—e.g. by starting the procedure in FIG. 7.

At stage 16, the gNB 106/202/307 sends an NGAP UE Context Release Complete message to the AMF 122.

In a variant of the procedure shown in FIG. 8 (not shown in FIG. 8), if the gNB 106/202/307 (or LMC) determines that the UE location is not in the country for the serving PLMN at stage 10, the gNB 106/202/307 may handover the UE 105 to a PLMN located in a country in which the UE 105 is located if the gNB 106/202/307 is connected to such a PLMN. In this case, stages 11-16 may not be performed.

Figure 9:
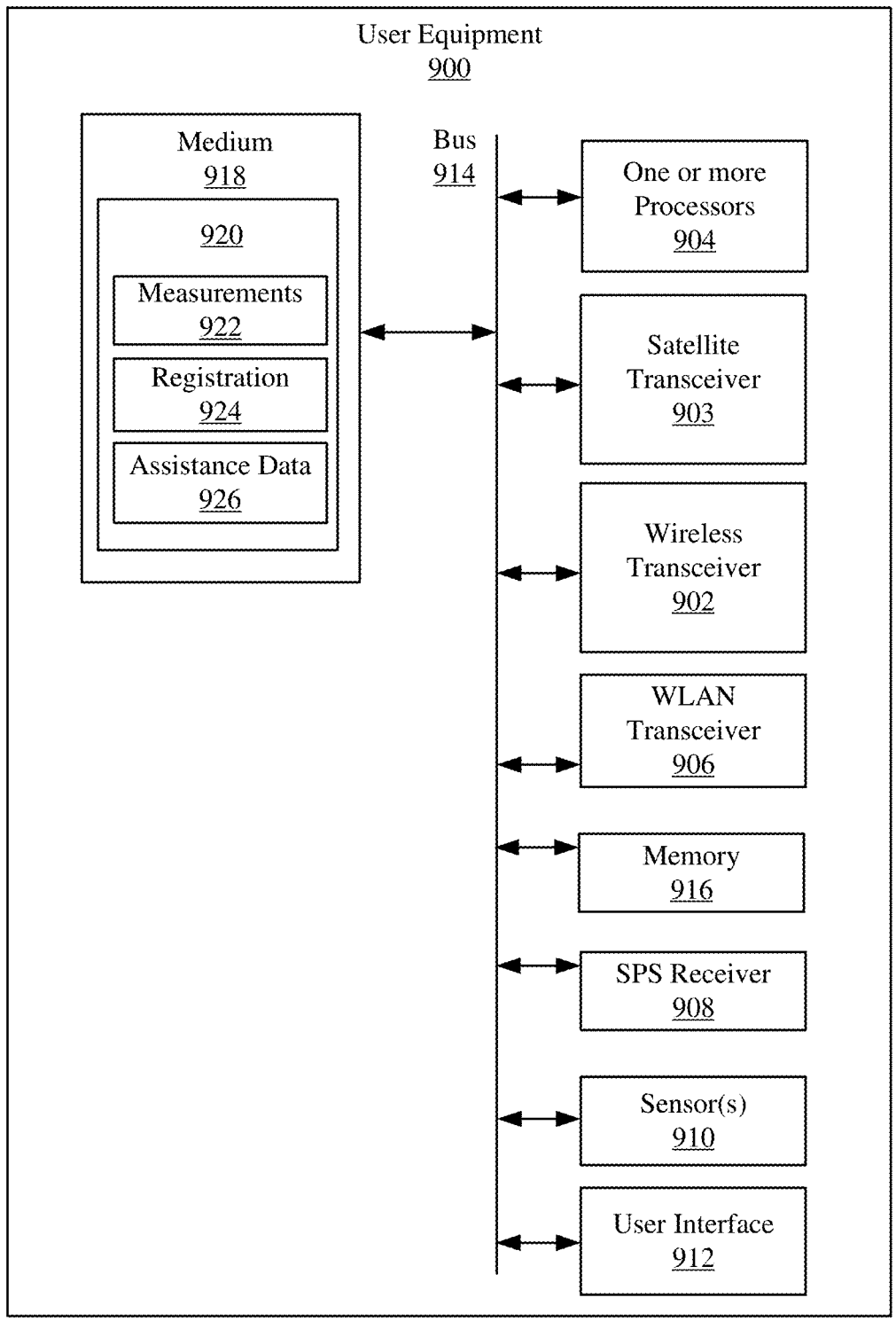
FIG. 9 is a diagram illustrating an example of a hardware implementation of a UE configured to access a serving PLMN through SVs.

FIG. 9 is a diagram illustrating an example of a hardware implementation of UE 900, such as UE 105 shown in FIGS. 1, 2, and 3. The UE 900 may perform the signal flows 700 and 800 in FIGS. 7 and 8, and the process flow 1400 of FIG. 14. The UE 900 may include, e.g., hardware components such as a satellite transceiver 903 to wirelessly communicate with an SV 102/202/302, e.g., as shown in FIGS. 1, 2, and 3. The UE 900 may further include a wireless transceiver 902 to wirelessly communicate with terrestrial base stations in an NG-RAN 112, e.g., base stations such as gNB 114 or a ng-eNB. In some cases, satellite transceiver 903 may be the same as wireless transceiver 902. The UE 900 may also include additional transceivers, such a wireless local area network (WLAN) transceiver 906, as well as an SPS receiver 908 for receiving and measuring signals from SPS SVs 190 (shown in FIGS. 1, 2, and 3). In some implementations, the UE 900 may receive data from a satellite, e.g., via satellite transceiver 903, and may respond to a terrestrial base station, e.g., via wireless transceiver 902, or via WLAN transceiver 906. Thus, UE 900 may include one or more transmitters, one or more receivers or both, and these may be integrated, discrete, or a combination of both. The UE 900 may further include one or more sensors 910, such as cameras, accelerometers, gyroscopes, electronic compass, magnetometer, barometer, etc. The UE 900 may further include a user interface 912 that may include e.g., a display, a keypad or other input device, such as virtual keypad on the display, through which a user may interface with the UE 900. The UE 900 further includes one or more processors 904, memory 916, and non-transitory computer readable medium 918, which may be coupled together with bus 914. The one or more processors 904 and other components of the UE 900 may similarly be coupled together with bus 914, a separate bus, or may be directly connected together or coupled using a combination of the foregoing.

The one or more processors 904 may be implemented using a combination of hardware, firmware, and software. For example, the one or more processors 904 may be configured to perform the functions discussed herein by implementing one or more instructions or program code 920 on a non-transitory computer readable medium, such as medium 918 and/or memory 916. In some embodiments, the one or more processors 904 may represent one or more circuits configurable to perform at least a portion of a data signal computing procedure or process related to the operation of UE 900.

Figure 14:
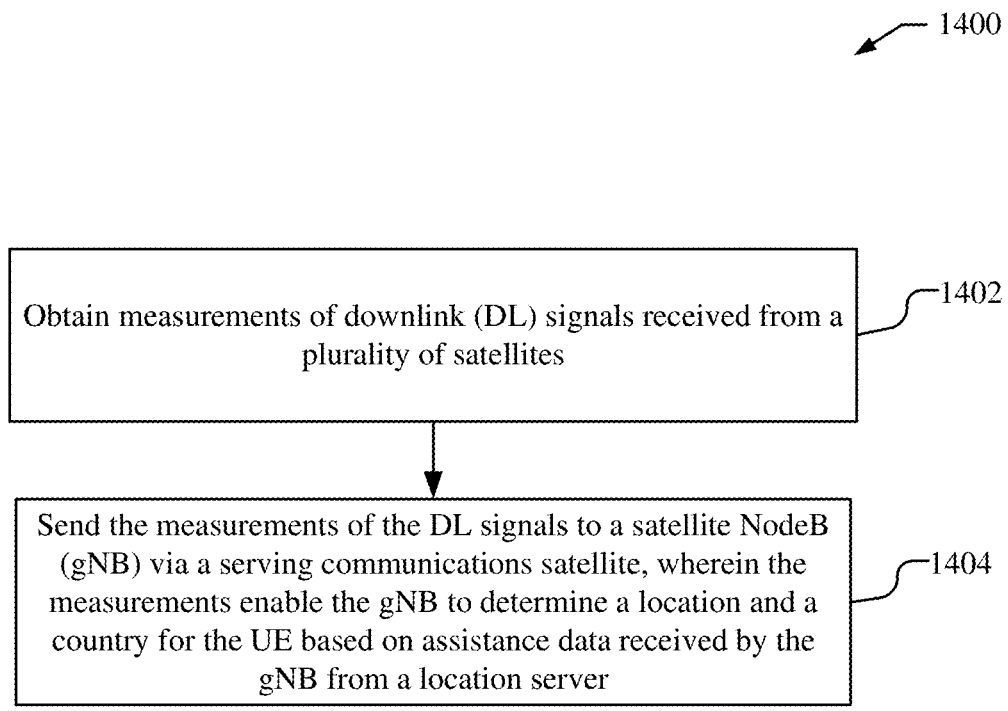
FIG. 14 is a flowchart of an example procedure performed by a UE for UE access to a serving PLMN through SVs.

The medium 918 and/or memory 916 may store instructions or program code 920 that contain executable code or software instructions that when executed by the one or more processors 904 cause the one or more processors 904 to operate as a special purpose computer programmed to perform the techniques disclosed herein (e.g. such as the process flow 1400 of FIG. 14). As illustrated in UE 900, the medium 918 and/or memory 916 may include one or more components or modules that may be implemented by the one or more processors 904 to perform the methodologies described herein. While the components or modules are illustrated as software in medium 918 that is executable by the one or more processors 904, it should be understood that the components or modules may be stored in memory 916 or may be dedicated hardware either in the one or more processors 904 or off the processors.

A number of software modules and data tables may reside in the medium 918 and/or memory 916 and be utilized by the one or more processors 904 in order to manage both communications and the functionality described herein. It should be appreciated that the organization of the contents of the medium 918 and/or memory 916 as shown in UE 900 is merely exemplary, and as such the functionality of the modules and/or data structures may be combined, separated, and/or be structured in different ways depending upon the implementation of the UE 900. While the components or modules are illustrated as software in medium 918 and/or memory 916 that is executable by the one or more processors 904, it should be understood that the components or modules may be firmware or dedicated hardware either in the one or more processors 904 or off the processors.

As illustrated, the program code 920 stored on medium 918 and/or memory 916 may include a measurement module 922 that that when implemented by the one or more processors 904 configures the one or more processors 904 to generate measurements of DL signals received from a plurality of satellites, e.g., via the SPS receiver 908 and/or the satellite transceiver 903. By way of example, the measurements may be GNSS measurements or may include RSRP, RSRQ, Rx-Tx, AOA from one or more SVs, and RSTD or DAOA from one or more pairs of SVs. The measurement module 922 may further configure the one or more processors 904 to perform GNSS measurements via SPS receiver 908, for A-GNSS positioning. The one or more processors 904 may be configured to send the measurements to a gNB, e.g., in response to a location request to enable determination of a location and country of the UE. The one or more processors 904 may further be configured to receive an indication of a public key from the gNB and to cipher the measurements based on the public key before sending the measurements to the gNB.

The program code 920 stored on medium 918 and/or memory 916 may include a registration module 924 that when implemented by the one or more processors 904 configures the one or more processors 904 for registration and deregistration with a serving PLMN via the satellite transceiver 903. For example, the one or more processors 904 may be configured to send, via the satellite transceiver 903 measurements to enable determination of a location and country of the UE by a gNB as part of the registration process. The one or more processors 904 may be configured to send, e.g., a NAS request message to the gNB, e.g., in an RRC message. The one or more processors 904 may be configured to receive an indication that the UE is not located in the country associated with the serving PLMN, or to receive a message accepting the registration request.

The program code 920 stored on medium 918 and/or memory 916 may include an assistance data module 926 that when implemented by the one or more processors 904 configures the one or more processors 904 for receive assistance data broadcast by a gNB via the satellite transceiver 903.

The methodologies described herein may be implemented by various means depending upon the application. For example, these methodologies may be implemented in hardware, firmware, software, or any combination thereof. For a hardware implementation, the one or more processors 904 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 900 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 918 or memory 916 and executed by one or more processors 904, causing the one or more processors 904 to operate as a special purpose computer programmed to perform the techniques disclosed herein. Memory may be implemented within the one or processors 904 or external to the one or more processors 904. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 900 may be stored as one or more instructions or code on a non-transitory computer-readable storage medium such as medium 918 or memory 916. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 900 may be provided as signals on transmission media included in a communication apparatus. For example, a communication apparatus comprising part or all of UE 900 may include a transceiver having signals indicative of instructions and data. The instructions and data are stored on non-transitory computer readable medium 918 or memory 916, and are configured to cause the one or more processors 904 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 10:
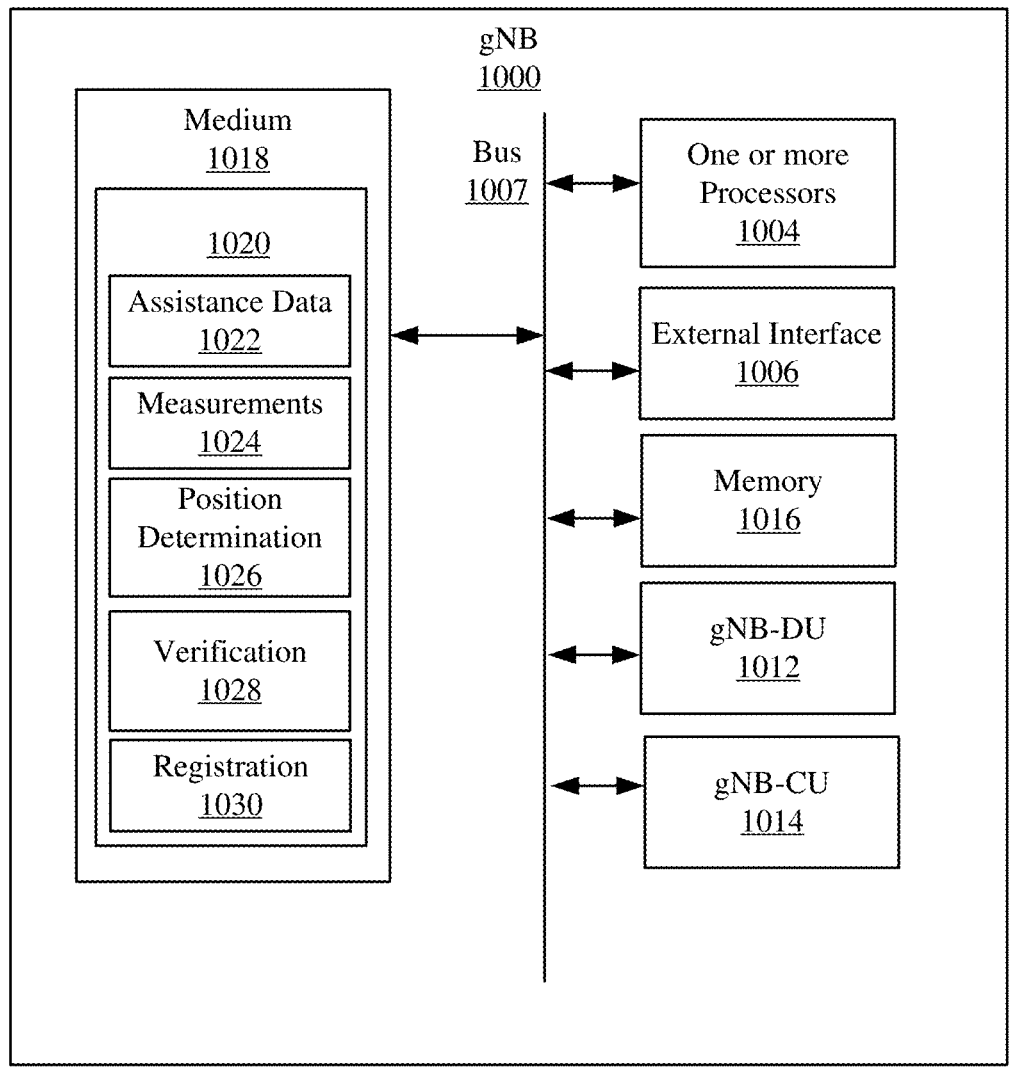
FIG. 10 is a diagram illustrating an example of a hardware implementation of a satellite NodeB (gNB) configured to support UE access to a serving PLMN through SVs.

FIG. 10 is a diagram illustrating an example of a hardware implementation of a satellite node B (gNB) 1000. The gNB 1000 may correspond to any of: (i) gNB 106, gNB-DU 104-3 or 104-4 or gNB-CU 107 illustrated in FIG. 1; (ii) gNB 202 in the SV 202 illustrated in FIG. 2; or (iii) gNB-DU 302 in the SV 302 or gNB-CU 307 illustrated in FIG. 3. The gNB 1000 may perform the signal flows 700 and 800 of FIGS. 7 and 8 and the process flow 1200 of FIG. 12. The gNB 1000 may include, e.g., hardware components such as an external interface 1006, which may comprise one or more wired and/or wireless interfaces capable of connecting to and communicating with one or more entities in a core network in a PLMN, such as AMF 122 or UPF 130 in 5GCN 110-1 shown in FIGS. 1, 2 and 3, and earth stations 104, as well as other gNBs, UEs 105 (e.g. when gNB 1000 is part of an SV 202 or SV 302) and to other elements in a wireless network directly or through one or more intermediary networks and/or one or more network entities, as shown in FIGS. 1, 2, and 3. The external interface 1006 may include one or more antennas to support a wireless interface and/or a wireless backhaul to elements in the wireless network. The gNB 1000 further includes one or more processors 1004, memory 1016, and non-transitory computer readable medium 1018, which may be coupled together with bus 1007. The gNB 1000 is illustrated as including a gNB-DU 1012 and/or gNB-CU 1014 (e.g. in the case that gNB 1000 corresponds to gNB 106-3 in FIG. 1 or corresponds to gNB 202 in FIG. 2 with gNB 202 comprising a gNB-CU and one or more gNB-DUs), which may be hardware components or implemented by specifically configured one or more processors 1004. gNB-DU 1012 and gNB-CU 1014 may not be present when gNB 1000 itself corresponds to a gNB-DU (e.g. gNB-DU 302) or to a gNB-CU (e.g. gNB-CU 307).

The one or more processors 1004 may be implemented using a combination of hardware, firmware, and software. For example, the one or more processors 1004 may be configured to perform the functions discussed herein by implementing one or more instructions or program code 1020 on a non-transitory computer readable medium, such as medium 1018 and/or memory 1016. In some embodiments, the one or more processors 1004 may represent one or more circuits configurable to perform at least a portion of a data signal computing procedure or process related to the operation of gNB 1000.

Figure 12:
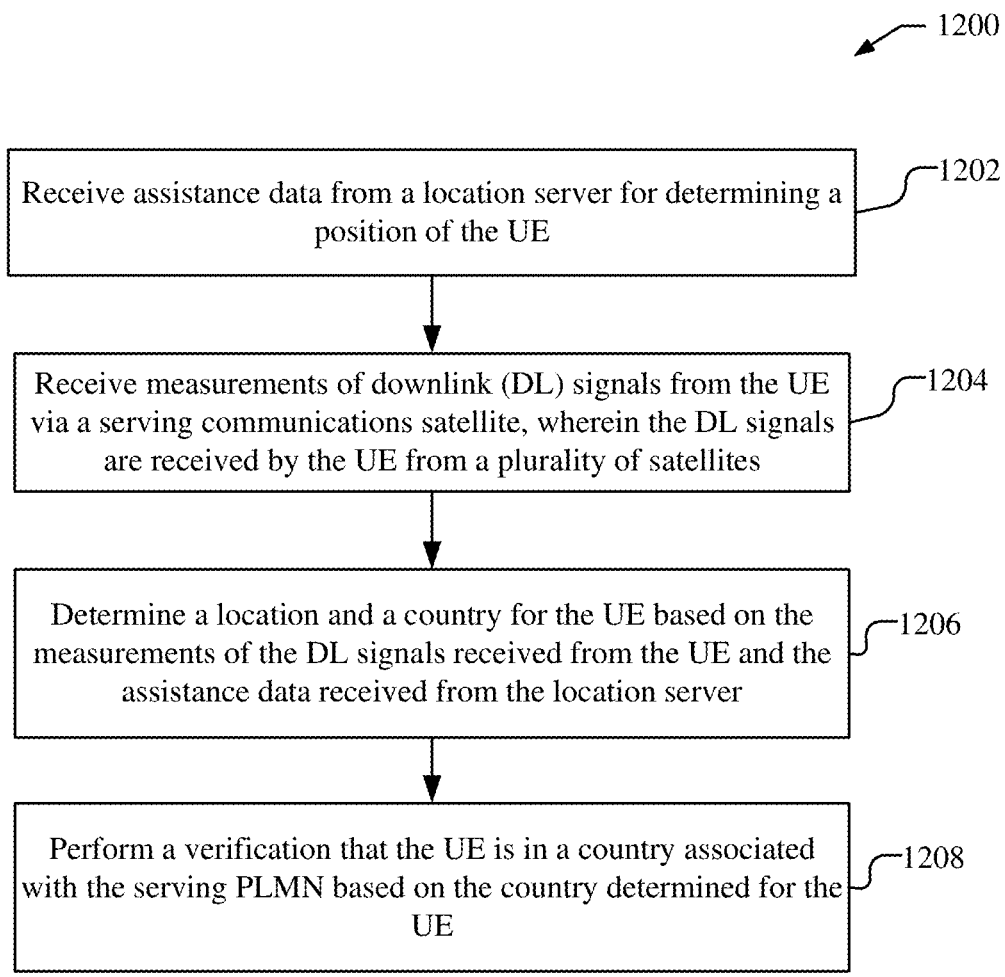
FIG. 12 is a flowchart of an example procedure performed by a gNB for UE access to a serving PLMN through SVs.

The medium 1018 and/or memory 1016 may store instructions or program code 1020 that contain executable code or software instructions that when executed by the one or more processors 1004 cause the one or more processors 1004 to operate as a special purpose computer programmed to perform the techniques disclosed herein (e.g. such as the process flow 1200 of FIG. 12). As illustrated in gNB 1000, the medium 1018 and/or memory 1016 may include one or more components or modules that may be implemented by the one or more processors 1004 to perform the methodologies described herein. While the components or modules are illustrated as software in medium 1018 that is executable by the one or more processors 1004, it should be understood that the components or modules may be stored in memory 1016 or may be dedicated hardware either in the one or more processors 1004 or off the processors.

A number of software modules and data tables may reside in the medium 1018 and/or memory 1016 and be utilized by the one or more processors 1004 in order to manage both communications and the functionality described herein. It should be appreciated that the organization of the contents of the medium 1018 and/or memory 1016 as shown in gNB 1000 is merely exemplary, and as such the functionality of the modules and/or data structures may be combined, separated, and/or be structured in different ways depending upon the implementation of the gNB 1000. While the components or modules are illustrated as software in medium 1018 and/or memory 1016 that is executable by the one or more processors 1004, it should be understood that the components or modules may be firmware or dedicated hardware either in the one or more processors 1004 or off the processors.

As illustrated, the program code 1020 stored on medium 1018 and/or memory 1016 may include an assistance data module 1022 that when implemented by the one or more processors 1004 configures the one or more processors 1004 to receive assistance data from a location server for determining a position of the UE. The one or more processors 1004 may be configured to request the assistance data, or to receive the assistance data unsolicited, e.g., periodically or based on an update to the assistance data in the location server. The one or more processors 1004 may be configured to broadcast the assistance data to UEs via a communications satellite. The assistance data, for example, may be received in an NRPPa message and the content and coding may be based on LPP or posSIB. The assistance data, for example, may include assistance data for a plurality of satellites, such as GNSS satellites and/or communication satellites. For example, the assistance data may be at least one of ephemeris data, timing information, ionosphere corrections, troposphere corrections, real time integrity, differential corrections, or a combination thereof.

The program code 1020 stored on medium 1018 and/or memory 1016 may include a measurements module 1024 that when implemented by the one or more processors 1004 configures the one or more processors 1004 to receive, via the external interface 1006, measurements produced by the UE from DL signals received by the UE from a plurality of satellites. The measurements, for example, may include GNSS measurements or RSRP, RSRQ, Rx-Tx, AOA for one or more SVs or RSTD or DAOA for one or more pairs of SVs. The one or more processors 1004 may be configured to provide a public key to the UE and an encryption algorithm with which the UE may cipher the measurements, and to decipher the received measurements based on a private key associated with the public key.

As illustrated, the program code 1020 stored on medium 1018 and/or memory 1016 may include a position determination module 1026 that when implemented by the one or more processors 1004 configures the one or more processors 1004 to determine a location and country of the UE based on received measurements and the assistance data. For example, the one or more processors 1004 may be configured to determine a location of the UE using A-GNSS, an E-CID process, TDOA, RTT, etc. The one or more processors 1004 may be configured to determine the country of the UE by mapping a determined location to the country.

As illustrated, the program code 1020 stored on medium 1018 and/or memory 1016 may include a verification module 1028 that when implemented by the one or more processors 1004 configures the one or more processors 1004 to verify whether the UE is in the country associated with the serving PLMN for the UE.

As illustrated, the program code 1020 stored on medium 1018 and/or memory 1016 may include a registration module 1030 that when implemented by the one or more processors 1004 configures the one or more processors 1004 for registration and deregistration of the UE with a serving PLMN via the external interface 1006. For example, the one or more processors 1004 may be configured to transmit and receive registration and deregistration requests with an AMF in the serving PLMN via the external interface 1006. The one or more processor 1004 may be configured to indicate whether the country of the UE has been verified to be the same as the country associated with the PLMN.

The methodologies described herein may be implemented by various means depending upon the application. For example, these methodologies may be implemented in hardware, firmware, software, or any combination thereof. For a hardware implementation, the one or more processors 1004 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of gNB 1000 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1018 or memory 1016 and executed by one or more processors 1004, causing the one or more processors 1004 to operate as a special purpose computer programmed to perform the techniques disclosed herein. Memory may be implemented within the one or processors 1004 or external to the one or more processors 1004. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by gNB 1000 may be stored as one or more instructions or code on a non-transitory computer-readable storage medium such as medium 1018 or memory 1016. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for gNB 1000 may be provided as signals on transmission media included in a communication apparatus. For example, a communication apparatus comprising part or all of gNB 1000 may include a transceiver having signals indicative of instructions and data. The instructions and data are stored on non-transitory computer readable media, e.g., medium 1018 or memory 1016, and are configured to cause the one or more processors 1004 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 11:
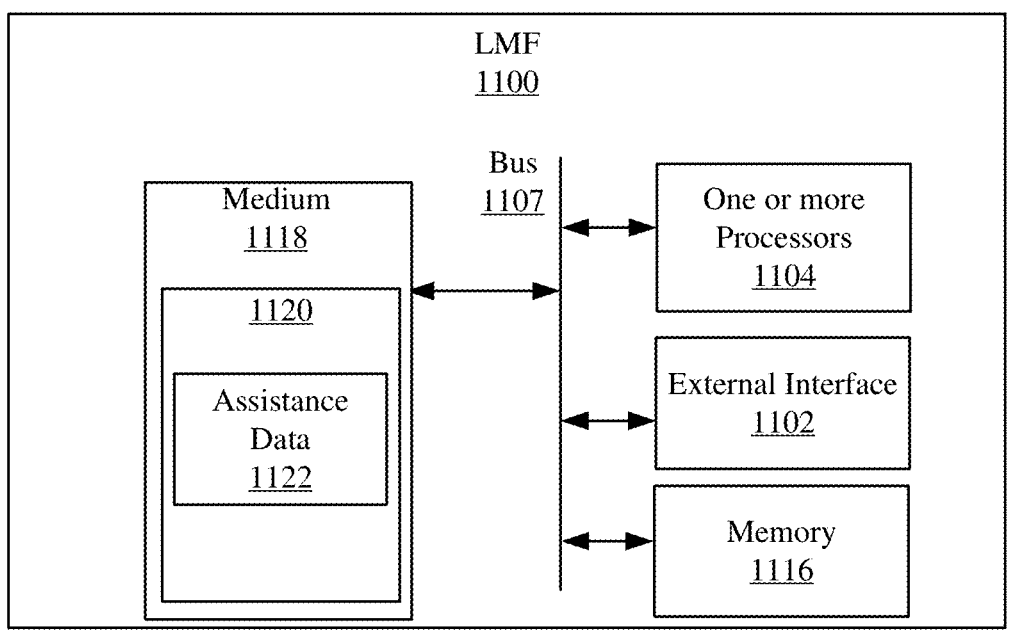
FIG. 11 is a diagram illustrating an example of a hardware implementation of a location management function (LMF) configured to support UE access to a serving PLMN through SVs.

FIG. 11 is a diagram illustrating an example of a hardware implementation of an LMF 1100 in a serving PLMN, e.g., such as LMF 124, shown in FIGS. 1, 2, and 3. The LMF 1100 may perform the signal flows 700 and 800 of FIGS. 7 and 8 and the process flow 1300 of FIG. 13. The LMF 1100 includes, e.g., hardware components such as an external interface 1102 configured to communicate with an AMF (e.g. AMF 122) and a gNB, e.g., any of gNBs 106, 202 or 307 through an AMF. The LMF 1100 includes one or more processors 1104, memory 1116, and non-transitory computer readable medium 1118, which may be coupled together with bus 1107.

The one or more processors 1104 may be implemented using a combination of hardware, firmware, and software. For example, the one or more processors 1104 may be configured to perform the functions discussed herein by implementing one or more instructions or program code 1120 on a non-transitory computer readable medium, such as medium 1118 and/or memory 1116. In some embodiments, the one or more processors 1104 may represent one or more circuits configurable to perform at least a portion of a data signal computing procedure or process related to the operation of LMF 1100.

Figure 13:
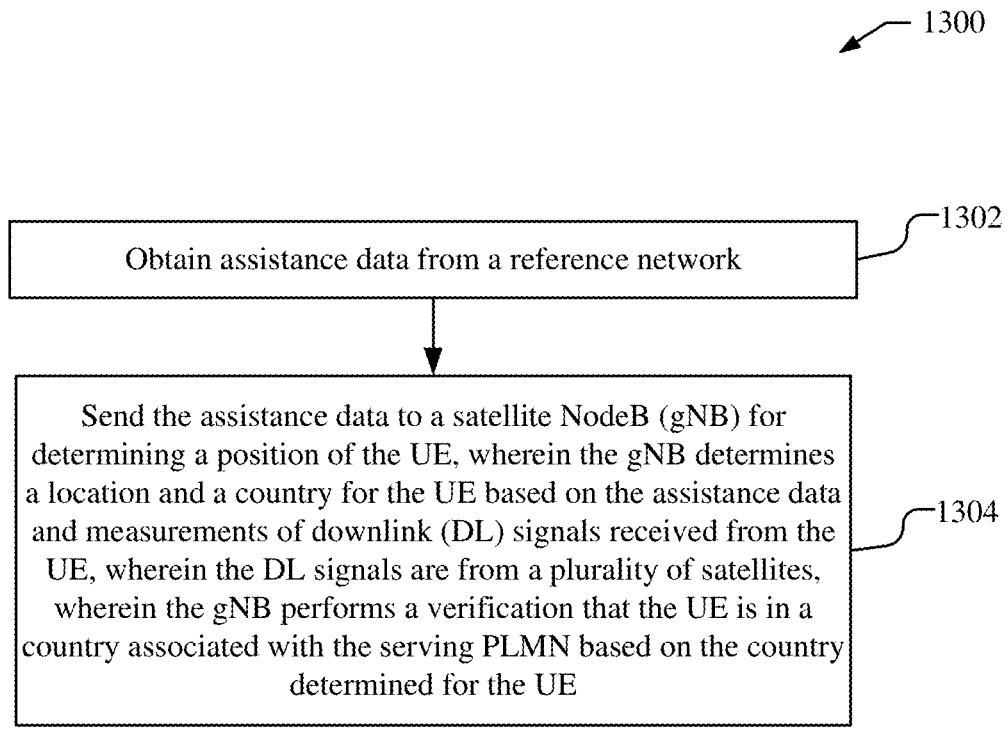
FIG. 13 is a flowchart of an example procedure performed by a location server for access to a serving PLMN through SVs.

The medium 1118 and/or memory 1116 may store instructions or program code 1120 that contain executable code or software instructions that when executed by the one or more processors 1104 cause the one or more processors 1104 to operate as a special purpose computer programmed to perform the techniques disclosed herein (e.g. such as the process flow 1300 of FIG. 13). As illustrated in LMF 1100, the medium 1118 and/or memory 1116 may include one or more components or modules that may be implemented by the one or more processors 1104 to perform the methodologies described herein. While the components or modules are illustrated as software in medium 1118 that is executable by the one or more processors 1104, it should be understood that the components or modules may be stored in memory 1116 or may be dedicated hardware either in the one or more processors 1104 or off the processors.

A number of software modules and data tables may reside in the medium 1118 and/or memory 1116 and be utilized by the one or more processors 1104 in order to manage both communications and the functionality described herein. It should be appreciated that the organization of the contents of the medium 1118 and/or memory 1116 as shown in LMF 1100 is merely exemplary, and as such the functionality of the modules and/or data structures may be combined, separated, and/or be structured in different ways depending upon the implementation of the LMF 1100. While the components or modules are illustrated as software in medium 1118 and/or memory 1116 that is executable by the one or more processors 1104, it should be understood that the components or modules may be firmware or dedicated hardware either in the one or more processors 1104 or off the processors.

As illustrated, the program code 1120 stored on medium 1118 and/or memory 1116 may include an assistance data module 1122 that when implemented by the one or more processors 1104 configures the one or more processors 1104 to obtain assistance data from a reference network, and to send the assistance data to a satellite NodeB (gNB) for determining a position of the UE. The one or more processors 1104 may be configured to send the assistance data to the gNB in response to a request or unsolicited, e.g., periodically or based on an update to the assistance data received from the reference network. The assistance data, for example, may be sent in an NRPPa message and the content and coding may be based on LPP or posSIB. The assistance data, for example, may include assistance data for a plurality of satellites, such as GNSS satellites and/or communication satellites. For example, the assistance data may be at least one of ephemeris data, timing information, ionosphere corrections, troposphere corrections, real time integrity, differential corrections, or a combination thereof.

The methodologies described herein may be implemented by various means depending upon the application. For example, these methodologies may be implemented in hardware, firmware, software, or any combination thereof. For a hardware implementation, the one or more processors 1104 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of LMF 1100 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1118 or memory 1116 and executed by one or more processors 1104, causing the one or more processors 1104 to operate as a special purpose computer programmed to perform the techniques disclosed herein. Memory may be implemented within the one or processors 1104 or external to the one or more processors 1104. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by LMF 1100 may be stored as one or more instructions or code on a non-transitory computer-readable storage medium such as medium 1118 or memory 1116. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for LMF 1100 may be provided as signals on transmission media included in a communication apparatus. For example, a communication apparatus comprising part or all of LMF 1100 may include a transceiver having signals indicative of instructions and data. The instructions and data are stored on non-transitory computer readable media, e.g., medium 1118 or memory 1116, and are configured to cause the one or more processors 1104 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

FIG. 12 shows a flowchart of an example procedure 1200 for supporting satellite wireless access by a user equipment (e.g. a UE 105) to a serving public land mobile network (PLMN), performed by a satellite NodeB (gNB), such as the gNB 106/202/307 in FIGS. 1, 2, 3.

As illustrated, at block 1202, the gNB may receive assistance data from a location server for determining a position of the UE, e.g., as discussed at stage 4 of FIG. 7 and stage 5 of FIG. 8. A means for receiving assistance data from a location server for determining a position of the UE may be, e.g., the external interface 1006 and one or more processors 1004 with dedicated hardware or implementing executable code or software instructions in memory 1016 and/or medium 1018, such as the assistance data module 1022, in gNB 1000 in FIG. 10.

At block 1204, the gNB may receive measurements of downlink (DL) signals from the UE via a serving communications satellite (e.g. an SV 102, 202 or 302), wherein the DL signals are received by the UE from a plurality of satellites, e.g., as discussed at stage 13 of FIG. 7 and stage 9 of FIG. 8. A means for receiving measurements of downlink (DL) signals from the UE via a serving communications satellite, wherein the DL signals are received by the UE from a plurality of satellites may be, e.g., the external interface 1006 and one or more processors 1004 with dedicated hardware or implementing executable code or software instructions in memory 1016 and/or medium 1018, such as the measurements module 1024, in gNB 1000 in FIG. 10.

At block 1206, the gNB may determine a location and a country for the UE based on the measurements of the DL signals received from the UE and the assistance data received from the location server, e.g., as discussed at stage 14 of FIG. 7 and stage 10 of FIG. 8. A means for determining a location and a country for the UE based on the measurements of the DL signals received from the UE and the assistance data received from the location server may be, e.g., the one or more processors 1004 with dedicated hardware or implementing executable code or software instructions in memory 1016 and/or medium 1018, such as the position determination module 1026, in gNB 1000 in FIG. 10.

At block 1208, the gNB may perform a verification that the UE is in a country associated with the serving PLMN based on the country determined for the UE, e.g., as discussed at stage 14 of FIG. 7 and stage 10 of FIG. 8. A means for performing a verification that the UE is in a country associated with the serving PLMN based on the country determined for the UE may be, e.g., the one or more processors 1004 with dedicated hardware or implementing executable code or software instructions in memory 1016 and/or medium 1018, such as the verification module 1028, in gNB 1000 in FIG. 10.

In one implementation, the gNB may send a request for the assistance data to the location server, wherein the assistance data is received in response to the request for the assistance data, e.g., as discussed at stage 2 of FIG. 7 and stage 3 of FIG. 8. A means for sending a request for the assistance data to the location server, wherein the assistance data is received in response to the request for the assistance data may be, e.g., the external interface 1006 and one or more processors 1004 with dedicated hardware or implementing executable code or software instructions in memory 1016 and/or medium 1018, such as the assistance data module 1022, in gNB 1000 in FIG. 10.

In one implementation, the assistance data may be received from the location server periodically. In one implementation, the assistance data may be received from the location server based on an update to the assistance data in the location server.

In one implementation, the gNB may broadcast some or all of the assistance data to the UE via the serving communications satellite, e.g., as discussed at stage 5 of FIG. 7. A means for broadcasting some or all of the assistance data to the UE via the serving communications satellite may be, e.g., the external interface 1006 and one or more processors 1004 with dedicated hardware or implementing executable code or software instructions in memory 1016 and/or medium 1018, such as the assistance data module 1022, in gNB 1000 in FIG. 10.

In one implementation, the assistance data may be received in a New Radio Positioning Protocol A (NRPPa) message. The content and coding for the assistance data may be based on a Long Term Evolution (LTE) Positioning Protocol (LPP) message or a positioning System Information Block (posSIB).

In one implementation, the assistance data may include assistance data for the plurality of satellites. For example, the assistance data may comprise at least one of ephemeris data, timing information, ionosphere corrections, troposphere corrections, real time integrity, differential corrections, or a combination thereof. The plurality of satellites for example, may include at least one Global Navigation Satellite System (GNSS) satellite (e.g. an SV 190). In one implementation, the plurality of satellites includes at least one communications satellite (e.g. an SV 102, 202 or 302). For example, the at least one communications satellite may be the serving communications satellite.

In one implementation, the gNB may receive via the serving communications satellite a Non-Access Stratum (NAS) request message (e.g. a NAS Registration Request or a NAS Service Request) from the UE to the serving PLMN, wherein performing the verification that the UE is in the country associated with the serving PLMN is in response to receiving the NAS request message, e.g., as discussed at stage 13 of FIG. 7. The gNB may provide the NAS request message to a first entity (e.g. an AMF 122) in a core network for the serving PLMN when the verification determines that the UE is in the country associated with the serving PLMN, e.g., as discussed at stage 16 of FIG. 7. A means for receiving via the serving communications satellite a Non-Access Stratum (NAS) request message from the UE to the serving PLMN and a means for providing the NAS request message to a first entity in a core network for the serving PLMN when the verification determines that the UE is in the country associated with the serving PLMN may be, e.g., the external interface 1006 and one or more processors 1004 with dedicated hardware or implementing executable code or software instructions in memory 1016 and/or medium 1018, such as the registration module 1030, in gNB 1000 in FIG. 10. The gNB, for example, may include with the NAS request message provided to the first entity, an indication that the country is verified by the gNB to be the country associated with the serving PLMN, or an indication that the country was not verified by the gNB to be the country associated with the serving PLMN. A means for including with the NAS request message provided to the first entity, an indication that the country is verified by the gNB to be the country associated with the serving PLMN or an indication that the country was not verified by the gNB to be the country associated with the serving PLMN may be, e.g., the external interface 1006 and one or more processors 1004 with dedicated hardware or implementing executable code or software instructions in memory 1016 and/or medium 1018, such as the registration module 1030, in gNB 1000 in FIG. 10.

In one implementation, the UE may be registered with the serving PLMN, and the gNB may perform the verification that the UE is in the country associated with the serving PLMN in order to determine whether the UE continues to access the serving PLMN, e.g., as discussed at stage 10 of FIG. 8. For example, the gNB may verify that the UE is not located in the country associated with the serving PLMN and may send a message to a core network associated with the serving PLMN (e.g. may send a message to an AMF 122), the message indicating the UE is not located in the country associated with the serving PLMN, wherein the message enables the serving PLMN to deregister the UE, e.g., as discussed at stages 11 to 16 of FIG. 8. A means for verifying the UE is not located in the country associated with the serving PLMN and a means for sending a message to a core network associated with the serving PLMN, the message indicating the UE is not located in the country associated with the serving PLMN, wherein the message enables the serving PLMN to deregister the UE may be, e.g., the external interface 1006 and one or more processors 1004 with dedicated hardware or implementing executable code or software instructions in memory 1016 and/or medium 1018, such as the verification module 1028 and the registration module 1030, in gNB 1000 in FIG. 10.

In one implementation, the measurements of the DL signals are received from the UE in a Radio Resource Control (RRC) message, wherein the RRC message is sent by the UE to establish an RRC Signaling Connection between the UE and the gNB, e.g., as discussed at stage 13 of FIG. 7 and stage 9 of FIG. 8. The measurements of the DL signals may be ciphered by the UE based on a public key, and the gNB may indicate the public key to the UE, e.g., as discussed at stages 5 and 11 of FIG. 7, and may decipher the measurements of the DL signals received in the RRC message, based on a private key associated with the public key, e.g., as discussed at stage 14 of FIG. 7. A means for indicating the public key to the UE, and a means for deciphering the measurements of the DL signals received in the RRC message, based on a private key associated with the public key may be, e.g., the external interface 1006 and one or more processors 1004 with dedicated hardware or implementing executable code or software instructions in memory 1016 and/or medium 1018, measurements module 1024, in gNB 1000 in FIG. 10.

FIG. 13 shows a flowchart of an example procedure 1300 for supporting satellite wireless access by a user equipment (e.g. a UE 105) to a serving public land mobile network (PLMN), performed by a location server associated with the serving PLMN, such as the LMF 124 in FIGS. 1, 2, 3.

As illustrated, at block 1302, the location server obtains assistance data from a reference network, e.g., as discussed at stage 3 of FIG. 7 and stage 4 of FIG. 8. A means for obtaining assistance data from a reference network may be, e.g., the external interface 1102 and one or more processors 1104 with dedicated hardware or implementing executable code or software instructions in memory 1116 and/or medium 1118, such as the assistance data module 1122 in LMF 1100 in FIG. 11.

At block 1304, the location server may send the assistance data to a satellite NodeB (e.g. a gNB 106, 202 or 307) for determining a position of the UE, wherein the gNB determines a location and a country for the UE based on the assistance data and measurements of downlink (DL) signals received from the UE, wherein the DL signals are from a plurality of satellites, wherein the gNB performs a verification that the UE is in a country associated with the serving PLMN based on the country determined for the UE, e.g., as discussed at stages 4 and 14 of FIG. 7 and stages 5 and 10 of FIG. 8. A means for sending the assistance data to a satellite NodeB (gNB) for determining a position of the UE may be, e.g., the external interface 1102 and one or more processors 1104 with dedicated hardware or implementing executable code or software instructions in memory 1116 and/or medium 1118, such as the assistance data module 1122 in LMF 1100 in FIG. 11.

In one implementation, the location server may receive a request for the assistance data from the gNB, wherein the assistance data is sent in response to receiving the request for the assistance data, e.g., as discussed at stage 2 of FIG. 7 and stage 3 of FIG. 8. A means for receiving a request for the assistance data from the gNB, wherein the assistance data is sent in response to receiving the request for the assistance data may be, e.g., the external interface 1102 and one or more processors 1104 with dedicated hardware or implementing executable code or software instructions in memory 1116 and/or medium 1118, such as the assistance data module 1122 in LMF 1100 in FIG. 11.

In one implementation, the assistance data may be sent to the gNB periodically. In one implementation, the location server may receive updated assistance data from the reference network and may send the updated assistance data to the gNB, e.g., as discussed at stages 3 and 4 of FIG. 7 and stages 4 and 5 of FIG. 8. A means for receiving updated assistance data from the reference network, and a means for sending the updated assistance data to the gNB may be, e.g., the external interface 1102 and one or more processors 1104 with dedicated hardware or implementing executable code or software instructions in memory 1116 and/or medium 1118, such as the assistance data module 1122 in LMF 1100 in FIG. 11.

In one implementation, the assistance data may be sent in a New Radio Positioning Protocol A (NRPPa) message. The content and coding for the assistance data may be based on a Long Term Evolution (LTE) Positioning Protocol (LPP) message or a positioning System Information Block (posSIB).

In one implementation, the assistance data may include assistance data for the plurality of satellites. For example, the assistance data may include at least one of ephemeris data, timing information, ionosphere corrections, troposphere corrections, real time integrity, differential corrections, or a combination thereof. The plurality of satellites may include at least one GNSS satellite (e.g. an SV 190). The plurality of satellites may include at least one communications satellite (e.g. an SV 102, 202 or 302).

FIG. 14 shows a flowchart of an example procedure 1400 for supporting satellite wireless access by a user equipment (UE) to a serving public land mobile network (PLMN), performed by the UE, such as the UE 105 in FIGS. 1, 2, 3.

As illustrated, at block 1402, the UE obtains measurements of downlink (DL) signals received from a plurality of satellites, e.g., as discussed at stage 8 of FIGS. 7 and 8. A means for obtaining measurements of downlink (DL) signals received from a plurality of satellites may be, e.g., the SPS receiver, 908, the satellite transceiver 903 and one or more processors 904 with dedicated hardware or implementing executable code or software instructions in memory 916 and/or medium 918, such as measurement module 922, in UE 900 in FIG. 9.

At block 1404, the UE sends the measurements of the DL signals to a satellite NodeB (e.g. gNB 106, 202 or 307) via a serving communications satellite (e.g. SV 102, 202 or 302), wherein the measurements enable the gNB to determine a location and a country for the UE based on assistance data received by the gNB from a location server (e.g. an LMF 124), e.g., as discussed at stages 13 and 14 of FIG. 7 and stages 9 and 10 of FIG. 8. A means for sending the measurements of the DL signals to a satellite NodeB (gNB) via a serving communications satellite, wherein the measurements enable the gNB to determine a location and a country for the UE based on assistance data received by the gNB from a location server may be, e.g., the satellite transceiver 903 and one or more processors 904 with dedicated hardware or implementing executable code or software instructions in memory 916 and/or medium 918, such as measurement module 922 or registration module 924, in UE 900 in FIG. 9.

In one implementation, the UE may send via the serving communications satellite a Non-Access Stratum (NAS) request message (e.g. a NAS Registration Request or NAS Service Request) to the gNB for the serving PLMN, wherein the gNB performs a verification that the UE is in a country associated with the serving PLMN based on the country determined for the UE in response to receiving the NAS request message, e.g., as discussed at stages 13 and 14 of FIG. 7. A means for sending via the serving communications satellite a Non-Access Stratum (NAS) request message to the gNB for the serving PLMN, wherein the gNB performs a verification that the UE is in a country associated with the serving PLMN based on the country determined for the UE in response to receiving the NAS request message may be, e.g., the satellite transceiver 903 and one or more processors 904 with dedicated hardware or implementing executable code or software instructions in memory 916 and/or medium 918, such as registration module 924, in UE 900 in FIG. 9.

In one implementation, the UE may receive a NAS accept message from an entity (e.g. an AMF 122) in a core network associated with the serving PLMN when the UE is located in the country associated with the serving PLMN, wherein the NAS accept message acknowledges the NAS request message, e.g., as discussed at stage 17 of FIG. 7. A means for receiving a NAS accept message from an entity in a core network associated with the serving PLMN when the UE is located in the country associated with the serving PLMN, wherein the NAS accept message acknowledges the NAS request message may be, e.g., the satellite transceiver 903 and one or more processors 904 with dedicated hardware or implementing executable code or software instructions in memory 916 and/or medium 918, such as registration module 924, in UE 900 in FIG. 9.

In one implementation, the UE is registered with the serving PLMN, wherein the gNB performs a verification that the UE is in a country associated with the serving PLMN, based on the country determined for the UE, to determine whether the UE continues to access the serving PLMN.

In one implementation, the measurements of the DL signals are sent to the gNB in a Radio Resource Control (RRC) message, wherein the RRC message is sent to the gNB to establish an RRC Signaling Connection between the UE and the gNB, e.g., as discussed at stage 13 of FIG. 7. In one implementation, the UE may receive from the gNB an indication of a public key, e.g., as discussed at stages 5 or 11 of FIG. 7, and the UE may cipher the measurements of the DL signals based on the public key before sending the measurements of the DL signals to the gNB, e.g., as discussed at stage 13 of FIG. 7. A means for receiving from the gNB an indication of a public key, and a means for ciphering the measurements of the DL signals based on the public key before sending the measurements of the DL signals to the gNB may be, e.g., the satellite transceiver 903 and one or more processors 904 with dedicated hardware or implementing executable code or software instructions in memory 916 and/or medium 918, such as measurement module 922, in UE 900 in FIG. 9.

In one implementation, the UE may receive second assistance data broadcast by the gNB, wherein the second assistance data comprises some or all of the assistance data received by the gNB from the location server, and may obtain the measurements of the DL signals, based in part on the second assistance data, e.g., as discussed at stages 5 and 8 of FIG. 7 and stages 6 and 8 of FIG. 8. A means for receiving second assistance data broadcast by the gNB, wherein the second assistance data comprises some or all of the assistance data received by the gNB from the location server, and means for obtaining the DL measurements, based in part on the second assistance data may be, e.g., the satellite transceiver 903 and one or more processors 904 with dedicated hardware or implementing executable code or software instructions in memory 916 and/or medium 918, such as assistance data module 926, in UE 900 in FIG. 9. The second assistance data may comprise assistance data for the plurality of satellites. The second assistance data may include at least one of ephemeris data, acquisition assistance data, almanac data, timing information, ionosphere corrections, troposphere corrections, real time integrity, differential corrections, or a combination thereof. The second assistance data may also or instead include identities or types of the DL signals, information on frequency, timing, coding and/or Doppler shift for the DL signals, or a combination thereof.

In one implementation, the plurality of satellites may include at least one GNSS satellite (e.g. an SV 190). In one implementation, the plurality of satellites may include at least one communications satellite (e.g. an SV 102, 202 or 302). For example, the at least one communications satellite may be the serving communications satellite.

In one implementation, the UE may receive a message from the gNB indicating that the UE is not located in a country associated with the serving PLMN, e.g., as discussed at stage 15 of FIG. 7. A means for receiving a message from the gNB indicating that the UE is not located in a country associated with the serving PLMN may be, e.g., the satellite transceiver 903 and one or more processors 904 with dedicated hardware or implementing executable code or software instructions in memory 916 and/or medium 918, such as registration module 924, in UE 900 in FIG. 9.

Abbreviations used herein may be identified in Table 1 as follows:

TABLE 1

| | |
|---|---|
| EM | Emergency |
| ES | Earth Station |
| GEO | Geostationary Earth Orbit |
| ISL | Inter-Satellite Links |
| LEO | Low Earth Orbit |
| LI | Lawful Interception |
| MEO | Medium Earth Orbit |
| MNO | Mobile Network Operator |
| NGEO | Non-Geostationary Earth Orbiting |
| NTN | Non-Terrestrial Network |
| gNB | satellite Node B |
| SV | Space Vehicle |
| SVO | SV Operator |
| TA | Tracking Area |
| TAC | Tracking Area Code |
| TAI | Tracking Area Identity |
| WEA | Wireless Emergency Alerting |

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

In view of this description embodiments may include different combinations of features. Implementation examples are described in the following numbered clauses:

Clause 1. A method performed by a satellite NodeB (gNB) for supporting satellite wireless access by a user equipment (UE) to a serving public land mobile network (PLMN), the method comprising: receiving assistance data from a location server for determining a position of the UE; receiving measurements of downlink (DL) signals from the UE via a serving communications satellite, wherein the DL signals are received by the UE from a plurality of satellites; determining a location and a country for the UE based on the measurements of the DL signals received from the UE and the assistance data received from the location server; and performing a verification that the UE is in a country associated with the serving PLMN based on the country determined for the UE.

Clause 2. The method of clause 1, further comprising sending a request for the assistance data to the location server, wherein the assistance data is received in response to the request for the assistance data.

Clause 3. The method of any of clauses 1-2, wherein the assistance data is received from the location server periodically.

Clause 4. The method of any of clauses 1-3, wherein the assistance data is received from the location server based on an update to the assistance data in the location server.

Clause 5. The method of any of clauses 1-4, further comprising broadcasting some or all of the assistance data to the UE via the serving communications satellite.

Clause 6. The method of any of clauses 1-5, wherein the assistance data is received in a New Radio Positioning Protocol A (NRPPa) message.

Clause 7. The method of clause 6, wherein content and coding for the assistance data is based on a Long Term Evolution (LTE) Positioning Protocol (LPP) message or a positioning System Information Block (posSIB).

Clause 8. The method of any of clauses 1-7, wherein the assistance data comprises assistance data for the plurality of satellites.

Clause 9. The method of clause 8, wherein the assistance data comprises at least one of ephemeris data, timing information, ionosphere corrections, troposphere corrections, real time integrity, differential corrections, or a combination thereof.

Clause 10. The method of any of clauses 8-9, wherein the plurality of satellites include at least one Global Navigation Satellite System (GNSS) satellite.

Clause 11. The method of any of clauses 8-10, wherein the plurality of satellites includes at least one communications satellite.

Clause 12. The method of clause 11, wherein the at least one communications satellite is the serving communications satellite.

Clause 13. The method of any of clauses 1-12, further comprising: receiving via the serving communications satellite a Non-Access Stratum (NAS) request message from the UE to the serving PLMN, wherein performing the verification that the UE is in the country associated with the serving PLMN is in response to receiving the NAS request message; and providing the NAS request message to a first entity in a core network for the serving PLMN when the verification determines that the UE is in the country associated with the serving PLMN.

Clause 14. The method of clause 13, further comprising: including, with the NAS request message provided to the first entity, an indication that the country is verified by the gNB to be the country associated with the serving PLMN, or an indication that the country was not verified by the gNB to be the country associated with the serving PLMN.

Clause 15. The method of any of clauses 1-14, wherein the UE is registered with the serving PLMN, wherein the verification that the UE is in the country associated with the serving PLMN is performed to determine whether the UE continues to access the serving PLMN.

Clause 16. The method of clause 15, further comprising: verifying the UE is not located in the country associated with the serving PLMN; and sending a message to a core network associated with the serving PLMN, the message indicating the UE is not located in the country associated with the serving PLMN, wherein the message enables the serving PLMN to deregister the UE.

Clause 17. The method of any of clauses 1-16, wherein the measurements of the DL signals are received from the UE in a Radio Resource Control (RRC) message, wherein the RRC message is sent by the UE to establish an RRC Signaling Connection between the UE and the gNB.

Clause 18. The method of clause 17, wherein the measurements of the DL signals are ciphered by the UE based on a public key, the method further comprising: indicating the public key to the UE; and deciphering the measurements of the DL signals received in the RRC message, based on a private key associated with the public key.

Clause 19. A satellite NodeB (gNB) configured for supporting satellite wireless access by a user equipment (UE) to a serving public land mobile network (PLMN) comprising: an external interface configured to communicate with network entities; at least one memory; at least one processor coupled to the external interface and the at least one memory, wherein the at least one processor is configured to: receive, via the external interface, assistance data from a location server for determining a position of the UE; receive, via the external interface, measurements of downlink (DL) signals from the UE via a serving communications satellite, wherein the DL signals are received by the UE from a plurality of satellites; determine a location and a country for the UE based on the measurements of the DL signals received from the UE and the assistance data received from the location server; and perform a verification that the UE is in a country associated with the serving PLMN based on the country determined for the UE.

Clause 20. The gNB of clause 19, wherein the at least one processor is further configured to send, via the external interface, a request for the assistance data to the location server, wherein the assistance data is received in response to the request for the assistance data.

Clause 21. The gNB of any of clauses 19-20, wherein the assistance data is received from the location server periodically.

Clause 22. The gNB of any of clauses 19-21, wherein the assistance data is received from the location server based on an update to the assistance data in the location server.

Clause 23. The gNB of any of clauses 19-22, wherein the at least one processor is further configured to broadcast some or all of the assistance data to the UE via the serving communications satellite.

Clause 24. The gNB of any of clauses 19-23, wherein the assistance data is received in a New Radio Positioning Protocol A (NRPPa) message.

Clause 25. The gNB of clause 24, wherein content and coding for the assistance data is based on a Long Term Evolution (LTE) Positioning Protocol (LPP) message or a positioning System Information Block (posSIB).

Clause 26. The gNB of any of clauses 19-25, wherein the assistance data comprises assistance data for the plurality of satellites.

Clause 27. The gNB of clause 26, wherein the assistance data comprises at least one of ephemeris data, timing information, ionosphere corrections, troposphere corrections, real time integrity, differential corrections, or a combination thereof.

Clause 28. The gNB of any of clauses 26-27, wherein the plurality of satellites include at least one Global Navigation Satellite System (GNSS) satellite.

Clause 29. The gNB of any of clauses 26-28, wherein the plurality of satellites includes at least one communications satellite.

Clause 30. The gNB of clause 29, wherein the at least one communications satellite is the serving communications satellite.

Clause 31. The gNB of any of clauses 19-30, wherein the at least one processor is further configured to: receive via the serving communications satellite a Non-Access Stratum (NAS) request message from the UE to the serving PLMN, wherein performing the verification that the UE is in the country associated with the serving PLMN is in response to receiving the NAS request message; and provide, via the external interface, the NAS request message to a first entity in a core network for the serving PLMN when the verification determines that the UE is in the country associated with the serving PLMN.

Clause 32. The gNB of clause 31, wherein the at least one processor is further configured to: include, with the NAS request message provided to the first entity, an indication that the country is verified by the gNB to be the country associated with the serving PLMN, or an indication that the country was not verified by the gNB to be the country associated with the serving PLMN.

Clause 33. The gNB of any of clauses 19-32, wherein the UE is registered with the serving PLMN, wherein the verification that the UE is in the country associated with the serving PLMN is performed to determine whether the UE continues to access the serving PLMN.

Clause 34. The gNB of clause 33, wherein the at least one processor is further configured to: verify the UE is not located in the country associated with the serving PLMN; and send, via the external interface, a message to a core network associated with the serving PLMN, the message indicating the UE is not located in the country associated with the serving PLMN, wherein the message enables the serving PLMN to deregister the UE.

Clause 35. The gNB of any of clauses 19-34, wherein the measurements of the DL signals are received from the UE in a Radio Resource Control (RRC) message, wherein the RRC message is sent by the UE to establish an RRC Signaling Connection between the UE and the gNB.

Clause 36. The gNB of clause 35, wherein the measurements of the DL signals are ciphered by the UE based on a public key, wherein the at least one processor is further configured to: indicate the public key to the UE; and decipher the measurements of the DL signals received in the RRC message, based on a private key associated with the public key.

Clause 37. A satellite NodeB (gNB) for supporting satellite wireless access by a user equipment (UE) to a serving public land mobile network (PLMN), comprising: means for receiving assistance data from a location server for determining a position of the UE; means for receiving measurements of downlink (DL) signals from the UE via a serving communications satellite, wherein the DL signals are received by the UE from a plurality of satellites; means for determining a location and a country for the UE based on the measurements of the DL signals received from the UE and the assistance data received from the location server; and means for performing a verification that the UE is in a country associated with the serving PLMN based on the country determined for the UE.

Clause 38. The gNB of clause 37, further comprising means for sending a request for the assistance data to the location server, wherein the assistance data is received in response to the request for the assistance data.

Clause 39. The gNB of any of clauses 37-38, wherein the assistance data is received from the location server periodically.

Clause 40. The gNB of any of clauses 37-39, wherein the assistance data is received from the location server based on an update to the assistance data in the location server.

Clause 41. The gNB of any of clauses 37-40, further comprising means for broadcasting some or all of the assistance data to the UE via the serving communications satellite.

Clause 42. The gNB of any of clauses 37-41, wherein the assistance data is received in a New Radio Positioning Protocol A (NRPPa) message.

Clause 43. The gNB of clause 42, wherein content and coding for the assistance data is based on a Long Term Evolution (LTE) Positioning Protocol (LPP) message or a positioning System Information Block (posSIB).

Clause 44. The gNB of any of clauses 37-43, wherein the assistance data comprises assistance data for the plurality of satellites.

Clause 45. The gNB of clause 44, wherein the assistance data comprises at least one of ephemeris data, timing information, ionosphere corrections, troposphere corrections, real time integrity, differential corrections, or a combination thereof.

Clause 46. The gNB of any of clauses 44-45, wherein the plurality of satellites include at least one Global Navigation Satellite System (GNSS) satellite.

Clause 47. The gNB of any of clauses 44-46, wherein the plurality of satellites includes at least one communications satellite.

Clause 48. The gNB of clause 47, wherein the at least one communications satellite is the serving communications satellite.

Clause 49. The gNB of any of clauses 37-48, further comprising: means for receiving via the serving communications satellite a Non-Access Stratum (NAS) request message from the UE to the serving PLMN, wherein performing the verification that the UE is in the country associated with the serving PLMN is in response to receiving the NAS request message; and means for providing the NAS request message to a first entity in a core network for the serving PLMN when the verification determines that the UE is in the country associated with the serving PLMN.

Clause 50. The gNB of clause 49, further comprising: means for including, with the NAS request message provided to the first entity, an indication that the country is verified by the gNB to be the country associated with the serving PLMN, or an indication that the country was not verified by the gNB to be the country associated with the serving PLMN.

Clause 51. The gNB of any of clauses 37-50, wherein the UE is registered with the serving PLMN, wherein the verification that the UE is in the country associated with the serving PLMN is performed to determine whether the UE continues to access the serving PLMN.

Clause 52. The gNB of clause 51, further comprising: means for verifying the UE is not located in the country associated with the serving PLMN; and means for sending a message to a core network associated with the serving PLMN, the message indicating the UE is not located in the country associated with the serving PLMN, wherein the message enables the serving PLMN to deregister the UE.

Clause 53. The gNB of any of clauses 37-52, wherein the measurements of the DL signals are received from the UE in a Radio Resource Control (RRC) message, wherein the RRC message is sent by the UE to establish an RRC Signaling Connection between the UE and the gNB.

Clause 54. The gNB of clause 53, wherein the measurements of the DL signals are ciphered by the UE based on a public key, further comprising: means for indicating the public key to the UE; and means for deciphering the measurements of the DL signals received in the RRC message, based on a private key associated with the public key.

Clause 55. A non-transitory storage medium including program code stored thereon, the program code is operable to configure at least one processor in a satellite NodeB (gNB) for supporting satellite wireless access by a user equipment (UE) to a serving public land mobile network (PLMN), the program code comprising instructions to: receive assistance data from a location server for determining a position of the UE; receive measurements of downlink (DL) signals from the UE via a serving communications satellite, wherein the DL signals are received by the UE from a plurality of satellites; determine a location and a country for the UE based on the measurements of the DL signals received from the UE and the assistance data received from the location server; and perform a verification that the UE is in a country associated with the serving PLMN based on the country determined for the UE.

Clause 56. The non-transitory computer readable medium of clause 55, wherein the program code further comprises instructions to send a request for the assistance data to the location server, wherein the assistance data is received in response to the request for the assistance data.

Clause 57. The non-transitory computer readable medium of any of clauses 55-56, wherein the assistance data is received from the location server periodically.

Clause 58. The non-transitory computer readable medium of any of clauses 55-57, wherein the assistance data is received from the location server based on an update to the assistance data in the location server.

Clause 59. The non-transitory computer readable medium of any of clauses 55-58, wherein the program code further comprises instructions to broadcast some or all of the assistance data to the UE via the serving communications satellite.

Clause 60. The non-transitory computer readable medium of any of clauses 55-59, wherein the assistance data is received in a New Radio Positioning Protocol A (NRPPa) message.

Clause 61. The non-transitory computer readable medium of clause 60, wherein content and coding for the assistance data is based on a Long Term Evolution (LTE) Positioning Protocol (LPP) message or a positioning System Information Block (posSIB).

Clause 62. The non-transitory computer readable medium of any of clauses 55-61, wherein the assistance data comprises assistance data for the plurality of satellites.

Clause 63. The non-transitory computer readable medium of clause 62, wherein the assistance data comprises at least one of ephemeris data, timing information, ionosphere corrections, troposphere corrections, real time integrity, differential corrections, or a combination thereof.

Clause 64. The non-transitory computer readable medium of any of clauses 62-63, wherein the plurality of satellites include at least one Global Navigation Satellite System (GNSS) satellite.

Clause 65. The non-transitory computer readable medium of any of clauses 62-64, wherein the plurality of satellites includes at least one communications satellite.

Clause 66. The non-transitory computer readable medium of clause 65, wherein the at least one communications satellite is the serving communications satellite.

Clause 67. The non-transitory computer readable medium of any of clauses 55-66, wherein the program code further comprises instructions to: receive via the serving communications satellite a Non-Access Stratum (NAS) request message from the UE to the serving PLMN, wherein performing the verification that the UE is in the country associated with the serving PLMN is in response to receiving the NAS request message; and provide the NAS request message to a first entity in a core network for the serving PLMN when the verification determines that the UE is in the country associated with the serving PLMN.

Clause 68. The non-transitory computer readable medium of clause 67, wherein the program code further comprises instructions to: include, with the NAS request message provided to the first entity, an indication that the country is verified by the gNB to be the country associated with the serving PLMN, or an indication that the country was not verified by the gNB to be the country associated with the serving PLMN.

Clause 69. The non-transitory computer readable medium of any of clauses 55-68, wherein the UE is registered with the serving PLMN, wherein the verification that the UE is in the country associated with the serving PLMN is performed to determine whether the UE continues to access the serving PLMN.

Clause 70. The non-transitory computer readable medium of clause 69, wherein the program code further comprises instructions to: verify the UE is not located in the country associated with the serving PLMN; and send a message to a core network associated with the serving PLMN, the message indicating the UE is not located in the country associated with the serving PLMN, wherein the message enables the serving PLMN to deregister the UE.

Clause 71. The non-transitory computer readable medium of any of clauses 55-70, wherein the measurements of the DL signals are received from the UE in a Radio Resource Control (RRC) message, wherein the RRC message is sent by the UE to establish an RRC Signaling Connection between the UE and the gNB.

Clause 72. The non-transitory computer readable medium of clause 71, wherein the measurements of the DL signals are ciphered by the UE based on a public key, wherein the at least one processor is further configured to: indicate the public key to the UE; and decipher the measurements of the DL signals received in the RRC message, based on a private key associated with the public key.

Clause 73. A method performed by a location server associated with a serving public land mobile network (PLMN) for supporting satellite wireless access by a user equipment (UE) to the serving PLMN, the method comprising: obtaining assistance data from a reference network; and sending the assistance data to a satellite NodeB (gNB) for determining a position of the UE to enable the gNB to determine a location and a country for the UE based on the assistance data and measurements of downlink (DL) signals received from the UE, wherein the DL signals are from a plurality of satellites, and to enable the gNB to perform a verification that the UE is in a country associated with the serving PLMN based on the country determined for the UE.

Clause 74. The method of clause 73, further comprising receiving a request for the assistance data from the gNB, wherein the assistance data is sent in response to receiving the request for the assistance data.

Clause 75. The method of any of clauses 73-74, wherein the assistance data is sent to the gNB periodically.

Clause 76. The method of any of clauses 73-75, further comprising: receiving updated assistance data from the reference network; and sending the updated assistance data to the gNB.

Clause 77. The method of any of clauses 73-76, wherein the assistance data is sent in a New Radio Positioning Protocol A (NRPPa) message.

Clause 78. The method of clause 77, wherein content and coding for the assistance data is based on a Long Term Evolution (LTE) Positioning Protocol (LPP) message or a positioning System Information Block (posSIB).

Clause 79. The method of any of clauses 73-78, wherein the assistance data comprises assistance data for the plurality of satellites.

Clause 80. The method of clause 79, wherein the assistance data comprises at least one of ephemeris data, timing information, ionosphere corrections, troposphere corrections, real time integrity, differential corrections, or a combination thereof.

Clause 81. The method of any of clauses 79-80, wherein the plurality of satellites includes at least one Global Navigation Satellite System (GNSS) satellite.

Clause 82. The method of any of clauses 79-81, wherein the plurality of satellites includes at least one communications satellite.

Clause 83. A location server associated with a serving public land mobile network (PLMN) configured for supporting satellite wireless access by a user equipment (UE) to the serving PLMN, comprising: an external interface configured to communicate with network entities; at least one memory; at least one processor coupled to the external interface and the at least one memory, wherein the at least one processor is configured to: obtain, via the external interface, assistance data from a reference network; and send, via the external interface, the assistance data to a satellite NodeB (gNB) for determining a position of the UE to enable the gNB to determine a location and a country for the UE based on the assistance data and measurements of downlink (DL) signals received from the UE, wherein the DL signals are from a plurality of satellites, and to enable the gNB to perform a verification that the UE is in a country associated with the serving PLMN based on the country determined for the UE.

Clause 84. The location server of clause 83, wherein the at least one processor is further configured to receive, via the external interface, a request for the assistance data from the gNB, wherein the assistance data is sent in response to receiving the request for the assistance data.

Clause 85. The location server of any of clauses 83-84, wherein the assistance data is sent to the gNB periodically.

Clause 86. The location server of any of clauses 83-85, wherein the at least one processor is further configured to: receive, via the external interface, updated assistance data from the reference network; and send, via the external interface, the updated assistance data to the gNB.

Clause 87. The location server of any of clauses 83-86, wherein the assistance data is sent in a New Radio Positioning Protocol A (NRPPa) message.

Clause 88. The location server of clause 87, wherein content and coding for the assistance data is based on a Long Term Evolution (LTE) Positioning Protocol (LPP) message or a positioning System Information Block (posSIB).

Clause 89. The location server of any of clauses 83-88, wherein the assistance data comprises assistance data for the plurality of satellites.

Clause 90. The location server of clause 89, wherein the assistance data comprises at least one of ephemeris data, timing information, ionosphere corrections, troposphere corrections, real time integrity, differential corrections, or a combination thereof.

Clause 91. The location server of any of clauses 89-90, wherein the plurality of satellites includes at least one Global Navigation Satellite System (GNSS) satellite.

Clause 92. The location server of any of clauses 89-91, wherein the plurality of satellites includes at least one communications satellite.

Clause 93. A location server associated with a serving public land mobile network (PLMN) configured for supporting satellite wireless access by a user equipment (UE) to the serving PLMN, comprising: means for obtaining assistance data from a reference network; and means for sending the assistance data to a satellite NodeB (gNB) for determining a position of the UE to enable the gNB to determine a location and a country for the UE based on the assistance data and measurements of downlink (DL) signals received from the UE, wherein the DL signals are from a plurality of satellites, and to enable the gNB to perform a verification that the UE is in a country associated with the serving PLMN based on the country determined for the UE.

Clause 94. The location server of clause 93, further comprising means for receiving a request for the assistance data from the gNB, wherein the assistance data is sent in response to receiving the request for the assistance data.

Clause 95. The location server of any of clauses 93-94, wherein the assistance data is sent to the gNB periodically.

Clause 96. The location server of any of clauses 93-95, further comprising: means for receiving updated assistance data from the reference network; and means for sending the updated assistance data to the gNB.

Clause 97. The location server of any of clauses 93-96, wherein the assistance data is sent in a New Radio Positioning Protocol A (NRPPa) message.

Clause 98. The location server of clause 97, wherein content and coding for the assistance data is based on a Long Term Evolution (LTE) Positioning Protocol (LPP) message or a positioning System Information Block (posSIB).

Clause 99. The location server of any of clauses 93-98, wherein the assistance data comprises assistance data for the plurality of satellites.

Clause 100. The location server of clause 99, wherein the assistance data comprises at least one of ephemeris data, timing information, ionosphere corrections, troposphere corrections, real time integrity, differential corrections, or a combination thereof.

Clause 101. The location server of any of clauses 99-100, wherein the plurality of satellites includes at least one Global Navigation Satellite System (GNSS) satellite.

Clause 102. The location server of any of clauses 99-101, wherein the plurality of satellites includes at least one communications satellite.

Clause 103. A non-transitory storage medium including program code stored thereon, the program code is operable to configure at least one processor in a location server associated with a serving public land mobile network (PLMN) for supporting satellite wireless access by a user equipment (UE) to the serving PLMN, the program code comprising instructions to: obtain assistance data from a reference network; and send the assistance data to a satellite NodeB (gNB) for determining a position of the UE to enable the gNB to determine a location and a country for the UE based on the assistance data and measurements of downlink (DL) signals received from the UE, wherein the DL signals are from a plurality of satellites, and to enable the gNB to perform a verification that the UE is in a country associated with the serving PLMN based on the country determined for the UE.

Clause 104. The non-transitory storage medium of clause 103, wherein the program code further comprises instructions to receive a request for the assistance data from the gNB, wherein the assistance data is sent in response to receiving the request for the assistance data.

Clause 105. The non-transitory storage medium of any of clauses 103-104, wherein the assistance data is sent to the gNB periodically.

Clause 106. The non-transitory storage medium of any of clauses 103-105, wherein the program code further comprises instructions to: receive updated assistance data from the reference network; and send the updated assistance data to the gNB.

Clause 107. The non-transitory storage medium of any of clauses 103-106, wherein the assistance data is sent in a New Radio Positioning Protocol A (NRPPa) message.

Clause 108. The non-transitory storage medium of clause 107, wherein content and coding for the assistance data is based on a Long Term Evolution (LTE) Positioning Protocol (LPP) message or a positioning System Information Block (posSIB).

Clause 109. The non-transitory storage medium of any of clauses 103-108, wherein the assistance data comprises assistance data for the plurality of satellites.

Clause 110. The non-transitory storage medium of clause 109, wherein the assistance data comprises at least one of ephemeris data, timing information, ionosphere corrections, troposphere corrections, real time integrity, differential corrections, or a combination thereof.

Clause 111. The non-transitory storage medium of any of clauses 109-110, wherein the plurality of satellites includes at least one Global Navigation Satellite System (GNSS) satellite.

Clause 112. The non-transitory storage medium of any of clauses 109-111, wherein the plurality of satellites includes at least one communications satellite.

Clause 113. A method performed by a user equipment (UE) for supporting satellite wireless access by the UE to a serving public land mobile network (PLMN), the method comprising: obtaining measurements of downlink (DL) signals received from a plurality of satellites; and sending the measurements of the DL signals to a satellite NodeB (gNB) via a serving communications satellite, wherein the measurements enable the gNB to determine a location and a country for the UE based on assistance data received by the gNB from a location server.

Clause 114. The method of clause 113, further comprising sending via the serving communications satellite a Non-Access Stratum (NAS) request message to the gNB for the serving PLMN, wherein the gNB performs a verification that the UE is in a country associated with the serving PLMN based on the country determined for the UE in response to receiving the NAS request message.

Clause 115. The method of clause 114, further comprising receiving a NAS accept message from an entity in a core network associated with the serving PLMN when the UE is located in the country associated with the serving PLMN, wherein the NAS accept message acknowledges the NAS request message.

Clause 116. The method of any of clauses 113-115, wherein the UE is registered with the serving PLMN, wherein the gNB performs a verification that the UE is in a country associated with the serving PLMN, based on the country determined for the UE to determine whether the UE continues to access the serving PLMN.

Clause 117. The method of any of clauses 113-116, wherein the measurements of the DL signals are sent to the gNB in a Radio Resource Control (RRC) message, wherein the RRC message is sent to the gNB to establish an RRC Signaling Connection between the UE and the gNB.

Clause 118. The method of clause 117, further comprising: receiving from the gNB an indication of a public key; and ciphering the measurements of the DL signals based on the public key before sending the measurements of the DL signals to the gNB.

Clause 119. The method of any of clauses 113-118, further comprising: receiving second assistance data broadcast by the gNB, wherein the second assistance data comprises some or all of the assistance data received by the gNB from the location server; and obtaining the measurements of the DL signals, based in part on the second assistance data.

Clause 120. The method of clause 119, wherein the second assistance data comprises assistance data for the plurality of satellites.

Clause 121. The method of clause 120, wherein the second assistance data comprises at least one of ephemeris data, acquisition assistance data, almanac data, timing information, ionosphere corrections, troposphere corrections, real time integrity, differential corrections, or a combination thereof.

Clause 122. The method of clause 120, wherein the second assistance data comprises identities or types of the DL signals, information on frequency, timing, coding and/or Doppler shift for the DL signals, or a combination thereof.

Clause 123. The method of any of clauses 113-122, wherein the plurality of satellites includes at least one Global Navigation Satellite System (GNSS) satellite.

Clause 124. The method of any of clauses 113-123, wherein the plurality of satellites includes at least one communications satellite.

Clause 125. The method of clause 124, wherein the at least one communications satellite is the serving communications satellite.

Clause 126. The method of any of clauses 113-125, further comprising receiving a message from the gNB indicating that the UE is not located in a country associated with the serving PLMN.

Clause 127. A user equipment (UE) configured for supporting satellite wireless access to a serving public land mobile network (PLMN) comprising: a wireless transceiver configured to wirelessly communicate with a communication satellite; at least one memory; at least one processor coupled to the wireless transceiver and the at least one memory, wherein the at least one processor is configured to: obtain measurements of downlink (DL) signals received from a plurality of satellites, via the wireless transceiver; and send, via the wireless transceiver, the measurements of the DL signals to a satellite NodeB (gNB) via a serving communications satellite, wherein the measurements enable the gNB to determine a location and a country for the UE based on assistance data received by the gNB from a location server.

Clause 128. The UE of clause 127, wherein the at least one processor is further configured to send via the serving communications satellite a Non-Access Stratum (NAS) request message to the gNB for the serving PLMN, wherein the gNB performs a verification that the UE is in a country associated with the serving PLMN based on the country determined for the UE in response to receiving the NAS request message.

Clause 129. The UE of clause 128, wherein the at least one processor is further configured to receive a NAS accept message from an entity in a core network associated with the serving PLMN when the UE is located in the country associated with the serving PLMN, wherein the NAS accept message acknowledges the NAS request message.

Clause 130. The UE of any of clauses 127-129, wherein the UE is registered with the serving PLMN, wherein the gNB performs a verification that the UE is in a country associated with the serving PLMN based on the country determined for the UE to determine whether the UE continues to access the serving PLMN.

Clause 131. The UE of any of clauses 127-130, wherein the measurements of the DL signals are sent to the gNB in a Radio Resource Control (RRC) message, wherein the RRC message is sent to the gNB to establish an RRC Signaling Connection between the UE and the gNB.

Clause 132. The UE of clause 131, wherein the at least one processor is further configured to: receive from the gNB an indication of a public key; and cipher the measurements of the DL signals based on the public key before sending the measurements of the DL signals to the gNB.

Clause 133. The UE of any of clauses 127-132, wherein the at least one processor is further configured to: receive second assistance data broadcast by the gNB, wherein the second assistance data comprises some or all of the assistance data received by the gNB from the location server; and obtain the measurements of the DL signals, based in part on the second assistance data.

Clause 134. The UE of clause 133, wherein the second assistance data comprises assistance data for the plurality of satellites.

Clause 135. The UE of clause 134, wherein the second assistance data comprises at least one of ephemeris data, acquisition assistance data, almanac data, timing information, ionosphere corrections, troposphere corrections, real time integrity, differential corrections, or a combination thereof.

Clause 136. The UE of clause 134, wherein the second assistance data comprises identities or types of the DL signals, information on frequency, timing, coding and/or Doppler shift for the DL signals, or a combination thereof.

Clause 137. The UE of any of clauses 127-136, wherein the plurality of satellites includes at least one Global Navigation Satellite System (GNSS) satellite.

Clause 138. The UE of any of clauses 127-137, wherein the plurality of satellites includes at least one communications satellite.

Clause 139. The UE of clause 138, wherein the at least one communications satellite is the serving communications satellite.

Clause 140. The UE of any of clauses 127-139, wherein the at least one processor is further configured to receive a message from the gNB indicating that the UE is not located in a country associated with the serving PLMN.

Clause 141. A user equipment (UE) configured for supporting satellite wireless access by the UE to a serving public land mobile network (PLMN), comprising: means for obtaining measurements of downlink (DL) signals received from a plurality of satellites; and means for sending the measurements of the DL signals to a satellite NodeB (gNB) via a serving communications satellite, wherein the measurements enable the gNB to determine a location and a country for the UE based on assistance data received by the gNB from a location server.

Clause 142. The UE of clause 141, further comprising means for sending via the serving communications satellite a Non-Access Stratum (NAS) request message to the gNB for the serving PLMN, wherein the gNB performs a verification that the UE is in a country associated with the serving PLMN based on the country determined for the UE in response to receiving the NAS request message.

Clause 143. The UE of clause 142, further comprising means for receiving a NAS accept message from an entity in a core network associated with the serving PLMN when the UE is located in the country associated with the serving PLMN, wherein the NAS accept message acknowledges the NAS request message.

Clause 144. The UE of any of clauses 141-143, wherein the UE is registered with the serving PLMN, wherein the gNB performs a verification that the UE is in a country associated with the serving PLMN, based on the country determined for the UE to determine whether the UE continues to access the serving PLMN.

Clause 145. The UE of any of clauses 141-144, wherein the measurements of the DL signals are sent to the gNB in a Radio Resource Control (RRC) message, wherein the RRC message is sent to the gNB to establish an RRC Signaling Connection between the UE and the gNB.

Clause 146. The UE of clause 145, further comprising: means for receiving from the gNB an indication of a public key; and means for ciphering the measurements of the DL signals based on the public key before sending the measurements of the DL signals to the gNB.

Clause 147. The UE of any of clauses 141-146, further comprising means for receiving second assistance data broadcast by the gNB, wherein the second assistance data comprises some or all of the assistance data received by the gNB from the location server; and means for obtaining the measurements of the DL signals, based in part on the second assistance data.

Clause 148. The UE of clause 147, wherein the second assistance data comprises assistance data for the plurality of satellites.

Clause 149. The UE of clause 148, wherein the second assistance data comprises at least one of ephemeris data, acquisition assistance data, almanac data, timing information, ionosphere corrections, troposphere corrections, real time integrity, differential corrections, or a combination thereof.

Clause 150. The UE of clause 148, wherein the second assistance data comprises identities or types of the DL signals, information on frequency, timing, coding and/or Doppler shift for the DL signals, or a combination thereof.

Clause 151. The UE of any of clauses 141-150, wherein the plurality of satellites includes at least one Global Navigation Satellite System (GNSS) satellite.

Clause 152. The UE of any of clauses 141-151, wherein the plurality of satellites includes at least one communications satellite.

Clause 153. The UE of clause 152, wherein the at least one communications satellite is the serving communications satellite.

Clause 154. The UE of any of clauses 141-153, further comprising means for receiving a message from the gNB indicating that the UE is not located in a country associated with the serving PLMN.

Clause 155. A non-transitory storage medium including program code stored thereon, the program code is operable to configure at least one processor in a user equipment (UE) for supporting satellite wireless access to a serving public land mobile network (PLMN), the program code comprising instructions to: obtain measurements of downlink (DL) signals received from a plurality of satellites; and send the measurements of the DL signals to a satellite NodeB (gNB) via a serving communications satellite, wherein the measurements enable the gNB to determine a location and a country for the UE based on assistance data received by the gNB from a location server.

Clause 156. The non-transitory storage medium of clause 155, wherein the program code further comprises instructions to send via the serving communications satellite a Non-Access Stratum (NAS) request message to the gNB for the serving PLMN, wherein the gNB performs a verification that the UE is in a country associated with the serving PLMN based on the country determined for the UE in response to receiving the NAS request message.

Clause 157. The non-transitory storage medium of clause 156, wherein the program code further comprises instructions to receive a NAS accept message from an entity in a core network associated with the serving PLMN when the UE is located in the country associated with the serving PLMN, wherein the NAS accept message acknowledges the NAS request message.

Clause 158. The non-transitory storage medium of any of clauses 155-157, wherein the UE is registered with the serving PLMN, wherein the gNB performs a verification that the UE is in a country associated with the serving PLMN based on the country determined for the UE to determine whether the UE continues to access the serving PLMN.

Clause 159. The non-transitory storage medium of any of clauses 155-158, wherein the measurements of the DL signals are sent to the gNB in a Radio Resource Control (RRC) message, wherein the RRC message is sent to the gNB to establish an RRC Signaling Connection between the UE and the gNB.

Clause 160. The non-transitory storage medium of clause 159, wherein the program code further comprises instructions to: receive from the gNB an indication of a public key; and cipher the measurements of the DL signals based on the public key before sending the measurements of the DL signals to the gNB.

Clause 161. The non-transitory storage medium of any of clauses 1551-160, wherein the program code further comprises instructions to: receive second assistance data broadcast by the gNB, wherein the second assistance data comprises some or all of the assistance data received by the gNB from the location server; and obtain the measurements of the DL signals, based in part on the second assistance data.

Clause 162. The non-transitory storage medium of clause 161, wherein the second assistance data comprises assistance data for the plurality of satellites.

Clause 163. The non-transitory storage medium of clause 162, wherein the second assistance data comprises at least one of ephemeris data, acquisition assistance data, almanac data, timing information, ionosphere corrections, troposphere corrections, real time integrity, differential corrections, or a combination thereof.

Clause 164. The non-transitory storage medium of clause 162, wherein the second assistance data comprises identities or types of the DL signals, information on frequency, timing, coding and/or Doppler shift for the DL signals, or a combination thereof.

Clause 165. The non-transitory storage medium of any of clauses 155-164, wherein the plurality of satellites includes at least one Global Navigation Satellite System (GNSS) satellite.

Clause 166. The non-transitory storage medium of any of clauses 155-165, wherein the plurality of satellites includes at least one communications satellite.

Clause 167. The non-transitory storage medium of clause 166, wherein the at least one communications satellite is the serving communications satellite.

Clause 168. The non-transitory storage medium of any of clauses 155-167, wherein the program code further comprises instructions to receive a message from the gNB indicating that the UE is not located in a country associated with the serving PLMN.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the disclosure as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method performed by a satellite NodeB (gNB) for supporting satellite wireless access by a user equipment (UE) to a serving public land mobile network (PLMN), the method comprising:
receiving assistance data from a location server for determining a position of the UE;
receiving measurements of downlink (DL) signals from the UE via a serving communications satellite, wherein the DL signals are received by the UE from a plurality of satellites, and wherein the measurements are performed by the UE and are based, at least in part, on characteristics of the DL signals;
determining a location and a country for the UE based on the measurements of the DL signals received from the UE and the assistance data received from the location server; and
performing a verification that the UE is in a country associated with the serving PLMN based on the country determined for the UE.

2. The method of claim 1, wherein the characteristics of the DL signals comprise at least one of a Reference Signal Received Power (RSRP), a Reference Signal Received Quality (RSRQ), or an Angle of Arrival (AOA), and wherein the method further comprises sending a request for the assistance data to the location server, wherein the assistance data is received in response to the request for the assistance data.

3. The method of claim 1, wherein the measurements include at least one of a Differential Angle of Arrival (DAOA) or a Reference Signal Time Difference (RSTD) for DL signals received from at least one pair of satellites among the plurality of satellites, and wherein the method further comprises broadcasting some or all of the assistance data to the UE via the serving communications satellite.

4. The method of claim 1, further comprising:
receiving via the serving communications satellite a Non-Access Stratum (NAS) request message from the UE to the serving PLMN, wherein performing the verification that the UE is in the country associated with the serving PLMN is in response to receiving the NAS request message; and
providing the NAS request message to a first entity in a core network for the serving PLMN when the verification determines that the UE is in the country associated with the serving PLMN.

5. The method of claim 4, further comprising:
including, with the NAS request message provided to the first entity, an indication that the country is verified by the gNB to be the country associated with the serving PLMN, or an indication that the country was not verified by the gNB to be the country associated with the serving PLMN.

6. The method of claim 1, wherein the UE is registered with the serving PLMN, wherein the verification that the UE is in the country associated with the serving PLMN is performed to determine whether the UE continues to access the serving PLMN.

7. The method of claim 6, further comprising:
verifying the UE is not located in the country associated with the serving PLMN; and
sending a message to a core network associated with the serving PLMN, the message indicating the UE is not located in the country associated with the serving PLMN, wherein the message enables the serving PLMN to deregister the UE.

8. A satellite NodeB (gNB) configured for supporting satellite wireless access by a user equipment (UE) to a serving public land mobile network (PLMN) comprising:
an external interface configured to communicate with network entities;
at least one memory;
at least one processor coupled to the external interface and the at least one memory, wherein the at least one processor is configured to:
receive, via the external interface, assistance data from a location server for determining a position of the UE;
receive, via the external interface, measurements of downlink (DL) signals from the UE via a serving communications satellite, wherein the DL signals are received by the UE from a plurality of satellites and wherein the measurements are performed by the UE and are based, at least in part, on characteristics of the DL signals;
determine a location and a country for the UE based on the measurements of the DL signals received from the UE and the assistance data received from the location server; and
perform a verification that the UE is in a country associated with the serving PLMN based on the country determined for the UE.

9. The gNB of claim 8, wherein the at least one processor is further configured to send, via the external interface, a request for the assistance data to the location server, wherein the assistance data is received in response to the request for the assistance data.

10. The gNB of claim 8, wherein the at least one processor is further configured to broadcast some or all of the assistance data to the UE via the serving communications satellite.

11. The gNB of claim 8, wherein the at least one processor is further configured to:
receive via the serving communications satellite a Non-Access Stratum (NAS) request message from the UE to the serving PLMN, wherein performing the verification that the UE is in the country associated with the serving PLMN is in response to receiving the NAS request message; and
provide, via the external interface, the NAS request message to a first entity in a core network for the serving PLMN when the verification determines that the UE is in the country associated with the serving PLMN.

12. The gNB of claim 11, wherein the at least one processor is further configured to:
include, with the NAS request message provided to the first entity, an indication that the country is verified by the gNB to be the country associated with the serving PLMN, or an indication that the country was not verified by the gNB to be the country associated with the serving PLMN.

13. The gNB of claim 8, wherein the UE is registered with the serving PLMN, wherein the verification that the UE is in the country associated with the serving PLMN is performed to determine whether the UE continues to access the serving PLMN.

14. The gNB of claim 13, wherein the at least one processor is further configured to:
verify the UE is not located in the country associated with the serving PLMN; and
send, via the external interface, a message to a core network associated with the serving PLMN, the message indicating the UE is not located in the country associated with the serving PLMN, wherein the message enables the serving PLMN to deregister the UE.

15. A method performed by a user equipment (UE) for supporting satellite wireless access by the UE to a serving public land mobile network (PLMN), the method comprising:
obtaining measurements of one or more characteristics of downlink (DL) signals received by the UE from a plurality of satellites; and
sending the measurements of the DL signals to a satellite NodeB (gNB) via a serving communications satellite, wherein the measurements enable the gNB to determine a location and a country for the UE based on assistance data received by the gNB from a location server.

16. The method of claim 15, further comprising sending via the serving communications satellite a Non-Access Stratum (NAS) request message to the gNB for the serving PLMN, wherein the gNB performs a verification that the UE is in a country associated with the serving PLMN based on the country determined for the UE in response to receiving the NAS request message.

17. The method of claim 16, further comprising receiving a NAS accept message from an entity in a core network associated with the serving PLMN when the UE is located in the country associated with the serving PLMN, wherein the NAS accept message acknowledges the NAS request message.

18. The method of claim 15, wherein the UE is registered with the serving PLMN, wherein the gNB performs a verification that the UE is in a country associated with the serving PLMN, based on the country determined for the UE to determine whether the UE continues to access the serving PLMN.

19. The method of claim 15, wherein the measurements of the DL signals are sent to the gNB in a Radio Resource Control (RRC) message, wherein the RRC message is sent to the gNB to establish an RRC Signaling Connection between the UE and the gNB.

20. The method of claim 19, further comprising:
receiving from the gNB an indication of a public key; and
ciphering the measurements of the DL signals based on the public key before sending the measurements of the DL signals to the gNB.

21. The method of claim 15, further comprising:
receiving second assistance data broadcast by the gNB, wherein the second assistance data comprises some or all of the assistance data received by the gNB from the location server; and
obtaining the measurements of the DL signals, based in part on the second assistance data.

22. The method of claim 21, wherein the second assistance data comprises assistance data for the plurality of satellites.

23. The method of claim 22, wherein the second assistance data comprises at least one of ephemeris data, acquisition assistance data, almanac data, timing information, ionosphere corrections, troposphere corrections, real time integrity, differential corrections, or a combination thereof.

24. The method of claim 22, wherein the second assistance data comprises identities or types of the DL signals, information on frequency, timing, coding and/or Doppler shift for the DL signals, or a combination thereof.

25. The method of claim 15, wherein the plurality of satellites includes at least one Global Navigation Satellite System (GNSS) satellite, and wherein the measurements of one or more characteristics of the DL signals comprises at least one of a GNSS pseudorange measurement or a code phase measurement.

26. The method of claim 15, wherein the plurality of satellites includes at least one communications satellite, and wherein the one or more characteristics of the DL signals comprise at least one of a Reference Signal Received Power (RSRP), a Reference Signal Received Quality (RSRQ), or an Angle of Arrival (AOA).

27. The method of claim 26, wherein the at least one communications satellite is the serving communications satellite.

28. The method of claim 15, further comprising receiving a message from the gNB indicating that the UE is not located in a country associated with the serving PLMN.

29. A user equipment (UE) configured for supporting satellite wireless access to a serving public land mobile network (PLMN) comprising:
a wireless transceiver configured to wirelessly communicate with a communication satellite;
at least one memory;
at least one processor coupled to the wireless transceiver and the at least one memory, wherein the at least one processor is configured to:
obtain measurements of one or more characteristics of downlink (DL) signals received by the UE from a plurality of satellites, via the wireless transceiver; and
send, via the wireless transceiver, the measurements of the DL signals to a satellite NodeB (gNB) via a serving communications satellite, wherein the measurements enable the gNB to determine a location and a country for the UE based on assistance data received by the gNB from a location server.

30. The UE of claim 29, wherein the at least one processor is further configured to send via the serving communications satellite a Non-Access Stratum (NAS) request message to the gNB for the serving PLMN, wherein the gNB performs a verification that the UE is in a country associated with the serving PLMN based on the country determined for the UE in response to receiving the NAS request message.

31. The UE of claim 30, wherein the at least one processor is further configured to receive a NAS accept message from an entity in a core network associated with the serving PLMN when the UE is located in the country associated with the serving PLMN, wherein the NAS accept message acknowledges the NAS request message.

32. The UE of claim 29, wherein the UE is registered with the serving PLMN, wherein the gNB performs a verification that the UE is in a country associated with the serving PLMN based on the country determined for the UE to determine whether the UE continues to access the serving PLMN.

33. The UE of claim 29, wherein the measurements of the DL signals are sent to the gNB in a Radio Resource Control (RRC) message, wherein the RRC message is sent to the gNB to establish an RRC Signaling Connection between the UE and the gNB.

34. The UE of claim 33, wherein the at least one processor is further configured to:

receive from the gNB an indication of a public key; and
cipher the measurements of the DL signals based on the public key before sending the measurements of the DL signals to the gNB.

35. The UE of claim 29, wherein the at least one processor is further configured to:
receive second assistance data broadcast by the gNB, wherein the second assistance data comprises some or all of the assistance data received by the gNB from the location server; and
obtain the measurements of the DL signals, based in part on the second assistance data.

36. The UE of claim 35, wherein the second assistance data comprises assistance data for the plurality of satellites.

37. The UE of claim 36, wherein the second assistance data comprises at least one of ephemeris data, acquisition assistance data, almanac data, timing information, ionosphere corrections, troposphere corrections, real time integrity, differential corrections, or a combination thereof.

38. The UE of claim 36, wherein the second assistance data comprises identities or types of the DL signals, information on frequency, timing, coding and/or Doppler shift for the DL signals, or a combination thereof.

39. The UE of claim 29, wherein the plurality of satellites includes at least one Global Navigation Satellite System (GNSS) satellite, and wherein the measurements of one or more characteristics of the DL signals comprises at least one of a GNSS pseudorange measurement or a code phase measurement.

40. The UE of claim 29, wherein the plurality of satellites includes at least one communications satellite, and wherein the one or more characteristics of the DL signals comprise at least one of a Reference Signal Received Power (RSRP), a Reference Signal Received Quality (RSRQ), or an Angle of Arrival (AOA).

41. The UE of claim 40, wherein the at least one communications satellite is the serving communications satellite.

42. The UE of claim 29, wherein the at least one processor is further configured to receive a message from the gNB indicating that the UE is not located in a country associated with the serving PLMN.

* * * * *